United States Patent
Bakker et al.

(10) Patent No.: US 11,952,528 B2
(45) Date of Patent: Apr. 9, 2024

(54) SWITCHING LAYERS FOR USE IN A SWITCHING ELEMENT

(71) Applicant: Merck Patent GmbH, Darmstadt (DE)

(72) Inventors: Henriette Bakker, VL Utrecht (NL); Ties De Jong, En Utrecht (NL); Michael Junge, Pfungstadt (DE); Andreas Beyer, Hanau (DE); Jasper Van Den Muijsenberg, BA Nijmegen (NL)

(73) Assignee: MERCK PATENT GMBH, Darmstadt (DE)

( * ) Notice: Subject to any disclaimer, the term of this patent is extended or adjusted under 35 U.S.C. 154(b) by 355 days.

(21) Appl. No.: 17/415,953

(22) PCT Filed: Dec. 17, 2019

(86) PCT No.: PCT/EP2019/085480
§ 371 (c)(1),
(2) Date: Jun. 18, 2021

(87) PCT Pub. No.: WO2020/127141
PCT Pub. Date: Jun. 25, 2020

(65) Prior Publication Data
US 2022/0064532 A1    Mar. 3, 2022

(30) Foreign Application Priority Data

Dec. 19, 2018 (EP) ..................................... 18214041

(51) Int. Cl.
| | | |
|---|---|---|
| *C09K 19/34* | (2006.01) | |
| *C09K 19/58* | (2006.01) | |
| *G02F 1/133* | (2006.01) | |
| *G02F 1/1347* | (2006.01) | |
| *G02F 1/137* | (2006.01) | |
| *C09K 19/04* | (2006.01) | |

(52) U.S. Cl.
CPC ........ *C09K 19/3497* (2013.01); *C09K 19/586* (2013.01); *G02F 1/13306* (2013.01); *G02F 1/1347* (2013.01); *G02F 1/13737* (2013.01); *C09K 2019/0448* (2013.01); *C09K 2219/13* (2013.01)

(58) Field of Classification Search
CPC .. H10K 59/353; H10K 50/125; H10K 50/818; H10K 50/828; H10K 59/351; H10K 50/11; H10K 59/352; H01L 33/08; H01L 33/20; H01L 33/42
See application file for complete search history.

(56) References Cited

U.S. PATENT DOCUMENTS

| | | |
|---|---|---|
| 9,238,775 B2 | 1/2016 | Junge |
| 2014/0226096 A1 | 8/2014 | Taheri et al. |
| 2016/0085108 A1 | 3/2016 | Junge et al. |
| 2016/0319592 A1* | 11/2016 | Junge ................. C09K 19/3003 |
| 2018/0157088 A1* | 6/2018 | Junge ................. G02F 1/13439 |
| 2021/0171830 A1 | 6/2021 | Verbunt et al. |

FOREIGN PATENT DOCUMENTS

| | | | |
|---|---|---|---|
| WO | WO-2011158569 A1 * | 12/2011 | ............... G02B 5/23 |
| WO | 12052100 A1 | 4/2012 | |
| WO | 14180525 A1 | 11/2014 | |
| WO | 15090506 A1 | 6/2015 | |
| WO | WO-2015090506 A1 * | 6/2015 | ......... C09K 19/0403 |
| WO | 16173693 A1 | 11/2016 | |
| WO | WO-2016173693 A1 * | 11/2016 | ......... C09K 19/3497 |
| WO | 18206538 A1 | 11/2018 | |
| WO | 19110459 A1 | 6/2019 | |

OTHER PUBLICATIONS

English machine translation of WO-2016173693-A1, Michael Junge et al.(Year: 2023).*
English machine translation of WO-2011158569-A1, Satoshi Shibata et al.(Year: 2023).*
R. Baetens et al., „Properties, requirements and possibilities of smart windows for dynamic daylight and solar energy control in buildings: a state-of-the-art review, Solar Energy Materials & Solar Cells, 94 (2010), pp. 87-105.
Jae-Won Huh et al., "Double-layered light shutter using long pitch cholesteric liquid crystal cells", Applied Optics, vol. 54 (2015), Issue 12, pp. 2792-3795.
International Search Report PCT/EP2019/085480 dated Mar. 13, 2020 (pp. 1-4).

* cited by examiner

*Primary Examiner* — Donald L Raleigh
(74) *Attorney, Agent, or Firm* — Millen, White, Zelano & Branigan, P.C.; Brion P. Heaney

(57) ABSTRACT

The present invention relates to an assembly of switching layers for dimming and scattering of light and to window elements comprising the arrangement of switching layers.

20 Claims, No Drawings

SWITCHING LAYERS FOR USE IN A SWITCHING ELEMENT

The present invention relates to an assembly of switching layers for dimming and scattering of light and to window elements comprising the arrangement of switching layers.

Devices for controlling or modulating the transmission of light are commonly used in display applications, but they may also be used e.g. in so-called smart windows applications. R. Baetens et al. in "Properties, requirements and possibilities of smart windows for dynamic daylight and solar energy control in buildings: A state-of-the-art review", Solar Energy Materials & Solar Cells, 94 (2010) on pages 87-105 review different dynamic smart windows. As described therein, smart windows can make use of several technologies for modulating the transmittance of light such as devices based on electrochromism, liquid crystal devices and electrophoretic or suspended-particle devices.

It is also generally known that light shutters and optical intensity modulators can be based on liquid crystals (LCs). LC-based light modulators can be used in switchable windows for architectural, automotive, avionic and nautical applications.

Switching between the different optical states may e.g. be thermally controlled. However, in many cases it can be suitable and even advantageous to use electrical switching.

LC-based light modulating or regulating devices may in principle rely on the absorption of light or the scattering of light.

In some devices the transmission of light can be reversibly changed, wherein the intensity of incident light can be attenuated, dimmed or tinted, while however exhibiting little or no scattering or haze in the different states of operation. Such devices may thus be operated in and switched between a bright state and a dark state, i.e. a state of relatively higher light transmission and a state of relatively lower light transmission, wherein both states are substantially non-hazy.

Several modes or configurations may be employed to provide such reversible transmission change. For twisted nematic (TN), super-twisted nematic (STN) and vertical alignment (VA) liquid crystal cells polarizers are used to control the light transmission. It is also possible to use guest-host liquid crystal cells which are based on a liquid crystal host which is doped with dichroic dye molecules. These guest-host systems can be used without any polarizers to alter the light transmission. However, in some embodiments and applications guest-host liquid crystal cells are used in combination with at least one polarizer.

LC-based light modulators using light scattering include so-called polymer dispersed liquid crystal (PDLC) or encapsulated or nematic curvilinear aligned phase liquid crystal (NCAP), polymer network liquid crystal (PNLC), cholesteric liquid crystal (CLC), polymer stabilized cholesteric texture liquid crystal (PSCT) and dynamic scattering liquid crystal devices. These scattering-type devices can be switched between a transparent state, i.e. an optically clear or non-hazy state, and a light scattering state, i.e. a translucent or hazy state.

When such a scattering-type device is switched from a non-scattering state to a scattering state, the transmission of light is changed such that a translucent or opaque appearance is produced, which may be perceived as cloudy, turbid, diffuse or hazy.

A device operating in the scattering mode can in particular be used as a privacy window. In this case a privacy mode can be provided when desired by switching the device, in particular the window element, from a clear state with possible viewing contact to a scattering state giving a visual barrier.

In US 2014/0226096 A1 a light variable device is described to adjust ambient light, in particular in view of see-through near-eye display device applications. It is described that this device for light management can perform both absorption and scattering. It is further described that the device can transition between three different optical states under different electrical field conditions, namely a low-haze low-tint state, a low-haze high-tint state and a high-haze high-tint state. In the device a single switching layer is used, wherein an LC material is mixed with dichroic dyes to provide absorption and ionic dopant to provide so-called dynamic scattering.

J.-W. Huh et al. in "Double-layered light shutter using long-pitch cholesteric liquid crystal cells", Applied Optics, 54 (2015) on pages 3792-3795 propose a double-layered light shutter device using two cholesteric liquid crystal cells, wherein the light shutter comprises a light-scattering layer using long-pitch cholesteric LCs and a light-absorption layer using dye-doped cholesteric LCs.

WO 2016/173693 A1 describes a switching layer for use in a switching element which has forward-scattering properties in one of the switching states and which aims to regulate dazzling from sunlight and to establish privacy when needed. The switching layer facilitates switching from a transparent state into a translucent or opaque state. In an embodiment scattering is achieved by a nematic liquid crystal together with a polymer component. In another embodiment a cholesteric liquid crystal is used instead. It is further described that in some embodiments one or more additional switching layers can be used to provide scattering or control of the light intensity or transmission.

There is still a need in the art for an improved control and management of daylight transmission, especially under certain conditions and in certain settings such as under direct sunlight irradiation or varying amounts of sunlight.

An object of the present invention is therefore to provide multilayer arrangements and window elements, in particular for use in switchable or smart windows for architectural, automotive, avionic and nautical applications, which can provide favourable control of ambient light and which may provide light conditions or respectively lighting conditions in daylighted spaces which minimize discomfort related to for example dazzling and glare. In addition to providing comfort and pleasant ambient conditions, it is desirable that the switchable devices provide efficiencies in terms of energy and cost. It is a further object to provide multilayer arrangements and window elements which have good stability, e.g. against electrical breakdown, and a favourably low operating voltage or low energy consumption and which can show fast and adequately efficient and sufficiently uniform switching. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above objects and eventually provide additional advantages.

A first aspect of the present invention provides a multilayer arrangement for regulating the passage of light, which comprises
- a first switching layer which is switchable between an optically clear state and a light scattering state and which contains a material which comprises a liquid-crystalline medium comprising one or more mesogenic compounds and one or more chiral compounds, and a polymeric component, wherein the polymeric component is contained in the material in an amount, based on the overall contents of the material, of 5% by weight or less, and
- a switching element comprising a second switching layer, wherein the switching element is switchable between a bright state and a dark state and wherein the second switching layer is a liquid-crystalline layer.

According to the invention advantageous multilayer assemblies are configured, wherein these assemblies can favourably be used in switchable windows for architectural, automotive, avionic and nautical applications. The multilayer arrangements are particularly useful and efficient in providing an anti-glare effect when desired or required by offering switchability, in particular electrical switchability, between a state which is optically clear and bright and a state which is light scattering and dark.

In the present invention it was recognized that sources of glare can not only stem from a high luminance of a bright light source in absolute terms but also from a large contrast in luminance. While the human eye can in principle adapt to different light intensities, it is limited in its ability to handle certain ranges of luminance at a given moment or in a given adapted state.

It was further recognized that a combination of reducing the overall light flux together with reducing the contrast between the luminance of the light source and the background luminance may be particularly effective in reducing discomfort from glare, in particular in situations where the sun is perceived as being too bright and/or in an unfavourable position relative to an observer such as an occupant in a building.

It has surprisingly been found that a multilayer arrangement for effective and efficient anti-glare performance can be obtained by including the first switching layer as set forth above and below which can provide scattering when required for diffusing the light together with the switching element containing the second switching layer as set forth above and below which can give light dimming when required for a reduction of light flux or overall light transmission. This can result in a significant reduction in perceived glare, in particular glare of the sun, by suitably limiting and in addition favourably distributing the amount of light. The multilayer arrangement according to the invention can thus prevent or minimize glare, excessive solar heating and lighting areas with high intensity contrasts.

In addition, the present multilayer assembly exhibits a favourable appearance. In particular, a favourable clear state with homogeneous low haze and a scattering state having an enhanced and uniform scattering efficiency together with a homogeneous and colour-neutral appearance can be obtained wherein unwanted colour effects are favourably avoided or minimized.

Furthermore, the multilayer arrangement according to the invention can give fast switching while still transmitting meaningful quantities of daylight even in the dark and scattering state. Considering this benefit that daylight can still be transmitted, the use of artificial lighting can be limited which leads to cost and energy savings. In addition, the multilayer arrangement may be arranged and controlled such that it still permits to view the outside surroundings even in the dark and scattering state, at least to some extent.

By contrast, traditional mechanical solutions such as the closing of blinds or curtains is slow and often precludes or limits the transmission of daylight and requires artificial lighting, while also obscuring the view. In addition, mechanical sunscreens require maintenance, and stresses from e.g. wind load need to be taken into account.

The multilayer arrangement according to the invention can thus provide improved comfort and energy and cost savings.

The multilayer arrangement according to the invention may also give further benefits such as suitable reliability, durability and stability, e.g. with respect to electrical breakdown and light stability, in particular UV light stability, as well as a favourably low switching voltage and low energy consumption. In this respect, in accordance with the present invention liquid-crystalline media with improved chemical, physical and electro-optical properties may be favourably and advantageously used, wherein the media in particular may have a broad liquid-crystalline phase with a suitably high clearing point, a favourably high voltage holding ratio (VHR), good low-temperature stability and suitable stability for storage.

Another aspect of the invention relates to the use of the multilayer arrangement according to the invention in an insulating glazing unit.

In another aspect of the invention a window element is provided, which comprises the layer arrangement according to the invention and which is electrically switchable between a state which is optically clear and bright and a state which is light scattering and dark.

The window element according to the invention is useful for regulating or modulating the passage of light, in particular for controlling the passage of sunlight. The window element is particularly effective in reducing the overall light intensity to comfortable levels and in reducing the contrast or intensity difference between a bright light source and its surroundings by giving a relatively smooth angular distribution of transmitted light of reduced intensity. The limited range of luminance and the reduced contrast difference can result in improved user comfort by avoiding or minimizing glare or dazzling.

The window element is capable of undergoing reversible optical transitions, wherein such switching is fast, typically on the order of less than a second. The device can conveniently be switched between the states by applying an electrical voltage.

Furthermore, the window element may be installed with minimum space requirement, which can offer significant advantages, e.g. in comparison to traditional awnings or blinds. The window element according to the invention may advantageously be employed in a window of an external façade of buildings, but it may also be used for cars, commercial vehicles, trains, airplanes, ships, etc.

The window element can significantly reduce glare, while still allowing daylight to pass and to view the outside surroundings, which also enables to minimize the use of artificial light sources.

Therefore, another aspect of the invention relates to the advantageous use of the layer arrangement or the window element according to the invention to reduce glare from sunlight radiation.

Without limiting the present invention thereby, in the following the invention is illustrated by the detailed description of the aspects, embodiments and particular features, and particular embodiments are described in more detail.

The term "liquid crystal" (LC) herein preferably relates to materials or media having liquid-crystalline mesophases in some temperature ranges (thermotropic LCs). They contain mesogenic compounds.

The terms "mesogenic compound" and "liquid crystal compound" mean a compound comprising one or more calamitic (rod- or board/lath-shaped) or discotic (disc-shaped) mesogenic groups, i.e. groups with the ability to induce liquid-crystalline phase or mesophase behaviour.

The LC compounds or materials and the mesogenic compounds or materials comprising mesogenic groups do not necessarily have to exhibit a liquid-crystalline phase themselves. It is also possible that they show liquid-crystalline phase behaviour only in mixtures with other compounds. This includes low-molecular-weight non-reactive liquid-crystalline compounds, reactive or polymerisable liquid-crystalline compounds, and liquid-crystalline polymers.

A calamitic mesogenic compound is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

For the sake of simplicity, the term "liquid crystal" or "liquid-crystalline" material or medium is used for both liquid crystal materials or media and mesogenic materials or media, and vice versa, and the term "mesogen" is used for the mesogenic groups of the material.

The term "non-mesogenic compound or material" means a compound or material that does not contain a mesogenic group as defined above.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post-polymerisation purification processes, are typically mixed or co-mingled with the polymer such that they generally remain with the polymer when it is transferred between vessels or between solvents or dispersion media.

The term "polymerisation" means the chemical process to form a polymer by bonding together multiple polymerisable groups or polymer precursors (polymerisable compounds) containing such polymerisable groups.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" or "non-polymerisable" compounds.

The term "chiral" in general is used to describe an object that is non-superimposable on its mirror image. By contrast, "achiral" (non-chiral) objects are objects that are identical to their mirror image. Some of the media used according to the invention exhibit chirality. This can be achieved by providing cholesteric liquid crystals, which are also known as chiral nematic liquid crystals. The terms chiral nematic and cholesteric are used synonymously herein, unless explicitly stated otherwise.

Herein

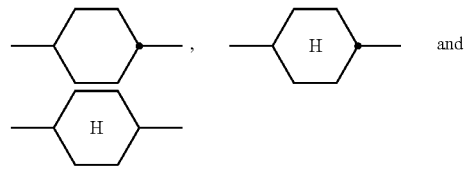

denote trans-1,4-cyclohexylene.

Herein, unless explicitly stated otherwise, all concentrations are given in weight percent and relate to the respective complete mixture.

All temperatures are given in degrees centigrade (Celsius, ° C.) and all differences of temperatures in degrees centigrade. All physical properties and physicochemical or electro-optical parameters are determined and given for a temperature of 20° C., unless explicitly stated otherwise.

For the purposes of the present invention, the term energy is taken to mean in particular energy by electromagnetic radiation in the UV-A, VIS and NIR region. In particular, it is taken to mean energy by radiation which is not absorbed or is only absorbed to a negligible extent by the materials usually used in windows, for example glass. Herein, the UV-A region is taken to mean the wavelength range from 320 to 380 nm, the VIS region is taken to mean the wavelength range from 380 nm to 780 nm and the NIR region is taken to mean the wavelength range from 780 nm to 2000 nm. Correspondingly, the term light is generally taken to mean electromagnetic radiation having wavelengths between 320 and 2000 nm, and in particular from 380 nm to 780 nm.

Transmission and scattering of light preferably refers to the transmission and scattering of electromagnetic radiation in the spectral range from 380 nm to 780 nm.

Herein, a dichroic dye is taken to mean a light-absorbing compound in which the absorption properties are dependent on the orientation of the compound relative to the direction of polarisation of the light. A dichroic dye compound in accordance with the present invention typically has an elongated shape, i.e. the compound is significantly longer in one spatial direction, i.e. along the longitudinal axis, than in the other two spatial directions.

The terms "film" and "layer" include rigid or flexible, self-supporting or freestanding films or layers with more or less pronounced mechanical stability, as well as coatings or layers on a supporting substrate or between two substrates.

A switching layer can be arranged on a substrate or between two substrates such as to give a switching element which is operable in different optical states and which preferably is electrically switchable.

Switching according to the invention preferably means electrical switching. Electrical switching can typically be achieved by providing substrates, e.g. glass substrates or plastic substrates, with electrodes. In an embodiment electrically conductive layers are provided on the substrates, wherein the conductive layers comprise or are formed of a transparent conductive material, e.g. a transparent conductive oxide, preferably indium tin oxide (ITO) or $SnO_2$:F, in particular ITO, or a conductive polymer, or a thin transparent metal and/or metal oxide layer, for example silver. The electrically conductive layers are preferably provided with electrical connections. The voltage is preferably supplied by a battery, a rechargeable battery, a supercapacitor or an external current source, more preferably by an external current source.

In an embodiment there are provided orientation layers, e.g. made of polyimide (PI), on the substrate. It is particularly preferred that electrically conductive layers and orientation layers are provided together on the substrates. In this case the orientation layer or alignment layer is provided on top of the conductive layer such that the orientation layer is contacting the LC medium. The orientation layers, preferably polyimide layers, may be arranged such that they provide, in particular at the interface, homogeneous or planar orientation or alternatively homeotropic orientation of the molecules of the liquid-crystalline medium. In a particular embodiment rubbed polyimide is used on both substrates having a difference in direction of 90° as used in the so-called twisted nematic (TN) geometry. In some embodiments so-called pre-tilt angles can be set and obtained.

Alternatively and according to another preferred embodiment, substrates without orientation layers are used. It has surprisingly been found that in some embodiments the provision of orientation layers, e.g. polyimide layers, as additional layers may beneficially be avoided, while effective and efficient switching behaviour may still be realized.

It is also possible to provide passivation or barrier layers on the substrates, alternatively but also in addition to orientation layers, e.g. passivation layers comprising silicon oxide or silicon nitride, preferably consisting of silicon oxide or silicon nitride. In case both a passivation layer and an orientation layer are provided on a substrate they are arranged such that the orientation layer is topmost, i.e. is contacting the LC medium.

Therefore, the first switching layer and the second switching layer according to the invention are preferably each interposed between two transparent substrates each respectively supporting an electrode which is arranged as a transparent conductive layer, wherein preferably the transparent conductive layers are respectively embedded between two transparent dielectric layers, such as silicon oxide or silicon nitride layers, and wherein optionally alignment layers are further provided which are in direct contact with the switching layers.

Switching of a given switching layer preferably refers to the switching between binary states.

According to the invention the first switching layer as described above and below is switchable between an optically clear state and a light scattering state. The optically clear state is non-scattering or substantially non-scattering and appears substantially transparent or clear to the human eye, and the light scattering state is scattering or has diffusive transmission and appears translucent or opaque to the human eye.

In the optically clear state the first switching layer according to the invention preferably gives a haze, determined according to ASTM D 1003, of less than 20%, more preferably less than 15%, even more preferably less than 10% and in particular less than 5%.

In the scattering state the first switching layer according to the invention preferably gives a haze, determined according to ASTM D 1003, of more than 75%, more preferably more than 85%, even more preferably more than 90%. It is particularly preferred that in the scattering state the first switching layer according to the invention gives a haze, determined according to ASTM D 1003, of 95% or more.

For the measurement of haze hazemeters made by BYK-Gardner, in particular haze-gard i from BYK-Gardner, may be used. It is also possible to use spectrophotometers, e.g. a Lambda 1050 spectrophotometer from Perkin Elmer and a 150 mm Ulbricht's sphere.

According to the invention the switching element comprising the second switching layer is switchable between a bright state and a dark state. In this respect, the bright state has a larger degree of light transmission compared to the dark state.

In the bright state the switching element comprising the second switching layer according to the invention preferably has a degree of visible light transmission, determined in accordance with DIN EN410, of more than 45%, more preferably more than 55%, and even more preferably more than 65%.

In the dark state the switching element comprising the second switching layer according to the invention preferably has a degree of visible light transmission, determined in accordance with DIN EN410, of less than 40%, more preferably less than 30%, and even more preferably less than 20%. In a preferred embodiment, in the dark state the switching element comprising the second switching layer has a degree of visible light transmission, determined in accordance with DIN EN410, in the range from 14% to 40%, and more preferably in the range from 25% to 36%.

The multilayer arrangement and in particular the window element according to the invention are switchable, favourably and preferably electrically switchable, between a state which is optically clear and bright and a state which is light scattering and dark.

In a preferred embodiment, the window element is switchable into the optically clear and bright state by applying an AC voltage V1 and is switchable into the light scattering and dark state by applying an AC voltage V2, wherein V1>V2.

In addition, the multilayer arrangement and in particular the window element according to the invention preferably are further operable in and electrically switchable to a state which is optically clear and dark and a state which is light scattering and bright.

However, it is also possible for the switching layers, the multilayer arrangement and the window element to have further switching states, in particular intermediate states.

According to the invention the first switching layer contains a material which comprises a liquid-crystalline medium comprising one or more mesogenic compounds and one or more chiral compounds, and a polymeric component, wherein the polymeric component is contained in the material in an amount, based on the overall contents of the material, of 5% by weight or less.

Preferably, the polymeric component is contained in the material in an amount, based on the overall contents of the material, of 2.5% by weight or less, and in particular 1% by weight or less. In a preferred embodiment the polymeric component is contained in the material in an amount, based on the overall contents of the material, in the range from 0.5 to 1.5% by weight.

In a preferred embodiment the polymeric component comprised in the first switching layer contains one or more polymeric structures obtained by or respectively obtainable from polymerisation of one or more polymerisable mesogenic compounds.

It is preferred that the polymeric component is obtained from polymerising exclusively one or more polymerisable mesogenic compounds, i.e. that the polymeric component consists of one or more polymeric structures which are only based on or respectively only derived from one or more polymerisable mesogenic compounds as the precursors.

It is particularly preferred that the polymeric component is prepared in situ, in particular in the switching layer, by polymerising one, two or three polymerisable mesogenic compounds, even more preferably one or two polymerisable mesogenic compounds.

Polymerisable mesogenic compounds according to the invention contain a mesogenic group and one or more polymerisable groups, i.e. functional groups which are suitable for polymerisation. These compounds are also known as reactive mesogens (RMs) or mesogenic monomers. The RMs can be monoreactive and/or di- or multireactive.

While it is preferred that the polymerisable compound(s) as used according to the invention include(s) only reactive mesogen(s), i.e. all the reactive monomers are mesogens, in an alternative embodiment it is also possible to use one or more RMs in combination with one or more non-mesogenic polymerisable compounds.

The polymerisable compounds and the mesogenic compounds may be chosen in view of matching the refractive indices of the obtained polymeric component and the LC medium in the modulation material, which can favourably contribute to improving the clear state.

Preferably, the liquid-crystalline medium comprised in the first switching layer has a clearing point of 80° C. or more, more preferably 90° C. or more, even more preferably 100° C. or more, and in particular 115° C. or more. It is preferred that the medium has a clearing point in the range from 80° C. to 170° C. and more preferably from 100° C. to 150° C.

All physical properties and physicochemical or electro-optical parameters are determined by generally known methods, in particular according to "Merck Liquid Crystals, Physical Properties of Liquid Crystals", Status November 1997, Merck KGaA, Germany.

The clearing point, in particular the phase transition temperature between the nematic phase or respectively the chiral nematic or cholesteric phase and the isotropic phase, can be measured and determined by commonly known methods, e.g. using a Mettler oven, a hot-stage under a polarizing microscope, or differential scanning calorimetry (DSC) analysis. According to the invention the clearing point is preferably determined using a Mettler oven.

Preferably, the liquid-crystalline medium comprised in the first switching layer exhibits a pitch of 0.55 μm or more in the scattering state.

The cholesteric or chiral nematic medium as presently provided preferably has a relatively long pitch, and in particular a pitch which preferably gives Bragg-type reflection of greater than 780 nm. In this case also the planar texture may give favourable transmission over the visible light spectrum.

The pitch herein means the pitch p of the cholesteric helix, wherein the pitch p is the distance for the orientational axis (director) of the CLC to undergo a $2\pi$ rotation. In a particularly preferred embodiment the medium exhibits a pitch of 0.75 μm or more, even more preferably of 1.00 μm or more and in particular of 1.50 μm or more.

Preferably the concentration of the one or more chiral dopants is set such that the resulting chiral pitch is in the range of 0.55 μm to 10 μm.

According to the invention the pitch is determined from NIR spectroscopic measurement, in particular at 20° C., of the wavelength of the selective reflection maximum $\lambda_{max}$.

The pitch p is determined from the measured value of $\lambda_{max}$ using the equation $\lambda_{max}=n(\lambda_{max})*p$, wherein $n(\lambda_{max})$ is the refractive index at $\lambda_{max}$.

It is also possible to use the wedge cell method which is known in the art to measure, in particular at 20° C., the helical twisting power HTP and to confirm the determined the pitch.

It has presently been recognized that particular additional benefits, e.g. in terms of scattering efficiency or uniformity and appearance of the scattering effect, can be obtained when the material in the first switching layer contains the chiral nematic or cholesteric liquid-crystalline medium which has a relatively long pitch and a favourably high clearing point in combination with the polymeric component as presently defined, and in particular when a so-called polymer stabilized cholesteric texture (PSCT) is provided.

Surprisingly the first switching layer according to the invention can give a scattering state with efficient and sufficiently strong scattering having a homogeneous appearance to the eye, in particular over large areas as is desirable for larger windows. This uniform appearance advantageously includes a colour-neutral appearance, which means that undesirable colour effects or respectively colour artefacts can be minimized or even avoided.

It was recognized that in a layer containing a cholesteric material colour effects may occur due to the inherent chiral periodicity, e.g. different colours may be transmitted under different angles when the material is illuminated with direct, non-diffuse light. In such a case the transmitted light is coloured when observed off-axis, and a window element and the window may appear coloured when observed off-axis, wherein the observed colour depends on the angle of observation. This effect may give a resemblance to a rainbow-like appearance. It was further recognized that in many applications such colour effects are undesirable.

It is believed that the material as provided in the first switching layer according to the invention can give sufficient scattering with the desired haze, e.g. by scattering from the material domains, in particular from boundaries, defects or random structures, whereas diffraction of incident light as caused by periodic structures may be substantially suppressed or avoided by sufficiently perturbing or disrupting the periodicity on the relevant length scales, in particular by the introduction of the polymeric component, which surprisingly may be effective in this regard even when contained in only small amounts.

In a preferred embodiment the liquid-crystalline medium comprised in the first switching layer according to the invention has a positive dielectric anisotropy. In this case preference is given to liquid-crystalline mixtures having a dielectric anisotropy $\Delta\varepsilon$ in the range from 3 to 45, more preferably in the range from 5 to 30.

$\Delta\varepsilon$ denotes the dielectric anisotropy, wherein $\Delta\varepsilon=\varepsilon_{\parallel}-\varepsilon_{\perp}$. The dielectric anisotropy $\Delta\varepsilon$ is determined at 20° C. and 1 kHz.

In an alternative embodiment it is however also possible to provide an LC medium having a negative dielectric anisotropy. In this case preference is given to liquid-crystalline mixtures having a dielectric anisotropy $\Delta\varepsilon$ in the range from −6 to −3.

It is particularly preferred that the liquid-crystalline medium as comprised in the first switching layer according to the invention contains, based on the overall contents of the medium, at least 15% by weight of one or more mesogenic compounds of formula I

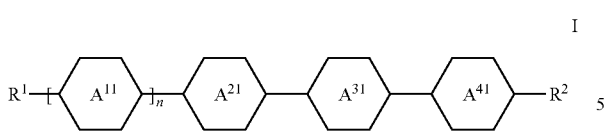 I wherein
R$^1$ and R$^2$ denote, independently of one another, a group selected from F, Cl, CF$_3$, OCF$_3$, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO—, —C≡C—,

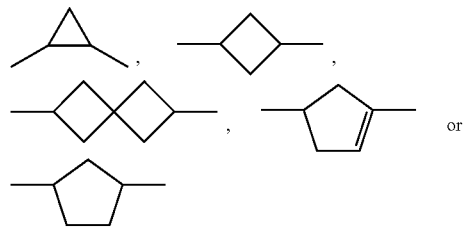

in such a manner that oxygen atoms are not linked directly to one another,
A$^{11}$ denotes

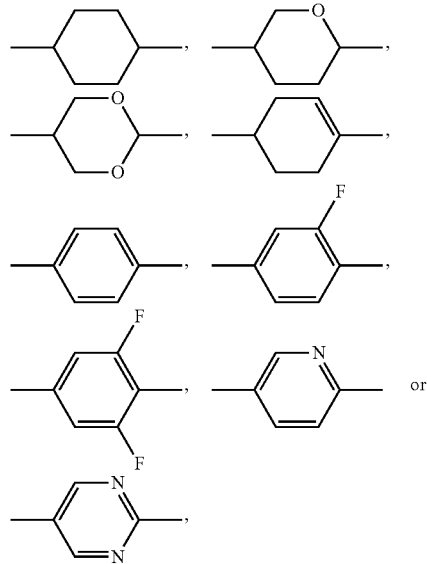

n denotes 0 or 1, and
A$^{21}$, A$^{31}$ and A$^{41}$ denote, independently of one another,

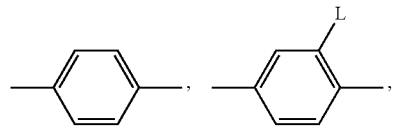

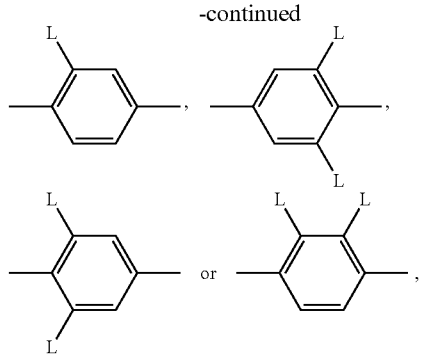

wherein L is on each occurrence, identically or differently, halogen selected from F, Cl and Br.

In an embodiment the liquid-crystalline medium contains the one or more compounds of formula I as set forth above and below in an amount, based on the overall contents of the medium, of at least 20% by weight, preferably at least 25% by weight, more preferably at least 30% by weight and in particular at least 35% by weight.

In an embodiment the one or more compounds of formula I are contained in the medium in an amount, based on the overall contents of the medium, in the range from 15% by weight to 75% by weight, more preferably from 20% by weight to 65% by weight, even more preferably from 20% by weight to 55% by weight and in particular from 25% by weight to 50% by weight.

The medium in the first switching layer thus preferably comprises at least one compound of formula I. In many cases it can however be beneficial and preferred that two, three or more compounds of formula I are contained in the medium.

Preferably the group A$^{11}$ as defined in formula I denotes

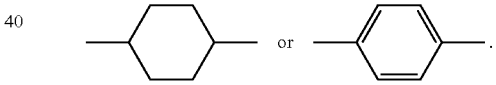

In another embodiment n as defined in formula I denotes 0.

In a preferred embodiment the one or more compounds of formula I are selected from compounds of formulae Ia, Ib and Ic, more preferably from compounds of formulae Ia and Ib

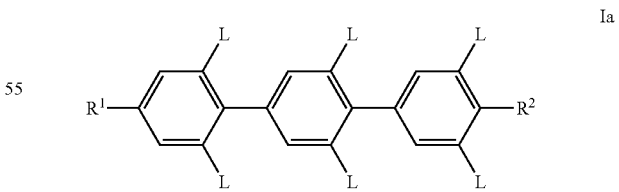 Ia

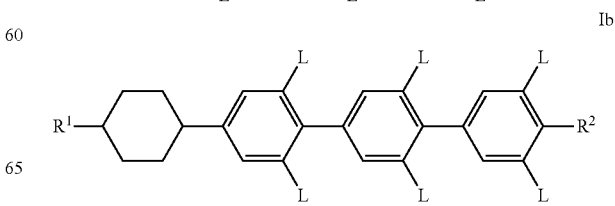 Ib

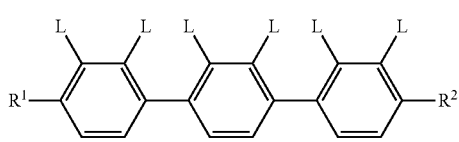

Ic wherein
- R¹ and R² denote, independently of one another, a group selected from F, Cl, CF₃, OCF₃, and straight-chain or branched alkyl or alkoxy having 1 to 15 carbon atoms or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO— or —C≡C— in such a manner that oxygen atoms are not linked directly to one another, preferably from F, CF₃, OCF₃, straight-chain alkyl or alkoxy having 1 to 9 carbon atoms or alkenyl having 2 to 9 carbon atoms, and
- L is on each occurrence, identically or differently, H or halogen selected from F, Cl and Br, preferably from F and Cl, and more preferably is on each occurrence, identically or differently, H or F.

It is particularly preferred that in case the phenylene rings of the compounds of formula I are substituted that the substituent(s) is (are) F, and furthermore that the terminal groups R¹ and R² do not contain Cl.

In a preferred embodiment the amount of Cl-containing compounds included in the medium is limited, preferably is limited to 55% by weight or less, based on the overall contents of the medium, more preferably to 40% by weight or less, and even more preferably to 25% by weight or less. In a particularly preferred embodiment the liquid-crystalline medium contains no Cl-containing compounds.

Accordingly it is also preferred to limit the amount of Cl-containing compounds in the component of the LC medium which consists of the compounds of formula I as set forth above and below, preferably to 55% by weight or less, based on the overall contents of compounds of formula I which are comprised in the medium, more preferably to 40% by weight or less, and even more preferably to 25% by weight or less. In a particularly preferred embodiment the one or more compounds of formula I are selected from compounds which do not contain Cl.

It is furthermore particularly preferred that at least one of the rings A²¹, A³¹ and A⁴¹ according to formula I has at least one F substituent. It is furthermore particularly preferred that the rings A²¹, A³¹ and A⁴¹ according to formula I together have at least two F substituents.

In the medium the use of compounds containing CN is preferably and favourably limited, preferably to 75% by weight or below, more preferably to 50% by weight or below, even more preferably to 25% by weight or below and in particular to 15% by weight or below, and in a particularly preferred embodiment is completely avoided.

In addition to the one or more compounds of formula I the liquid-crystalline medium in the first switching layer preferably contains one or more further mesogenic compounds. It is preferred that these additional compounds are also added in view of contributing to or maintaining the favourable properties of the medium, e.g. a good VHR and a favourable stability.

Preferably, the liquid-crystalline medium comprised in the first switching layer according to the invention further includes one or more mesogenic compounds selected from the group of compounds of formulae II and III

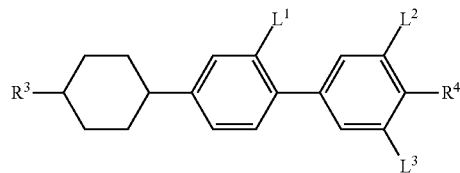

II

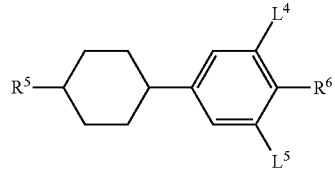

III wherein
- R³, R⁴, R⁵ and R⁶ denote, independently of one another, a group selected from F, CF₃, OCF₃, CN, and straight-chain or branched alkyl or alkoxy having 1 to 15 carbon atoms or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO—, —C≡C—,

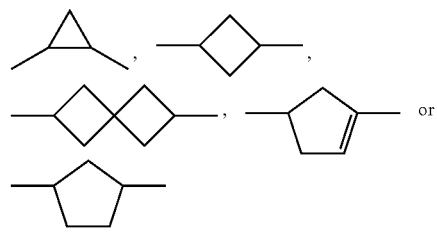

in such a manner that oxygen atoms are not linked directly to one another, and
- L¹, L², L³, L⁴ and L⁵ denote, independently of one another, H or F.

In an embodiment the liquid-crystalline medium comprises one or more mesogenic compounds of formula II.

In another embodiment the liquid-crystalline medium comprises one or more mesogenic compounds of formula III.

It is preferred that the medium contains, based on the overall contents of the medium, at least 15% by weight of one or more mesogenic compounds of formula I, optionally one or more photoinitiators, and one or more mesogenic compounds selected from the group of compounds of formulae II and III.

It is particularly preferred that the medium comprises one or more compounds of formula I, one or more compounds of formula II and one or more compounds of formula III as set forth above.

Preferably the liquid-crystalline medium in the first switching layer further comprises one or more compounds of formula IV

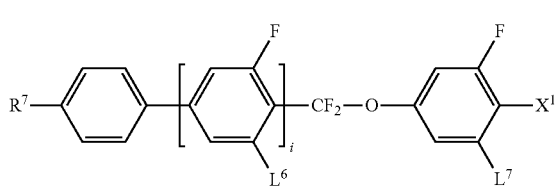

wherein
R⁷ denotes straight-chain or branched alkyl or alkoxy having 1 to 15 carbon atoms, preferably 1 to 7 carbon atoms, or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another,
i is 0, 1 or 2,
$L^6$ and $L^7$ are, independently of one another, H or F, and
$X^1$ denotes F, $CF_3$, $OCF_3$ or CN.

Compounds of formula II preferably are used in the medium in a total concentration from 1% by weight to 45% by weight, more preferably from 5% by weight to 25% by weight.

Compounds of formula III preferably are used in the medium in a total concentration from 1% by weight to 45% by weight, more preferably from 5% by weight to 25% by weight.

Compounds of formula IV preferably are used in the medium in a total concentration from 1% by weight to 45% by weight, more preferably from 5% by weight to 25% by weight.

It is particularly preferred that the medium comprises one or more compounds of formula I as set forth above and below, one or more compounds of formula II, one or more compounds of formula III and one or more compounds of formula IV.

In a particularly preferred embodiment one or more of the one or more compounds of formula I are selected from compounds of formulae I-1 and I-2

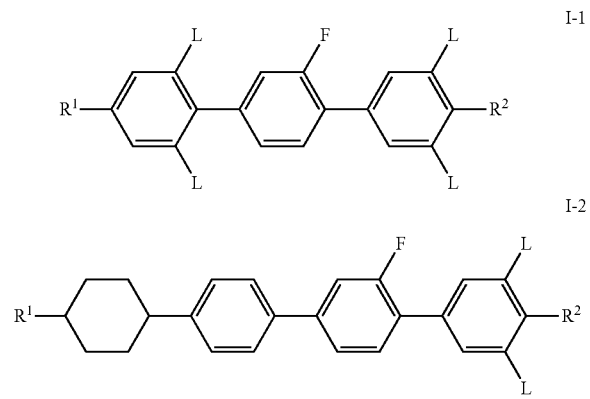

wherein
$R^1$ and $R^2$ are as defined for formula Ia above, and
L is on each occurrence, identically or differently, H or F.

Optionally the medium may comprise further liquid crystal compounds in order to adjust the physical properties. Such compounds are known in the field. The concentration of these optionally further included liquid crystal compounds in the medium is preferably from 0% by weight to 30% by weight, more preferably from 0.1% by weight to 20% by weight and most preferably from 1% by weight to 15% by weight.

In an embodiment a medium is provided which comprises one or more compounds of
PGP-n-m, PGP-n-mV, PGU-n-F, PGIGI-n-F, GGP-n-F, GGP-n-CI, in particular GGP-5-CI, CPGP-n-m, CPGP-n-OT, CPGU-n-OT, DPGU-n-F, and/or
CPP-n-m, CPG-n-F, CGU-n-F, BCH.n.F.F.F., in particular BCH.7.F.F.F, and/or
CP-n-m, CP-n-N, and/or
a compound of formula R-5011 or S-5011, and/or
one or more reactive polymerisable compounds, and/or
one or more polymerisation initiators,
wherein the meanings and structures of the respective abbreviations or acronyms are explained and illustrated in the Tables below.

The liquid-crystalline media as used according to the present invention may contain further additives in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is herein not taken into consideration for the values and ranges of the concentrations of the liquid crystal components and compounds of the liquid crystal media. Unless explicitly indicated otherwise, this also holds for the concentration of dichroic dyes optionally used in the mixtures, which are not counted when the concentrations of the compounds respectively the components of the host mixture are specified. The concentration of the respective additives is always given relative to the final doped mixture.

Herein, unless explicitly stated otherwise, all concentrations are given in weight percent.

The liquid-crystalline media as used according to the present invention consist of several compounds, preferably of 3 to 30, more preferably of 4 to 20, and most preferably of 4 to 16 compounds. These compounds are mixed in a conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle systems, the constituents of which are ready to use mixtures themselves.

Many of the mesogenic compounds or mixtures thereof described above and below are commercially available. These compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail. The media according to the invention are prepared in a manner conventional per se. In general, the components are dissolved in one another, preferably at elevated temperature. Suitable additives or substances can be added to modify the dielectric anisotropy, the viscosity and/or the alignment of the liquid-crystalline phases.

The medium may further comprise customary additives such as stabilizers, antioxidants, free radical scavengers, chain transfer agents, e.g. thioethers, and/or plasticizers.

It is furthermore preferred that the medium contains one or more compounds selected from the compounds designated as PCH-n as shown in Table D, in particular selected from PCH-3, PCH-5 and PCH-7.

The term "alkyl" according to the present invention preferably encompasses straight-chain and branched alkyl groups having 1 to 7 carbon atoms, particularly the straight-chain groups methyl, ethyl, propyl, butyl, pentyl, hexyl and heptyl. Groups having 2 to 5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" according to the present invention preferably encompasses straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1E-alkenyl, $C_4$-$C_7$-3E-alkenyl and $C_5$-$C_7$-4E-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OCSF_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$. Fluoroalkyl in a preferred embodiment encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula $C_nH_{2n+1}$—O—$(CH_2)_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above mentioned groups is an alkyl group in which one $CH_2$ group has been replaced by —CH=CH—, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above mentioned groups is an alkyl group in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonyl-methyl, propoxycarbonylmethyl, butoxycarbonylmethyl, 2-(meth-oxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxy-carbonyl)butyl.

If one of the above mentioned groups is an alkyl group in which one $CH_2$ group has been replaced by unsubstituted or substituted —CH=CH— and an adjacent $CH_2$ group has been replaced by CO, CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxy-octyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above mentioned groups is an alkyl or alkenyl group which is monosubstituted by CN or $CF_3$, this group is preferably straight-chain. The substitution by CN or $CF_3$ is in any position.

If one of the above mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the ω-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above mentioned groups is an alkyl group in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxycarbonyl)-hexyl, 7,7-bis (methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxy-carbonyl)propyl, 4,4-bis(ethoxycarbonyl) butyl or 5,5-bis(ethoxycarbonyl)-pentyl.

Favourably the liquid-crystalline medium in the first switching layer can have a suitably high optical anisotropy $\Delta n$, which is also known as the birefringence. In a preferred embodiment the liquid-crystalline medium comprised in the first switching layer exhibits an optical anisotropy $\Delta n$, determined at 20° C. and 589 nm, of 0.13 or more, more preferably of 0.16 or more and even more preferably of 0.20 or more.

Above and below, $\Delta n$ denotes the optical anisotropy, wherein $\Delta n = n_e - n_o$, and the optical anisotropy $\Delta n$ is determined at 20° C. and a wavelength of 589.3 nm.

In addition to a suitably high optical anisotropy, the liquid-crystalline medium comprised in the first switching layer according to the invention can advantageously exhibit a favourably high voltage holding ratio (VHR) in combination with good light stability and a suitably high clearing point.

Using reactive mesogens, in particular at the low amounts as specified, and preferably using chiral dopant having a high HTP, which can allow the use in low concentrations, can advantageously contribute to maintaining a favourably high clearing point.

The liquid-crystalline medium in the first switching layer is a cholesteric or chiral nematic medium. Cholesteric liquid crystals (CLCs) usually contain a medium which has, for example, in the initial state a planar structure which reflects light having a certain wavelength, and which can be switched into a focal conic, light-scattering structure by application of an electrical alternating-voltage pulse, or vice versa. On application of a stronger voltage, in particular a stronger voltage pulse, the CLC medium can be switched into a homeotropic, transparent state, from which it relaxes into the planar state after rapid switching-off of the voltage or into the focal conic state after slow switching-off.

In the planar texture Bragg reflection occurs, where the reflected light has the same handedness as the cholesteric helix.

In the focal conic state, the helical axes are randomly arranged and the texture shows light scattering because of the discontinuous spatial variations of the refractive indices at the domain boundaries.

Both planar and focal conic configurations are typically stable in the absence of an external electric field. The effect of electric-field-driven textural transitions between planar and focal conic states forms the basis of operation of CLC displays, wherein when the texture of the CLC is switched from the planar to the focal conic texture, the Bragg reflection disappears and the CLC scatters the incident light due to the helical axes being randomly distributed However, the switching between the states is typically achieved only through the homeotropic state, where the cholesteric helix is completely unwound by a dielectric coupling between LC molecules with positive dielectric anisotropy ($\Delta\varepsilon > 0$) and a vertical electric field.

In an embodiment according to the invention the scattering state of the switching layer can be the focal conic state described above.

Alternatively, and according to a preferred embodiment, in the present invention the scattering state is formed by a polydomain structure. Preferably this polydomain structure can produce sufficiently strong scattering, while at the same time Bragg-type reflection behaviour still remains observable, at least to some extent. In this phase which comprises, preferably consists of, polydomains the orientation of the helical axis typically varies from domain to domain, and domain boundaries typically occur. Macroscopically however the phase can appear homogeneous, in particular homogeneously opaque or hazy to the human eye, and be free from visible defects over the entire layer area.

The polydomain structure is obtainable, for example, using conventional orientation layers oriented in a planar or homeotropic manner and advantageously switching to the polydomain state may be achievable at a comparatively low voltage. The polydomain structure is however also obtainable when orientation layers are not present.

In addition, the presence of the polymeric component in the first switching layer can favourably influence and stabilize the scattering performance.

In a preferred embodiment the non-scattering or clear state can be formed by the homeotropic state described above. Using this clear state may for example be favourable when an element with a large area is used. In this respect the advantageously high VHR that is presently obtainable can be useful in stabilizing the element in this state against self-discharging behaviour and thus allowing to sustain the state even with significantly lower refresh rates and/or lower power consumption.

Alternatively, the non-scattering or clear state can be formed by the planar texture described above.

Using the chiral nematic or cholesteric medium can be beneficial in that relatively stable states, and even bistability, can be provided such that devices comprising the medium may consume less energy. In particular, a respective state may be retained, at least for a considerable time, after the electric field has been switched off, and less frequent addressing or refreshing of voltage may be possible.

In a preferred embodiment the first switching layer is switchable into an optically transparent state by applying an AC voltage $V_i$ and is switchable into a scattering state by applying an AC voltage $V_{ii}$, wherein $V_i > V_{ii}$.

In an embodiment the switched clear state of the first switching layer, in particular a state having a homeotropic alignment, is maintained by applying a voltage in the range of 15 V to 100 V, more preferably 20 V to 80 V, and in particular 25 V to 50 V, while the switched scattering state of the first switching layer may be stable, at least for some time, even at 0 V.

Preferably the switching of the first switching layer does not use dual frequency addressing, which can simplify the required electronics.

As described above, the liquid-crystalline medium preferably exhibits a selective reflection with a wavelength of greater than 780 nm. Accordingly the medium preferably reflects in the near infrared (NIR) spectral region.

Chiral compounds and in particular chiral dopants and their concentrations can be provided such that the cholesteric pitch of the liquid-crystalline medium is suitably set or adjusted. A CLC medium can be prepared, for example, by doping a nematic LC medium with a chiral dopant having a high twisting power. The pitch p of the induced cholesteric helix is then given by the concentration c and the helical twisting power HTP of the chiral dopant in accordance with equation (1):

$$p = (HTPc)^{-1} \qquad (1)$$

It is also possible to use two or more dopants, for example in order to compensate for the temperature dependence of the HTP of the individual dopants and thus to achieve small temperature dependence of the helix pitch and the reflection wavelength of the CLC medium. For the total HTP ($HTP_{total}$) then approximately equation (2) holds:

$$HTP_{total} = \Sigma_i c_i HTP_i \qquad (2)$$

wherein $c_i$ is the concentration of each individual dopant and $HTP_i$ is the helical twisting power of each individual dopant.

The liquid-crystalline medium in the first switching layer contains one or more chiral compounds and in particular chiral dopants. The chiral dopants preferably have a high absolute value of the HTP and can generally be added in relatively low concentrations to mesogenic base mixtures and have good solubility in the achiral component. If two or more chiral compounds are employed, they may have the same or opposite direction of rotation and the same or opposite temperature dependence of the twist.

Preferably, the one or more chiral compounds contained in the liquid-crystalline medium comprised in the first switching layer have an absolute value of the helical twisting power of 5 $\mu m^{-1}$ or more, more preferably of 10 $\mu m^{-1}$ or more and even more preferably of 15 $\mu m^{-1}$ or more, preferably in the commercial liquid-crystal mixture MLC-6828 from Merck KGaA. Particular preference is given to chiral compounds having an absolute value of the helical twisting power (HTP) of 20 $\mu m^{-1}$ or more, more preferably of 40 $\mu m^{-1}$ or more, even more preferably of 60 $\mu m^{-1}$ or more, and most preferably in the range of 80 $\mu m^{-1}$ or more to 260 $\mu m^{-1}$ or less, preferably in the commercial liquid-crystal mixture MLC-6828 from Merck KGaA.

Preferably the one or more chiral compounds are contained in the liquid-crystalline medium in an amount, based on the overall contents of the medium, of 2% by weight or less, more preferably 1% by weight or less.

In a preferred embodiment of the present invention, the chiral component consists of two or more chiral compounds which all have the same sign of the HTP. The temperature dependence of the HTP of the individual compounds may be high or low. The temperature dependence of the pitch of the medium can be compensated by mixing compounds having different temperature dependence of the HTP in corresponding ratios.

Suitable chiral dopants are known in the art, some of which are commercially available, such as, for example, cholesteryl nonanoate, R/S-811, R/S-1011, R/S-2011, R/S-3011, R/S-4011, B(OC)2C*H—C-3 or CB15 (all Merck KGaA, Darmstadt, Germany).

Particularly suitable chiral dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4: 3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, wherein one or more $CH_2$ groups are substituted by alkyl or alkoxy; amino acids, such as, for example, alanine, valine, phenylglycine or phenylalanine, or sequences of from 2 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820.

Preferable chiral compounds used according to the present invention are selected from the following groups of compounds.

In an embodiment preference is given to dopants selected from the group consisting of compounds of the following formulae A-I to A-III:

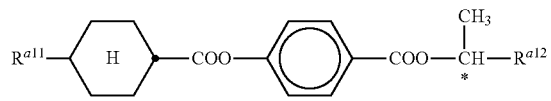

A-I

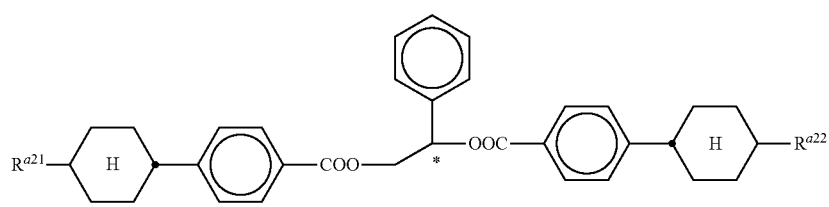

A-II

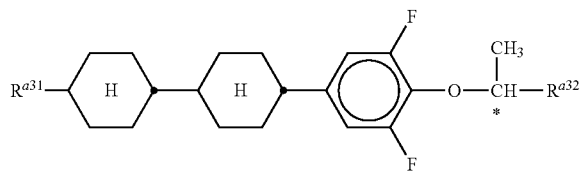

A-III in which
- $R^{a11}$ and $R^{a12}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl,
- $R^{a21}$ and $R^{a22}$, independently of one another, are alkyl or alkoxy having from 1 to 9, preferably up to 7, carbon atoms, oxaalkyl, alkenyl or alkenyloxy having from 2 to 9, preferably up to 7, carbon atoms, preferably both are alkyl, preferably n-alkyl,
- $R^{a31}$ and $R^{a32}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl.

Particular preference is given to chiral dopants selected from the group consisting of the compounds of the following formulae:

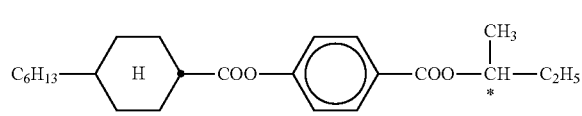

A-I-1

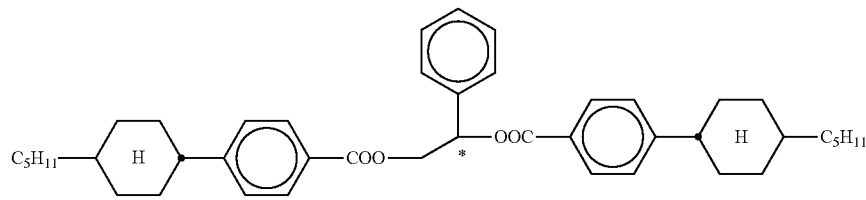

A-II-1

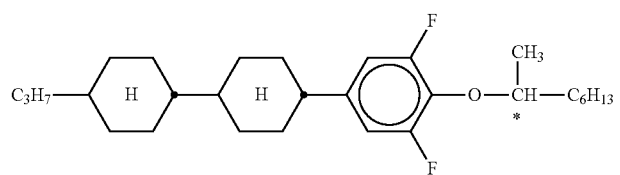

A-III-1

Further preferred dopants are derivatives of isosorbide, isomannitol or isoiditol of the following formula A-IV

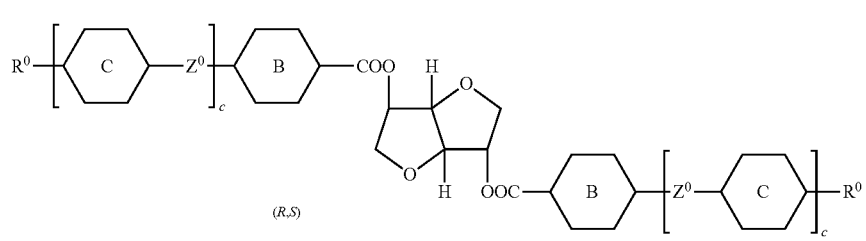

A-IV in which the group

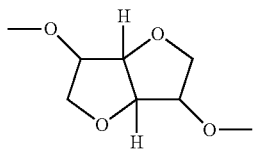

is

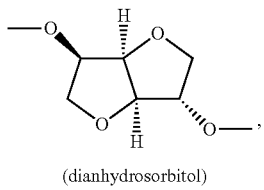
(dianhydrosorbitol)

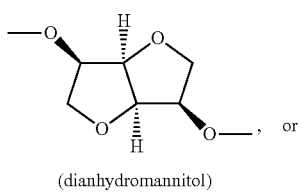
(dianhydromannitol) or

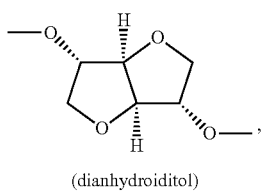
(dianhydroiditol)

preferably dianhydrosorbitol,
and chiral ethanediols, such as, for example, diphenylethanediol (hydrobenzoin), in particular mesogenic hydrobenzoin derivatives of the following formula A-V in which

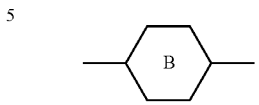

and

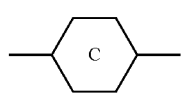

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1-12 carbon atoms.

Compounds of formula A-IV are described in WO 98/00428. Compounds of the formula A-V are described in GB-A-2,328,207.

In another embodiment particularly preferred chiral dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one

A-V

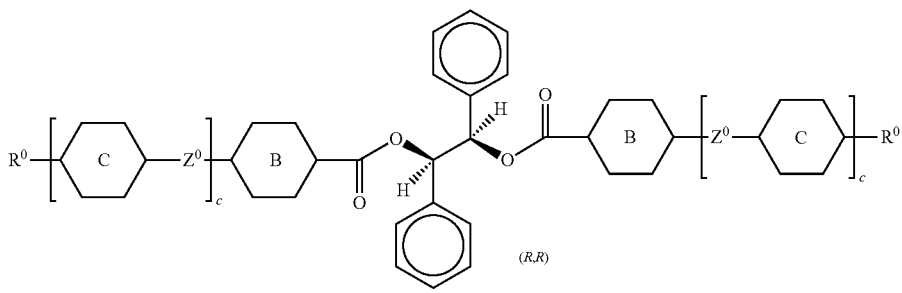

including the (R,S), (S,R), (R,R) and (S,S) enantiomers, which are not shown, fluorinated bridging group and a terminal or central chiral group, as described in WO 02/06196 and WO 02/06195.

Particular preference is given to chiral compounds of formula A-VI

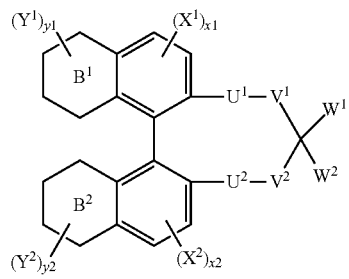

A-VI in which

X$^1$, X$^2$, Y$^1$ and Y$^2$ are each, independently of one another, F, Cl, Br, I, CN, SCN, SF$_5$, straight-chain or branched alkyl having from 1 to 25 carbon atoms, which may be monosubstituted or polysubstituted by F, Cl, Br, I or CN and in which, in addition, one or more non-adjacent CH$_2$ groups may each, independently of one another, be replaced by —O—, —S—, —NH—, NR$^0$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group, x$^1$ and x$^2$ are each, independently of one another, 0, 1 or 2, y$^1$ and y$^2$ are each, independently of one another, 0, 1, 2, 3 or 4, B$^1$ and B$^2$ are each, independently of one another, an aromatic or partially or fully saturated aliphatic six-membered ring in which one or more CH groups may be replaced by N atoms and one or more non-adjacent CH$_2$ groups may be replaced by O and/or S, W$^1$ and W$^2$ are each, independently of one another, —Z$^1$-A$^1$-(Z$^2$-A$^2$)$_m$-R, and one of the two is alternatively R$^1$ or A$^3$, but both are not simultaneously H, or

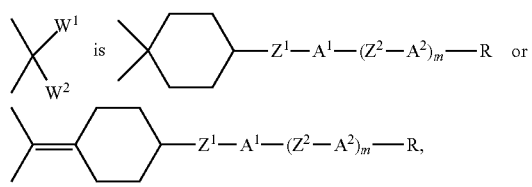

U$^1$ and U$^2$ are each, independently of one another, CH$_2$, O, S, CO or CS,

V$^1$ and V$^2$ are each, independently of one another, (CH$_2$)$_n$, in which from one to four non-adjacent CH$_2$ groups may be replaced by O and/or S, and one of V$^1$ and V$^2$ and, in the case where

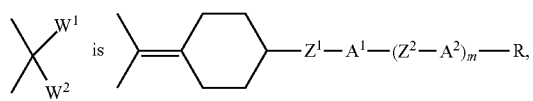

both are a single bond,

Z$^1$ and Z$^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, A$^1$, A$^2$ and A$^3$ are each, independently of one another, 1,4-phenylene, in which one or two non-adjacent CH groups may be replaced by N, 1,4-cyclohexylene, in which one or two non-adjacent CH$_2$ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition A$^1$ is a single bond, L is a halogen atom, preferably F, CN, NO$_2$, alkyl, alkoxy, alkylcarbonyl, alkoxycarbonyl or alkoxycarbonyloxy having 1-7 carbon atoms, in which one or more H atoms may be replaced by F or Cl, m is in each case, independently, 0, 1, 2 or 3, and R and R$^1$ are each, independently of one another, H, F, Cl, Br, I, CN, SCN, SF$_5$, straight-chain or branched alkyl having from 1 or 3 to 25 carbon atoms respectively, which may optionally be monosubstituted or polysubstituted by F, Cl, Br, I or CN, and in which one or more non-adjacent CH$_2$ groups may be replaced by —O—, —S—, —NH—, —NR$^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

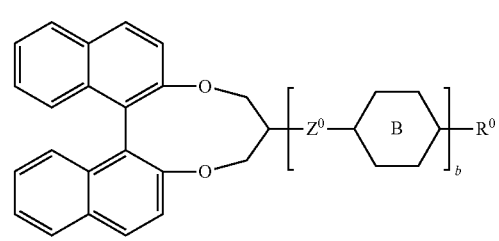

A-VI-1 in particular those selected from the following formulae A-VI-1a to A-VI-1c:

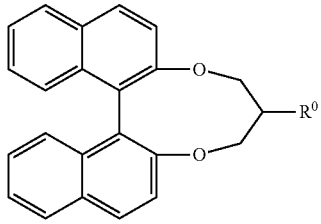
A-VI-1a

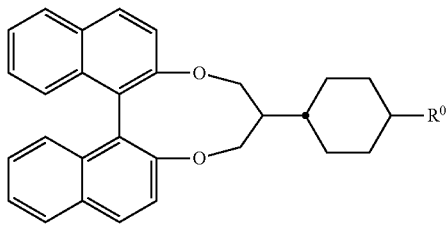
A-VI-1b

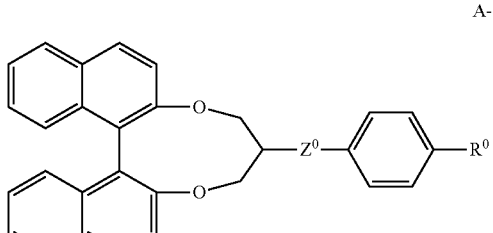
A-VI-1c in which B and $Z^0$ are as defined for formula A-IV, and $Z^0$ more preferably is —OCO— or a single bond,
$R^0$ is as defined for formula A-IV or H or alkyl having from 1 to 4 carbon atoms, and
b is 0, 1 or 2.

Particular preference is furthermore given to chiral binaphthyl derivatives of the formula A-VI-2

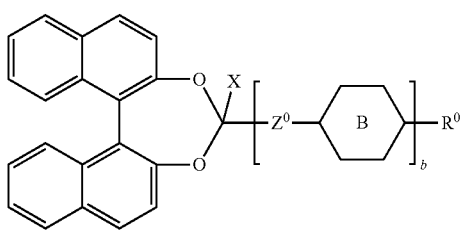
A-VI-2 in particular to those selected from the following formulae A-VI-2a to A-VI-2f:

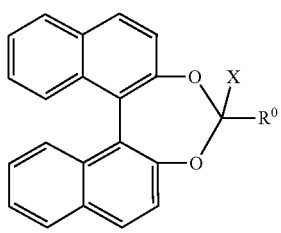
A-VI-2a

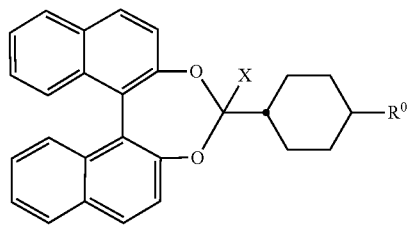
A-VI-2b

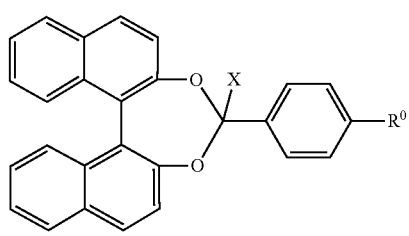
A-VI-2c

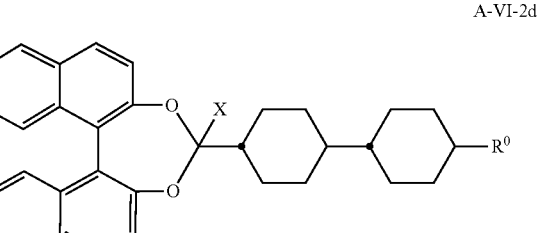
A-VI-2d

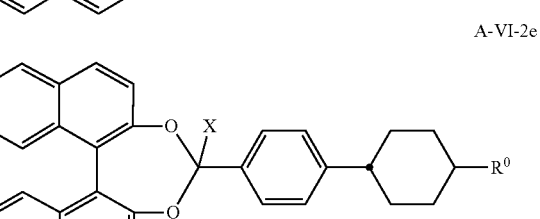
A-VI-2e

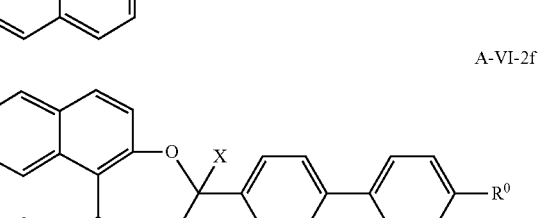
A-VI-2f in which $R^0$ is as defined for formula A-VI, and X is H, F, Cl, CN or $R^0$, preferably F.

In a particularly preferred embodiment, the chiral medium contained in the first switching layer comprises one or more compounds of formula R-5011 and S-5011 which are shown in Table F below. In an embodiment the medium contains R-5011. In another embodiment the medium contains S-5011.

The LC medium contained in the first switching layer preferably and favourably exhibits a high reliability and a high electric resistivity. The LC medium contained in the first switching layer also preferably and favourably exhibits a high voltage holding ratio (VHR), see S. Matsumoto et al., Liquid Crystals 5, 1320 (1989); K. Niwa et al., Proc. SID Conference, San Francisco, June 1984, p. 304 (1984); T. Jacob and U. Finkenzeller in "Merck Liquid Crystals—

Physical Properties of Liquid Crystals", 1997. The VHR of an LC medium according to the invention is preferably ≥85%, more preferably ≥90%, even more preferably ≥95% and particularly preferably ≥98%. Unless described otherwise, the measurement of the VHR is carried out as described in T. Jacob, U. Finkenzeller in "Merck Liquid Crystals—Physical Properties of Liquid Crystals", 1997.

It is preferred that the polymeric component comprised in the first switching layer contains one or more polymeric structures obtained by or respectively obtainable from polymerisation of one or more polymerisable mesogenic compounds. Preferably, one or more of the one or more polymerisable mesogenic compounds comprise one, two or more acrylate and/or methacrylate groups.

Preferably, one or more polymerisable, curable or hardenable compounds are provided, preferably one or more photocurable monomers, as the precursors for the polymeric component in the first switching layer in a liquid-crystalline medium and are subsequently polymerised in situ.

Preferably, reactive mesogens (RMs) or mesogenic monomers are used, which contain a mesogenic group and one or more polymerisable groups, i.e. functional groups which are suitable for polymerisation.

It is preferred that the polymerisable compound(s) used include(s) only reactive mesogen(s), i.e. all the reactive monomers are mesogens. Alternatively, RMs can be provided in combination with one or more non-mesogenic polymerisable compounds. The RMs can be monoreactive and/or di- or multireactive.

It is particularly preferred that one or more of the one or more polymerisable mesogenic compounds are selected from the compounds of the formula M

in which the individual radicals are defined as follows:

$R^{Ma}$ and $R^{Mb}$ are each independently P, P-Sp-, H, F, Cl, Br, I, —CN, —NO$_2$, —NCO, —NCS, —OCN, —SCN, SF$_5$ or straight-chain or branched alkyl having 1 to 25 carbon atoms, in which one or more non-adjacent CH$_2$ groups may each independently also be replaced by —C(R$^0$)=C(R$^{00}$)—, —C≡C—, —N(R$^{00}$)—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, Br, I, CN, P or P-Sp-, where preferably at least one of the $R^{Ma}$ and $R^{Mb}$ radicals is or contains a P or P-Sp- group, preferably $R^{Ma}$ and $R^{Mb}$ are each independently P, P-Sp-, H, halogen, SF$_5$, NO$_2$, an alkyl, alkenyl or alkynyl group, where preferably at least one of the $R^{Ma}$ and $R^{Mb}$ radicals is or contains a P or P-Sp- group, P is a polymerisable group, Sp is a spacer group or a single bond, $A^{M1}$ and $A^{M2}$ are each independently an aromatic, heteroaromatic, alicyclic or heterocyclic group, preferably having 4 to 25 ring atoms, preferably carbon atoms, which also comprises or may contain fused rings, and which may optionally be mono- or polysubstituted by L, L is P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 carbon atoms, or straight-chain or branched alkyl, alkoxy, alkylcarbonyl, alkoxycarbonyl, alkylcarbonyloxy or alkoxycarbonyloxy having 1 to 25 carbon atoms or alkenyl or alkynyl having 2 to 25 carbon atoms, in which one or more hydrogen atoms may also be replaced by F, Cl, P or P-Sp-, preferably P, P-Sp-, H, OH, CH$_2$OH, halogen, SF$_5$, NO$_2$, an alkyl, alkenyl or alkynyl group, $Y^1$ is halogen, preferably F, $Z^{M1}$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, $R^0$ and $R^{00}$ are each independently H or alkyl having 1 to 12 carbon atoms, $R^x$ is P, P-Sp-, H, halogen, straight-chain, branched or cyclic alkyl having 1 to 25 carbon atoms, in which one or more non-adjacent CH$_2$ groups may also be replaced by —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, P or P-Sp-, an optionally substituted aryl or aryloxy group having 6 to 40 carbon atoms, or an optionally substituted heteroaryl or heteroaryloxy group having 2 to 40 carbon atoms, m1 is 0, 1, 2, 3 or 4, and n1 is 1, 2, 3 or 4, where at least one substituent, preferably one, two or three substituents and more preferably one or two substituents from the group of $R^{Ma}$, $R^{Mb}$ and the substituent L present is a P or P-Sp- group or contains at least one P or P-Sp- group.

Particular preference is given to compounds of the formula M in which one of $R^{ma}$ and $R^{mb}$ or both are P or P-Sp-.

Suitable and preferred RMs for use in the liquid-crystalline media are, for example, selected from the following formulae:

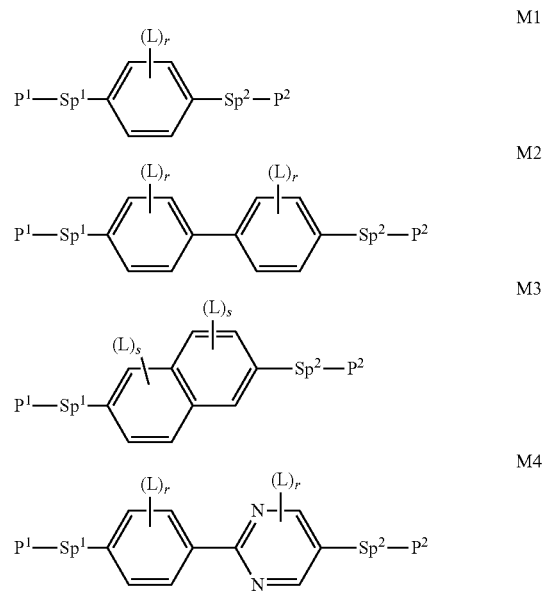

M5
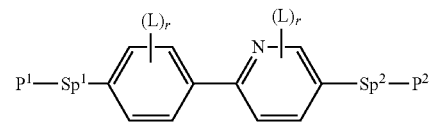
M6
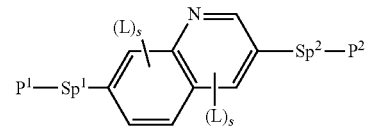
M7
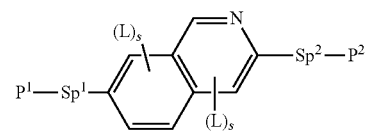
M8
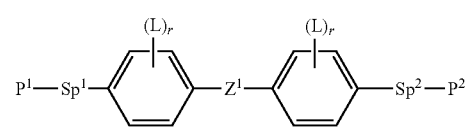
M9
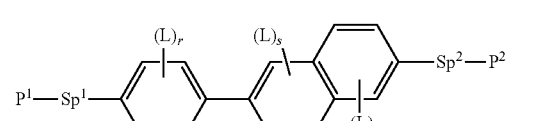
M10
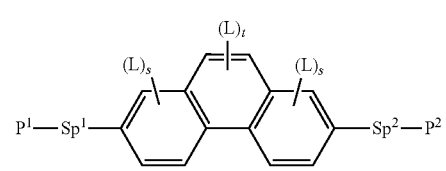
M11
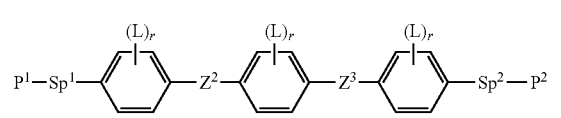
M12
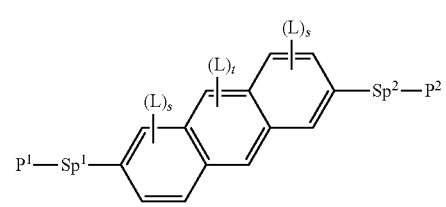
M13
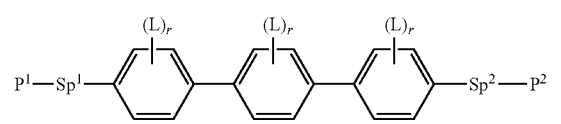
M14
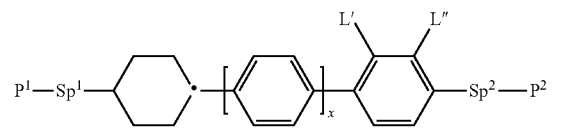
M15
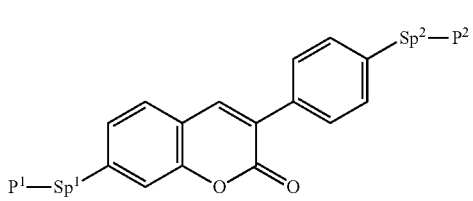
M16
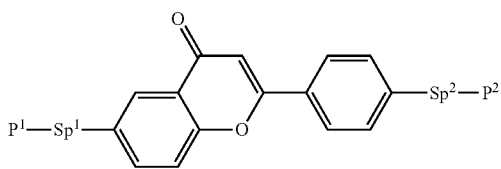
M17
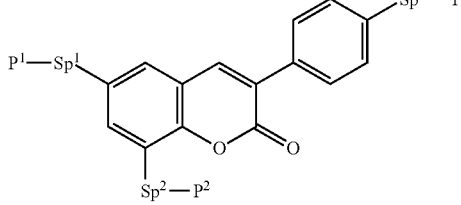
M18
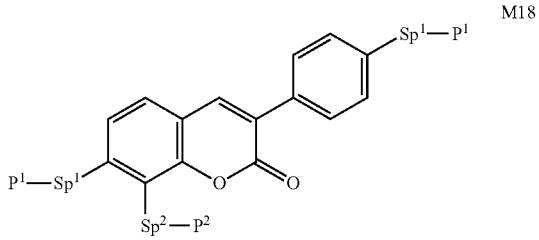
M19
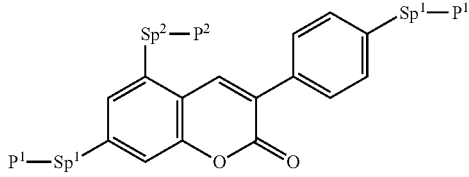
M20
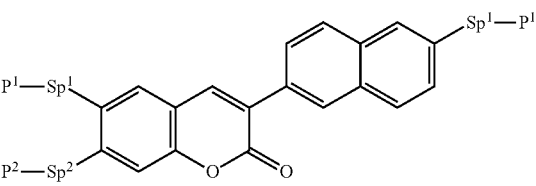
M21
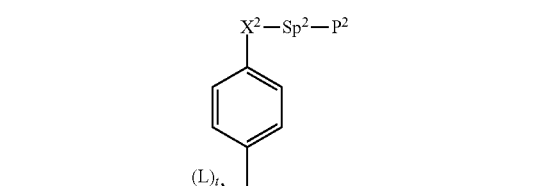

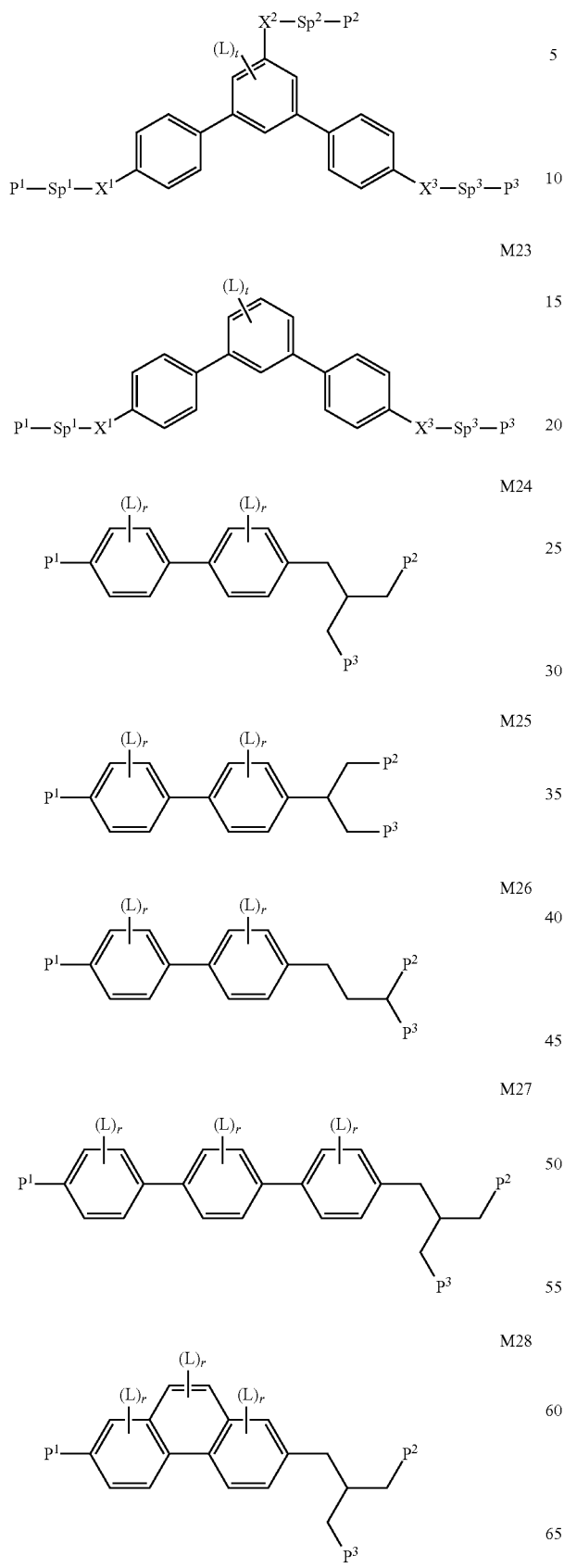
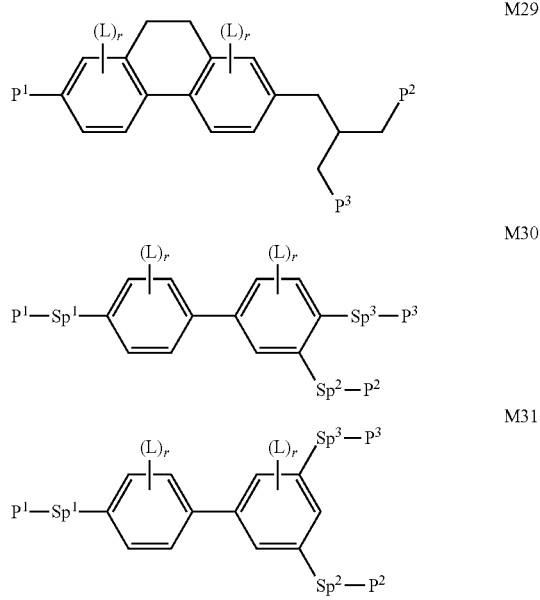

in which the individual radicals are defined as follows:

$P^1$ to $P^3$ are each independently a polymerisable group, preferably having one of the definitions specified above and below for P, more preferably an acrylate, methacrylate, fluoroacrylate, oxetane, vinyloxy or epoxy group, $Sp^1$ to $Sp^3$ are each independently a single bond or a spacer group, preferably having one of the definitions of Sp given above and below, and more preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the bond to the adjacent ring in the latter groups is via the oxygen atom, where one of the $P^1$-$Sp^1$-, $P^2$-$Sp^2$- and $P^3$—$Sp^3$- radicals may also be $R^{aa}$, $R^{aa}$ is H, F, Cl, CN or straight-chain or branched alkyl having 1 to 25 carbon atoms, in which one or more non-adjacent $CH_2$ groups may each independently also be replaced by $C(R^0)=C(R^{00})$—, —C≡C—, —N($R^0$)—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, CN or $P^1$—$Sp^1$-, more preferably straight-chain or branched, optionally mono- or polyfluorinated alkyl, alkoxy, alkenyl, alkynyl, alkylcarbonyl, alkoxycarbonyl, or alkylcarbonyloxy having 1 to 12 carbon atoms (where the alkenyl and alkynyl radicals have at least two and the branched radicals at least three carbon atoms), $R^0$ and $R^{00}$ are the same or different at each instance and are each independently H or alkyl having 1 to 12 carbon atoms, $R^y$ and $R^z$ are each independently H, F, $CH_3$ or $CF_3$, $Z^1$ is —O—, —CO—, —C($R^yR^z$)— or —$CF_2CF_2$—, $Z^2$ and $Z^3$ are each independently —CO—O—, —O—CO—, —$CH_2$O—, —O$CH_2$—, —$CF_2$O—, —O$CF_2$— or —$(CH_2)_n$—, where n is 2, 3 or 4, L is the same or different at each instance and has the meaning given under formula M above, preferably is F, Cl, CN, or straight-chain or branched, optionally monoor polyfluorinated alkyl, alkoxy, alkenyl, alkynyl, alkylcarbonyl, alkoxycarbonyl or alkylcarbonyloxy having 1 to 12 carbon atoms, preferably F, L' and L" are each independently H, F or Cl, $X^1$ to $X^3$ are independently of one another —CO—O—, —O—CO— or a single bond, r is 0, 1, 2, 3 or 4, s is 0, 1, 2 or 3, t is 0, 1 or 2, and x is 0 or 1.

Suitable polymerisable compounds are listed, for example, in Table G. Particularly preferred reactive mesogens are compounds of formulae RM-A as well as RM-B and RM-C as shown respectively in Comparative Example 3 and Example 2.

The polymerisable compounds have at least one polymerisable group. The polymerisable group is preferably selected from $CH_2=CW^1$—COO—,

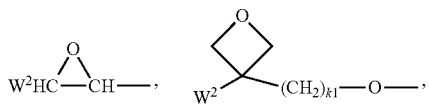

$CH_2=CW^2$—(O)$_{k1}$—, $CH_3$—CH=CH—O—, $(CH_2=CH)_2$ CH—OCO—, $(CH_2=CH$—$CH_2)_2$CH—OCO—, $(CH_2=CH)_2$CH—O—, $(CH_2=CH$—$CH_2)_2$N—, HO—$CW^2W^3$—, HS—$CW^2W^3$—, $HW^2$N—, HO—$CW^2W^3$—NH—, $CH_2=CW^1$—CO—NH—, $CH_2=CH$—(COO)$_{k1}$-Phe-(O)$_{k2}$—, Phe-CH=CH—, HOOC—, OCN—, with $W^1$ being H, Cl, CN, phenyl or alkyl with 1 to 5 C atoms, in particular H, Cl or $CH_3$, $W^2$ and $W^3$ being independently of each other H or alkyl with 1 to 5 C atoms, in particular H, methyl, ethyl or n-propyl, Phe being 1,4-phenylene and $k_1$ and $k_2$ being independently of each other 0 or 1. The polymerisable or reactive group is preferably selected from a vinyl group, an acrylate group, a methacrylate group, a fluoroacrylate group, an oxetane group or an epoxy group, especially preferably an acrylate group or a methacrylate group.

In an embodiment, non-mesogenic monomers are included in the medium in addition to one or more RMs. Preferably, one or more polymerisable compounds, either the non-mesogenic monomers or the RMs or both, are selected from acrylates, methacrylates, fluoroacrylates and vinyl acetate, wherein the composition more preferably further comprises one or more direactive and/or trireactive polymerisable compounds, preferably selected from diacrylates, dimethacrylates, triacrylates and trimethacrylates.

In a particular embodiment one or more non-mesogenic monoacrylates are provided, particularly preferably one or more compounds selected from methyl acrylate, ethyl acrylate, propyl acrylate, isopropyl acrylate, butyl acrylate, t-butyl acrylate, pentyl acrylate, hexyl acrylate, nonyl acrylate, 2-ethylhexyl acrylate, 2-hydroxyethyl acrylate, 2-hydroxy-butyl acrylate and isobornyl acrylate.

Additionally or alternatively one or more non-mesogenic monomethacrylates may be provided, particularly preferably one or more compounds selected from methyl methacrylate, ethyl methacrylate, propyl methacrylate, ispropyl methacrylate, butyl methacrylate, t-butyl methacrylate, pentyl methacrylate, hexyl methacrylate, nonyl methacrylate, dodecyl methacrylate, 2-ethyl-hexyl methacrylate, 2-hydroxy-ethyl methacrylate, 2-hydroxy-butyl methacrylate, isobornyl methacrylate and 1-adamantyl methacrylate.

It is particularly preferred that at least one crosslinking agent is added to polymerisable composition, i.e. a polymerisable compound containing two or more polymerisable groups, wherein preferably di- or multireactive RMs are used.

In this respect direactive and multireactive compounds can serve to form polymer networks of their own and/or to crosslink polymer chains formed substantially from polymerising monoreactive compounds.

Alternatively or additionally, conventional crosslinkers known in the art can be used. It is particularly preferred to additionally provide direactive or multireactive acrylates and/or methacrylates. Particularly preferred compounds are selected from ethylene diacrylate, propylene diacrylate, butylene diacrylate, pentylene diacrylate, hexylene diacrylate, glycol diacrylate, glycerol diacrylate, pentaerythritol tetraacrylate, ethylene dimethacrylate, also known as ethyleneglycol dimethacrylate, propylene diamethcrylate, butylene dimethacrylate, pentylene dimethacrylate, hexylene dimethacrylate, tripropylene glycol diacrylate, glycol dimethacrylate, glycerol dimethacrylate, trimethylpropane trimethacrylate and pentaerythritol triacrylate.

The ratio of monoreactive monomers and di- or multireactive monomers can be favourably set and adjusted to influence the properties of the polymeric component to be formed.

Suitable and conventionally used thermal initiators or photoinitiators can be added to facilitate the polymerisation reaction, for example azo compounds or organic peroxides such as Luperox type initiators. Moreover, suitable conditions for the polymerisation and suitable types and amounts of initiators are known in the art and are described in the literature. In case a polymerisation initiator is included in the medium, the use of a photoinitiator is preferred.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure®, e.g. Irgacure 651 (available from BASF, containing 2,2-dimethoxy-1,2-diphenyl ethan-1-one), or Darocure® (Ciba Geigy AG, Basel, Switzerland). A typical cationic photoinitiator is for example UVI 6974 (Union Carbide). Further useful photoiniators include a-aminoketones, e.g. Irgacure 907, coumarins, phosphine oxides, e.g. Irgacure 2100, acyl phosphines, e.g. Irgacure 819.

In a particular embodiment the added polymerisation initiator, preferably photoinitiator, comprises, preferably consists of, one or more mesogenic polymerisation initiators, preferably one or more mesogenic photoinitiators, i.e. one or more reactive compounds which can initiate polymerisation and which themselves have anisotropic and mesogenic properties.

However, according to a particularly preferred embodiment no polymerisation initiator, in particular no photoinitiator, is used. In certain cases this may improve the VHR and reduce the tendency to produce ions in the switching layer.

In order to maintain and achieve a good VHR, preferably impurities in the reaction products of the polymerisation are kept at a minimum or are substantially avoided. In particular, residual reactive species and charged contaminants are suitably and preferably kept at a minimum. For example, in case UV polymerisation is carried out, in a preferred embodiment light with a comparatively long wavelength which is approaching the visible spectrum is used, preferably UV light in the range from 340 nm to 380 nm, and even more preferably from 360 nm to 380 nm is advantageously used. This way unwanted photodegradation or decomposition of components of the LC medium may be avoided or at least minimized. In case a photoinitiator is used, the irradiation wavelength and the photoinitiator can be suitably matched or adjusted.

In an alternative case where no photoinitiator is used, which in some embodiments is preferable, the irradiation wavelength range may be set such that at least some of the polymerisable compounds can undergo a photoreaction and initiate the polymerisation reaction by themselves, while furthermore degradation or decomposition of non-reactive components of the LC medium may be avoided or at least minimized. Obtaining and setting of the desired wavelength range can be achieved by conventional methods known in the art, e.g. by using optical filters, in particular edge filters.

It has surprisingly been found that the polymeric structures can be favourably produced in situ by providing and polymerising the one or more polymerisable compounds and in particular polymerisable mesogenic compounds as set forth above and below in the medium.

The polymerisable compounds in the medium may be chosen such that after the polymerisation a stable system is obtained, which e.g. can be stable in further processing steps such as thermal heating steps, wherein a good VHR may be maintained.

Furthermore, only a relatively small amount of (a) polymerisable compound(s) is used to form the polymeric component, and in particular a polymeric network, in the first switching layer, which can favourably influence the stability and minimized unwanted degradation.

The provision of the polymeric component may be useful in stabilizing one or more states or phases of the LC medium.

The polymeric component can contribute to the advantageous properties of the obtainable material in the first switching layer. For example, the polymeric component may contribute to a significantly more stable scattering state, in particular the polydomain state, such that this scattering state may be maintained for more extended periods of time, in particular up to days, without refreshing or reapplying voltage.

Furthermore, the polymeric component as provided in the material which contains the CLC medium according to the invention can favourably influence the scattering efficiency and appearance, e.g. in terms of uniformity and viewing angle dependence. Thereby colour effects which may arise under oblique viewing angles can be significantly reduced.

In a preferred embodiment the modulation material in the first switching layer comprises the liquid-crystalline medium and the polymeric component, where the polymeric component comprises a polymer network which is obtained by polymerisation of reactive mesogens, where the reactive mesogens preferably contain at least one group selected from acrylate groups, particularly preferably from monoacrylate groups, diacrylate groups or triacrylate groups, vinyl ether groups and epoxide groups. Compounds containing acrylate group(s) as used herein comprise acrylic monomers, methacrylic monomers, and mixtures of such monomers.

Polymerisation can be carried out using conventional methods. The polymerisation can be carried out in one or more steps. In particular, polymerisation of the polymerisable compound(s) is preferably achieved by exposure to heat or to actinic radiation, wherein exposure to actinic radiation means irradiation with light, like UV light, visible light or IR light, irradiation with X-rays or gamma rays, or irradiation with high-energy particles, such as ions or electrons. In a preferred embodiment free radical polymerisation is carried out.

Polymerisation can be carried out at a suitable temperature. In an embodiment polymerisation is performed at a temperature below the clearing point of the mesogenic mixture. In an alternative embodiment it is however also possible to carry out the polymerisation at or above the clearing point.

In an embodiment, polymerisation is carried out by photoirradiation, i.e. with light, preferably UV light. As a source for actinic radiation, for example a single UV lamp or a set of UV lamps can be used. When using a high lamp power the curing time can be reduced. Another possible source for photoradiation is a laser, like e.g. a UV laser, a visible laser or an IR laser.

In an embodiment, polymerisation is carried out by adding to the chiral liquid-crystalline host mixture one or more polymerisable compounds, preferably comprising a di-reactive compound and optionally a suitable photoinitiator, and polymerising the polymerisable compounds by exposure to UV irradiation.

Preferably the polymerisation is carried out in electro-optical cells maintained in a pre-determined state of the chiral liquid crystalline host mixture. In a preferred embodiment polymerisation, preferably polymerisation using UV light, is carried out when the medium is in the homeotropic state, wherein typically and preferably an electric field is applied.

In a preferred embodiment a liquid-crystalline medium which comprises the one or more polymerisable compounds, in particular polymerisable mesogenic compounds, is provided as a layer between two opposing transparent substrates which are each provided with an electrode. Preferably the electrodes are arranged as conductive layers on the inner surface of each substrate, wherein more preferably the conductive layers are respectively covered by a passivation layer, and wherein optionally alignment layers are further provided which are in direct contact with the liquid-crystalline medium.

Subsequently the one or more polymerisable compounds are polymerised, in particular in the presence of an applied electric field in the layer.

It is preferred that polymerising is carried out by photopolymerisation, preferably using UV light. In a particularly preferred embodiment during the polymerisation, at least temporarily, an electric field is applied to induce an alignment of the medium, preferably a homeotropic alignment.

The application of a voltage to set a predetermined orientation during polymerisation can favourably influence the product properties of the switching layer and the window element. For example, inducing a homeotropic alignment during polymerisation can contribute to achieving a homogeneous low haze clear state, while furthermore a homogeneous and suitably strong haze can be obtained in the scattering state.

It is possible to control the temperature during photopolymerization, for example in a range from 20° C. to 100° C., preferably below the clearing point.

In an embodiment the reactive mesogens are self-starting, while in another embodiment a photoinitiator is used to trigger the polymerisation.

For the photopolymerisation of the material in the switching layer preferably an exposure time from 30 s to 240 min, more preferably from 1 min to 120 min is used, preferably using irradiation intensities in the range from 0.01 mW/cm$^2$ to 100 mW/cm$^2$ to, more preferably from 0.1 mW/cm$^2$ to 50 mW/cm$^2$ and in particular from 1 mW/cm$^2$ to 20 mW/cm$^2$.

For the polymerisation several parameters may be suitably set or varied, e.g. the irradiation dose, the applied voltage, the frequency of the AC voltage, and the amount of chiral dopant in the medium.

Following the polymerisation, in particular the photopolymerisation step further treatments may be carried out. Preferably a thermal treatment is carried out after the polymerisation step, either in the presence or absence of an electric field. The thermal treatment, i.e. an exposure to an increased temperature relative to the previous polymerisation step may lead to further curing or further conversion rate or completion of the polymerisation.

It is also possible to perform pretreatment steps on the substrates used, for example surface treatment methods such as a UV-ozone treatment or a plasma treatment, which can improve alignment and wetting behaviour over larger areas and contribute to an improved homogeneity as well as a favourable reduction of unwanted haze in the clear state.

The method described herein is advantageously useful to produce a window element with favourable durability wherein the first switching layer can exhibit colour neutrality, a low haze clear state and an efficient and uniform scattering state.

The liquid-crystalline medium in the first switching layer may contain additional compounds such as one or more pleochroic dyes, in particular one or more dichroic dyes, and/or other customary and suitable additives such as stabilizers, preferably in an amount from 0.001% by weight to 25% by weight, more preferably from 0.1% by weight to 5% by weight.

However, preferably the first switching layer does not comprise any dyes, which can provide higher transmission in the clear state and give an uncoloured or respectively white appearance.

In addition to the first switching layer, the multilayer arrangement for regulating the passage of light according to the invention further comprises a switching element comprising a second switching layer, wherein the switching element is switchable between a bright state and a dark state and wherein the second switching layer is a liquid-crystalline layer.

This additional switching element which includes a liquid-crystal based switching layer, or respectively in some embodiments two liquid-crystal based switching layers, is provided to produce an overall reduction in the light intensity when desired or required, i.e. to give the switching capability for light attenuation or light dimming.

In a preferred embodiment the switching element is based on one or two guest-host liquid-crystalline switching layers. This means that in this embodiment the second switching layer is a liquid-crystalline layer which comprises one or more dichroic dyes. The switching element can comprise a single switching layer, i.e. the second switching layer. Alternatively, the switching element may comprise an additional switching layer. In this latter case the two switching layers can be provided separately or individually in so-called cells, which are then combined and configured as a so-called double cell, in particular by bonding using e.g. lamination or an adhesive.

It is thus preferred that the second switching layer as provided in the switching element, and optionally the additional switching layer, comprises at least one dichroic dye.

In the second switching layer, and also in the optionally provided additional switching layer, a dye-doped nematic liquid-crystalline medium can be used.

Alternatively, in addition to the at least one dichroic dye it is also possible to comprise in the second switching layer, and also in the optionally additional switching layer, one or more chiral compounds. Preferably, the one or more chiral compounds can be suitably chosen from the chiral compounds as described for the first switching layer.

While such dye-doped cholesteric liquid-crystalline media may favourably contribute to the scattering or diffusion of light at least to a certain extent, these media are primarily provided to obtain the dimming or attenuation of light. In a preferred embodiment haze in the switching element, in particular in the bright state, is kept to a minimum.

The switching element can be arranged and configured in different ways, in particular in terms of the electrode configuration, the optional provision of alignment layers and types thereof as well as the liquid-crystalline material, wherein however the switching element is provided such that it gives the switching capabilities for light dimming in the multilayer arrangement and an overall change in the transmittance.

Preferred configurations, in particular for a cell comprising the second switching layer, include the twisted nematic (TN) configuration, the antiparallel configuration, the supertwisted nematic (STN) configuration and the vertical alignment-supertwisted nematic (VA-STN) configuration.

In the TN configuration, the twist angle is typically 90° or approximately 90°. In the STN configuration, the twist angle exceeds 90° and is typically ranging from above 90° to 270°. However, it is also possible that the present STN configuration exhibits a twist angle which exceeds 270°.

In order to further improve the switching contrast of the switching element in the multilayer arrangement it is possible to provide two switching layers, in particular arranged as a double cell as described above. In this embodiment it is preferred that the two layers are provided such that they provide an overall optimized or at least increased efficiency to attenuate both parallel and perpendicular polarization components of the light.

The two switching layers of the double cell preferably comprise the same dye-doped liquid-crystalline medium, which optionally can include one or more chiral compounds.

In another embodiment, the switching element includes a polarization layer, wherein preferably precisely one polarizer and the second switching layer as the only switching layer are arranged in the so-called Heilmeier configuration. This configuration is also suitable to further improve the switching contrast of the switching element by giving efficient attenuation of both parallel and perpendicular polarization components of the light.

Alternatively, it is also possible to provide more than one polarization layer, in particular two polarization layers in the switching element. In this case the liquid-crystalline medium provided in the switching layer preferably does not contain any dichroic dye. In this alternative where two polarizers are used, it is preferred to arrange the element in the TN configuration, the STN configuration, the vertically aligned (VA) configuration, the in-plane switching (IPS)

configuration or the fringe field switching (FFS) configuration. In this alternative embodiment optionally one or more retardation or compensation layers can further be included.

Typical polarizers, in particular absorptive or reflective linear polarizers, e.g. thin film polarizers or wire-grid polarizers, and typical retarders and compensators such as uniaxial and biaxial plastic retardation films are known in the art.

It is preferred that in the multilayer arrangement, especially when the second switching layer contains one or more chiral dopants, the first switching layer is closer to the light source, i.e. that relative to the light source the switching element is placed behind the first switching layer. Therefore, relative to the outer face which is facing the light source, preferably the first switching layer is placed in front of the switching element. It is was surprisingly found that when the first switching layer is facing the light source, in particular the sun, and the switching element is far side in this respect, further beneficial advantages in terms of the device performance may be obtained, such as a further improved colour neutrality, a favourable appearance and an even better stability.

The liquid-crystalline medium used in the switching element, in particular the LC host medium for the guest-host mixtures, can be the same or different from the liquid-crystalline medium, in particular the nematic host mixture, used in the first switching layer.

In principle, a suitable host mixture for use in the switching element is any dielectrically negative or positive LC mixture which is suitable for use in conventional VA, TN, STN, IPS or FFS displays.

Suitable LC mixtures are known in the art and are described in the literature. LC media for VA displays having negative dielectric anisotropy are described in for example EP 1 378 557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851, WO 96/28 521 and WO2012/079676.

Preferred embodiments of the liquid-crystalline media having negative or positive dielectric anisotropy according to the invention are indicated below.

In a preferred embodiment of the present invention the LC medium used in the switching layer(s) of the switching element contains an LC host mixture with negative dielectric anisotropy. Accordingly, in preferred embodiments the mesogenic media comprise components selected from the following item a):

a) Mesogenic medium which comprises one or more compounds selected from the group of compounds of the formulae CY, PY and AC:

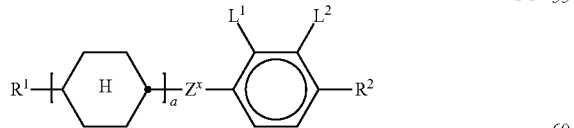
CY

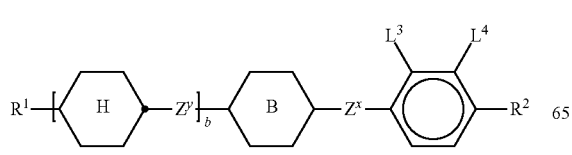
PY

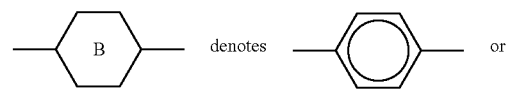
AC wherein
a denotes 1 or 2,
b denotes 0 or 1,
c is 0, 1 or 2,
d is 0 or 1,

 B denotes 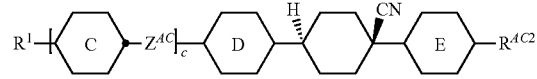 or

 C and denote

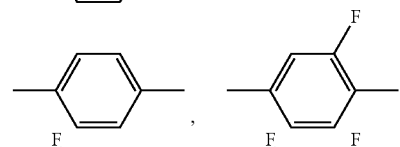 D

,
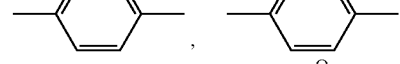,
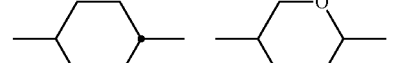,
,
,
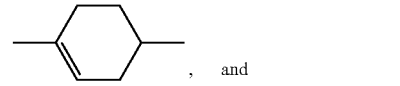,
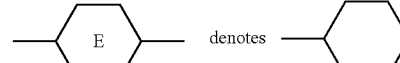,
 or

, and

 E denotes 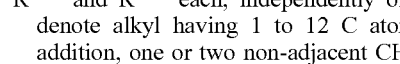,

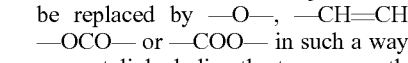, 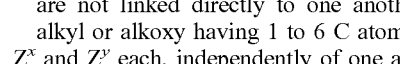, $R^1$ and $R^2$
$R^{AC1}$ and $R^{AC2}$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, CN, OCF$_3$, CFs, CHs, CH$_2$F, CHF$_2$.

in which the individual radicals have the following meanings:

each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^{AC}$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, and Preferably, both L$^1$ and L$^2$ denote F or one of L$^1$ and L$^2$ denotes F and the other denotes Cl, or both L$^3$ and L$^4$ denote F or one of L$^3$ and L$^4$ denotes F and the other denotes Cl.

The compounds of the formula CY are preferably selected from the group consisting of the following sub-formulae:

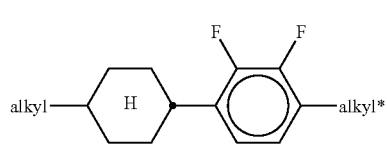
CY1

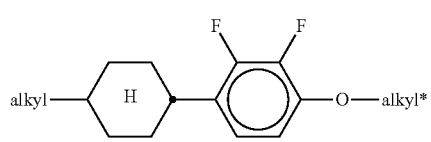
CY2

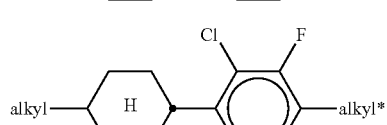
CY3

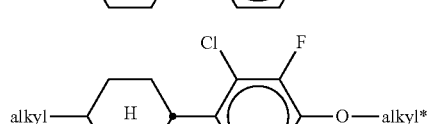
CY4

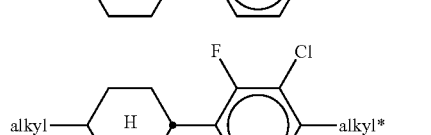
CY5

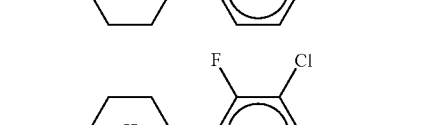
CY6

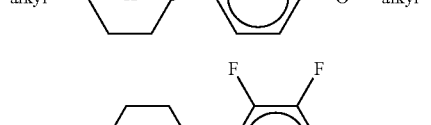
CY7

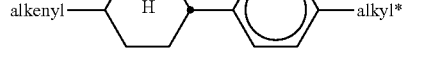

-continued

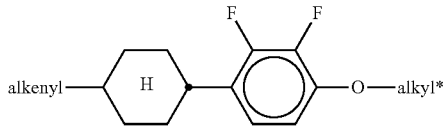
CY8

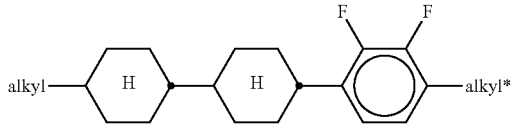
CY9

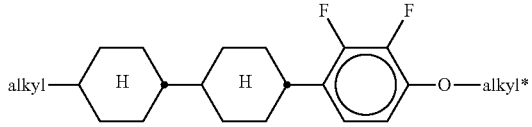
CY10

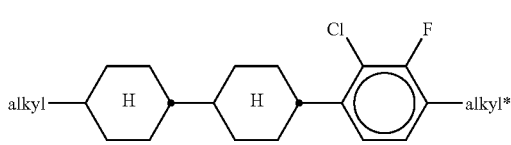
CY11

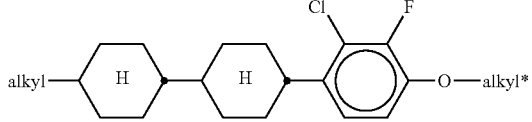
CY12

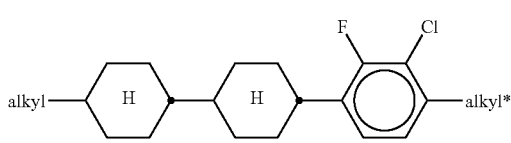
CY13

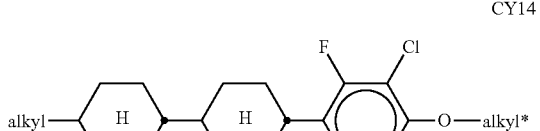
CY14

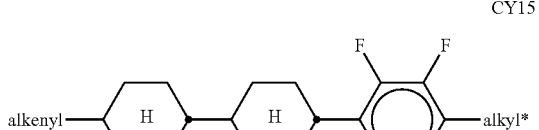
CY15

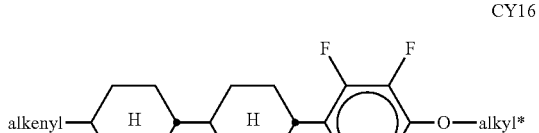
CY16

CY17

CY18
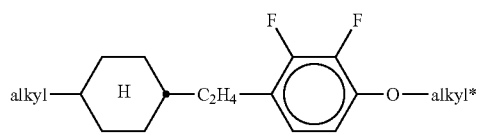

CY19
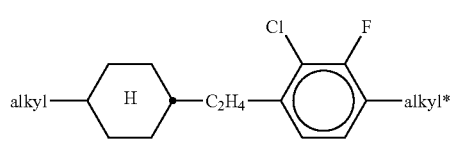

CY20
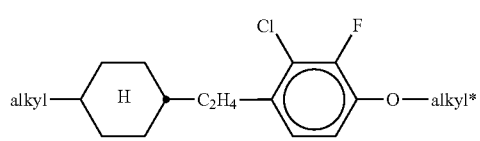

CY21
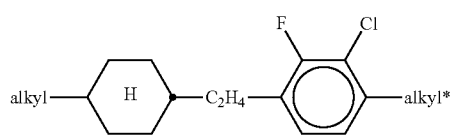

CY22
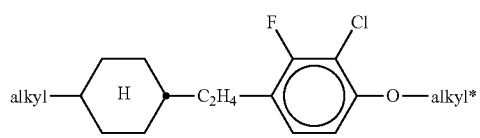

CY23
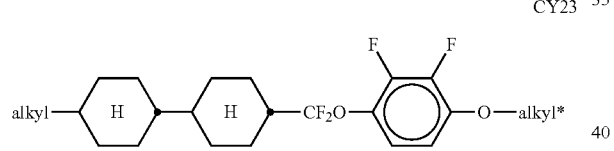

CY24
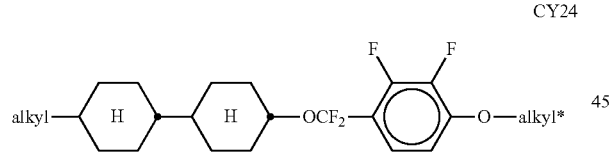

CY25
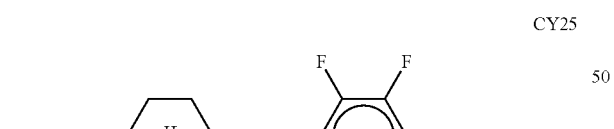

CY26
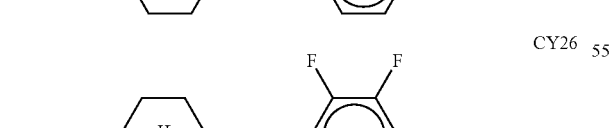

CY27
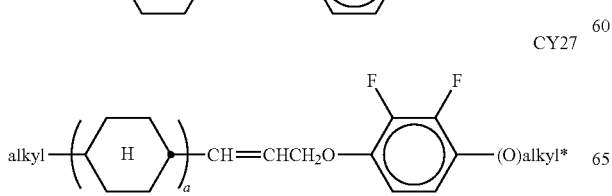

CY28
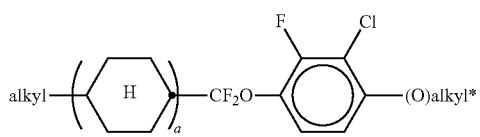

CY29
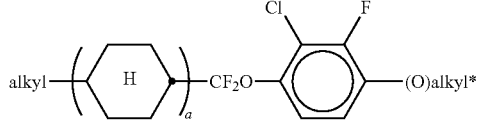

CY30
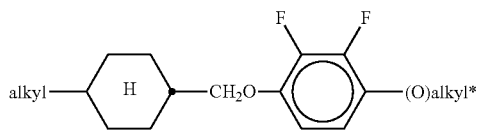

CY31
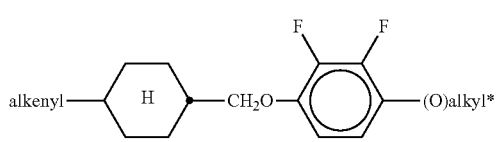

CY32
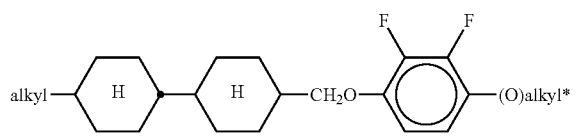

CY33
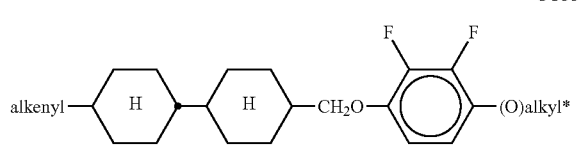

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

PY1
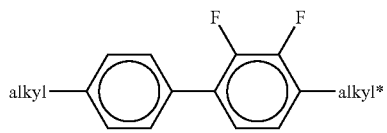

PY2
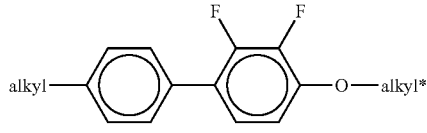

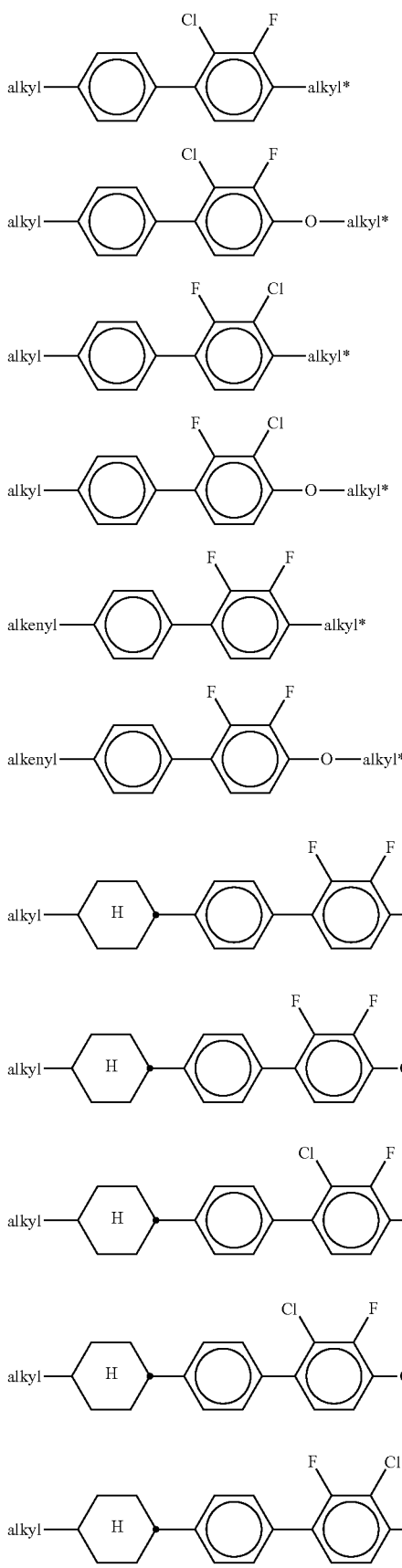
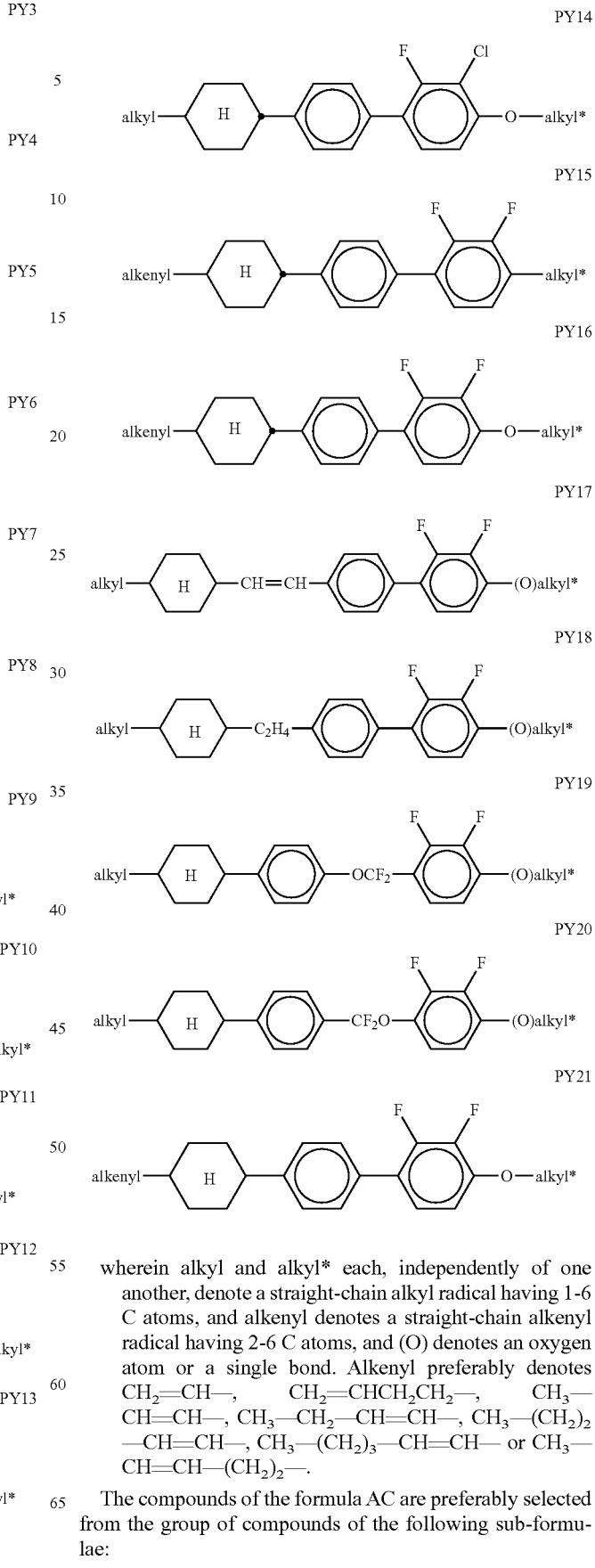

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula AC are preferably selected from the group of compounds of the following sub-formulae:

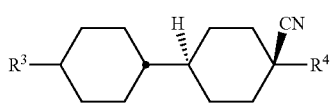
AC1

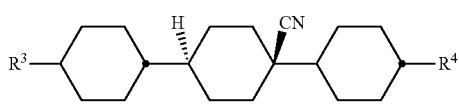
AC2

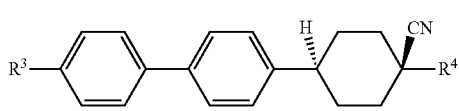
AC3 wherein $R^3$ and $R^4$ have the meanings of $R^{AC1}$ and $R^{AC2}$ as set forth above.

In another preferred embodiment of the present invention the LC medium used in the switching layer(s) of the switching element contains an LC host mixture with positive dielectric anisotropy. Accordingly, in further preferred embodiments the mesogenic media according to the invention comprise components selected from the following items b) and c):

b) Mesogenic medium which comprises one or more compounds selected from the group of compounds of the formulae IIA to VIII as set forth below, in particular of the formulae IIA and IIIA

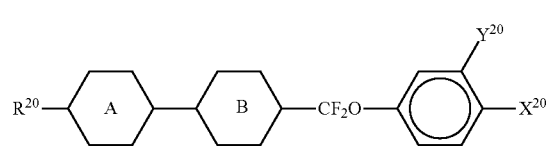
IIA

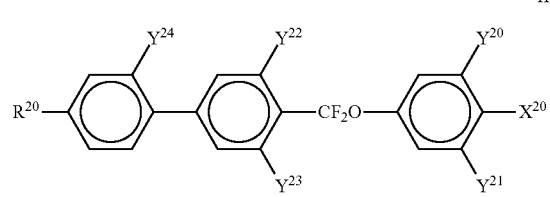
IIIA wherein $R^{20}$ each, identically or differently, denote a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH=CH—,

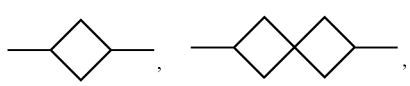

—O—, —CO—O— or —O—CO— in such a way that O atoms are not linked directly to one another, $X^{20}$ each, identically or differently, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{20-24}$ each, identically or differently, denote H or F;

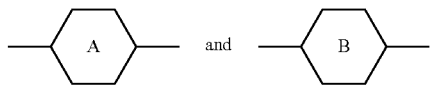

each, independently of one another, denote

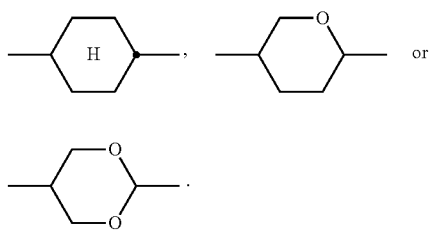

The compounds of the formula IIA are preferably selected from the following formulae:

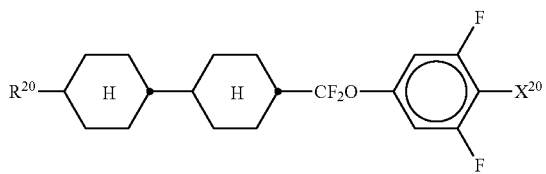
IIAa

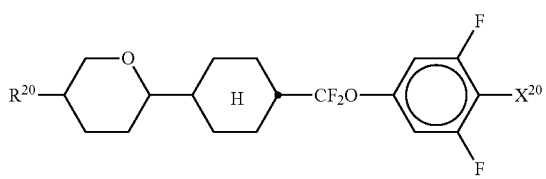
IIAb

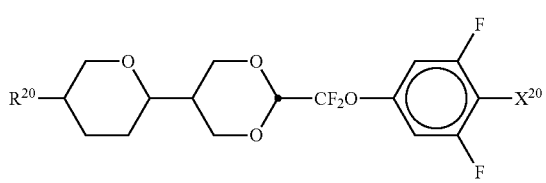
IIAc

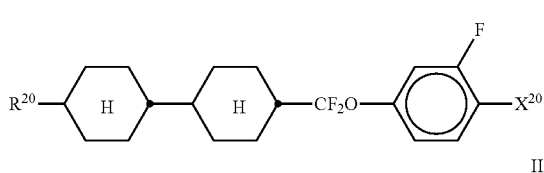
IIAd

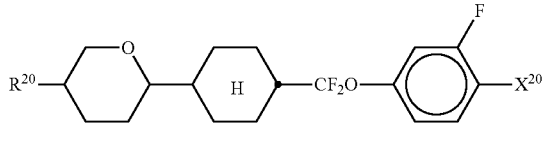
IIAe

IIAf

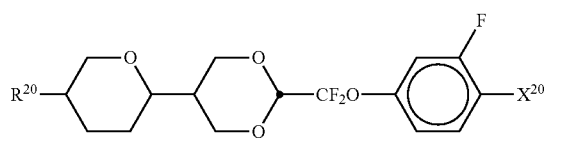

IVA

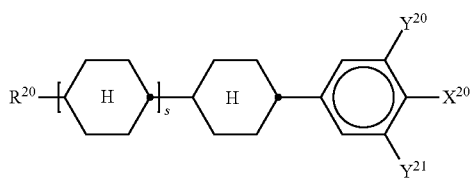

wherein $R^{20}$ and $X^{20}$ have the meanings indicated above.

$R^{20}$ preferably denotes alkyl having 1 to 6 C atoms. $X^{20}$ preferably denotes F. Particular preference is given to compounds of the formulae IIAa and IIAb, in particular compounds of the formulae IIAa and IIAb wherein X denotes F.

The compounds of the formula IIIA are preferably selected from the following formulae:

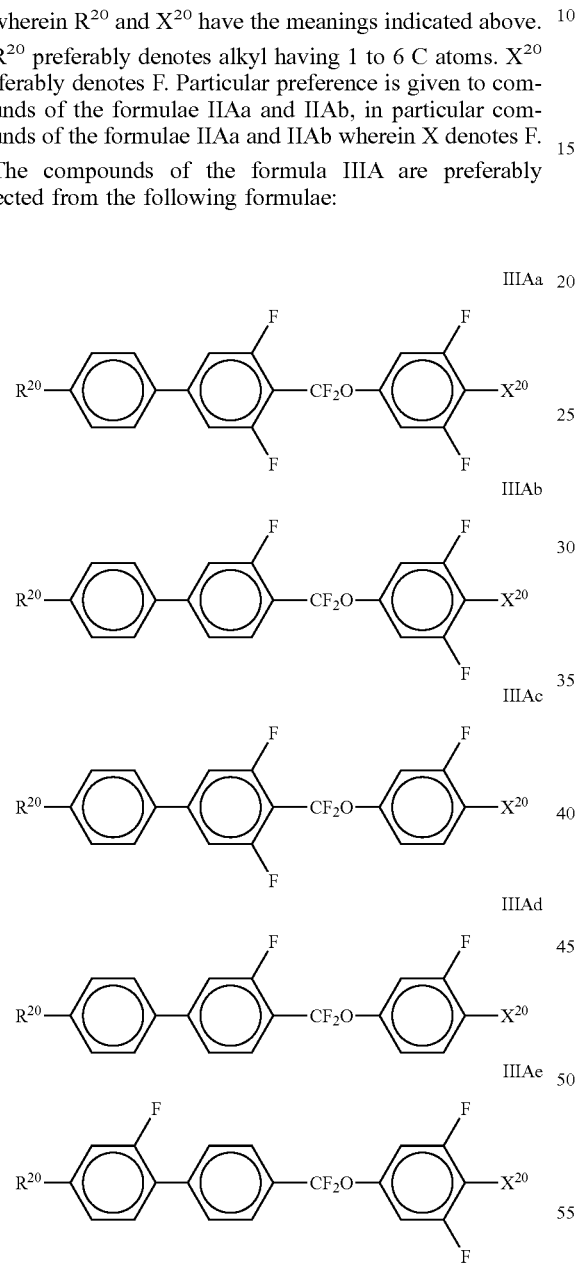

IIIAa

IIIAb

IIIAc

IIIAd

IIIAe wherein $R^{20}$ and $X^{20}$ have the meanings indicated above.

$R^{20}$ preferably denotes alkyl having 1 to 6 C atoms. $X^{20}$ preferably denotes F. Particular preference is given to compounds of the formulae IIIAa and IIIAe, in particular compounds of the formula IIIAa.

c) Mesogenic medium alternatively or additionally comprising one or more compounds selected from the following formulae:

V

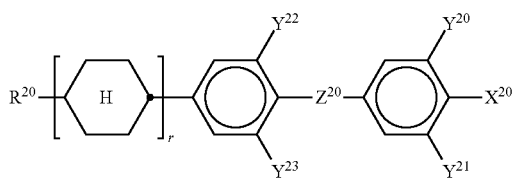

VI

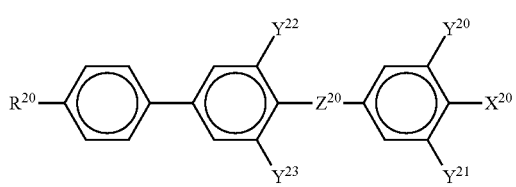

VII

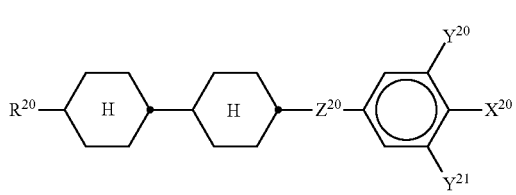

VIII

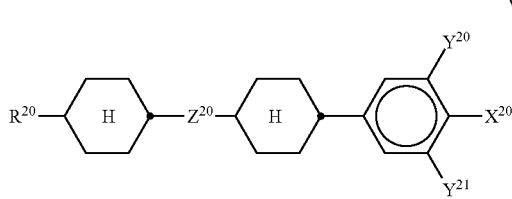

wherein $R^{20}$, $X^{20}$ and $Y^{20-23}$ have the meanings indicated above, and $Z^{20}$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, r denotes 0 or 1, and s denotes 0 or 1;

The compounds of the formula IVA are preferably selected from the following formulae:

IVAa

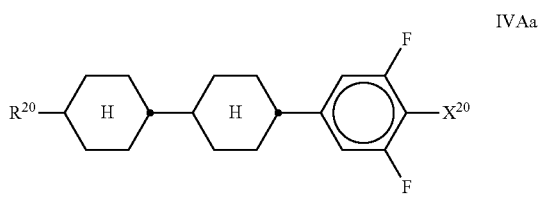

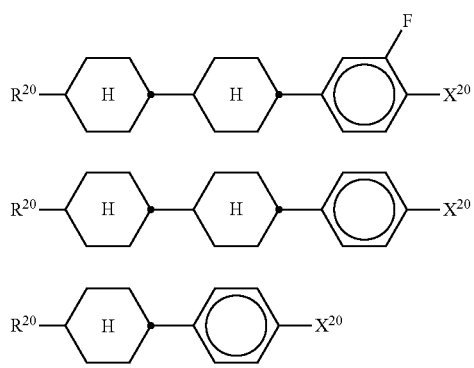

IVAb

IVAc

IVAd wherein $R^{20}$ and $X^{20}$ have the meanings indicated above.

$R^{20}$ preferably denotes alkyl having 1 to 6 C atoms. $X^{20}$ preferably denotes F, CN or $OCF_3$, furthermore $OCF=CF_2$ or Cl.

The compounds of the formula V are preferably selected from the following formulae:

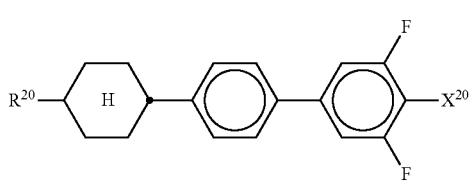
Va

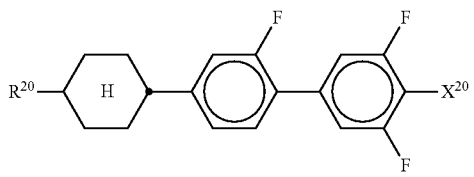
Vb

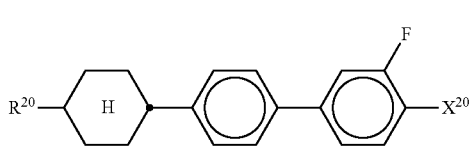
Vc

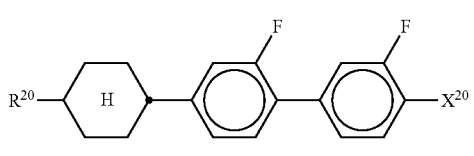
Vd

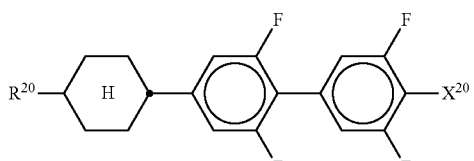
Ve

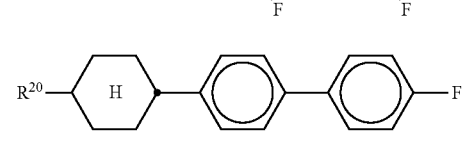
Vf

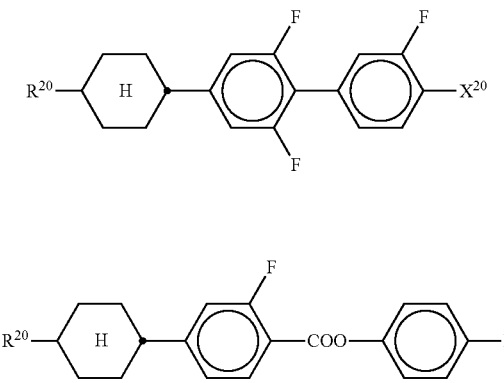

Vg

Vh wherein $R^{20}$ and $X^{20}$ have the meanings indicated above.

$R^{20}$ preferably denotes alkyl having 1 to 6 C atoms. $X^{20}$ preferably denotes F and $OCF_3$, furthermore $OCHF_2$, $CF_3$, $OCF=CF_2$ and $OCH=CF_2$.

The compounds of the formula VI are preferably selected from the following formulae:

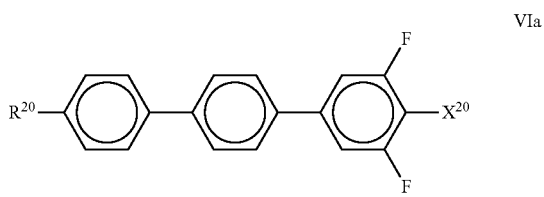
VIa

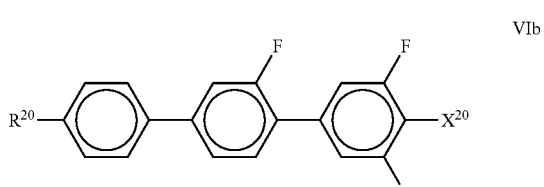
VIb

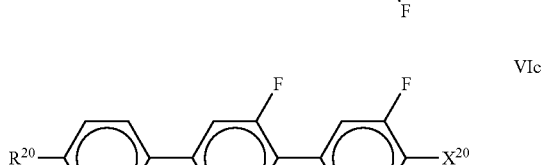
VIc

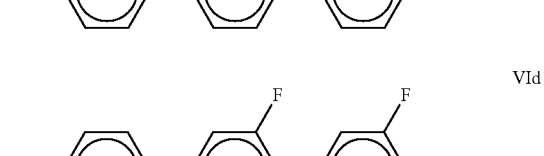
VId

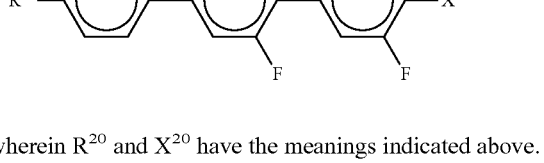

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $CF_3$, $CF=CF_2$, $OCHF_2$ and $OCH=CF_2$;

The compounds of the formula VII are preferably selected from the following formulae:

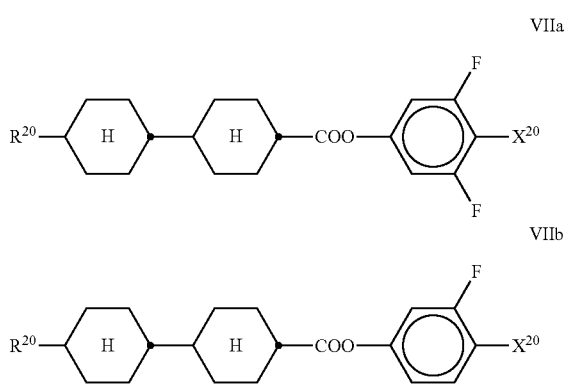

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $OCHF_2$ and $OCH{=}CF_2$.

In case the medium used in the switching element has negative dielectric anisotropy, the value for the dielectric anisotropy (Δε) is preferably in the range from −2.0 to −8.0, more preferably in the range from −3.0 to −6.0, and particularly preferably from −3.5 to −5.0.

In case the medium used in the switching element has positive dielectric anisotropy, the value for Δε is preferably in the range from 3.0 to 60.0, more preferably in the range from 5.0 to 30.0, and particularly preferably from 8.0 to 15.0.

The liquid-crystalline medium used in the switching element preferably has a clearing point of 70° C. or more, more preferably 80° C. or more, even more preferably 90° C. or more, still more preferably 105° C. or more, and particularly preferably 110° C. or more. In an embodiment the liquid-crystalline medium used in the switching element has a clearing point in the range from 70° C. to 170° C.

The high clearing point as defined can be beneficial in terms of the performance and the reliability of the multilayer arrangement and the devices which comprise the multilayer arrangement. In particular, the medium can maintain its functional properties over a suitably broad temperature range and also at elevated temperatures. This can be particularly advantageous for the use in window elements for regulating the passage of sunlight, especially when the window elements are exposed to direct or prolonged irradiation by sunlight. The high clearing point can also contribute to a favourably high degree of order of the liquid-crystalline host molecules, and hence the dichroic dye guest molecules at typical working temperatures, which can increase the obtainable contrast between the switching states.

In a preferred embodiment the birefringence (Δn) of the liquid-crystalline media used in the switching element is in the range of 0.040 or more to 0.080 or less, more preferably in the range of 0.045 or more to 0.070 or less and most preferably in the range of 0.050 or more to 0.060 or less. In this embodiment, the dielectric anisotropy is positive or negative, preferably negative.

In another preferred embodiment the Δn of the liquid-crystalline media used in the switching element is in the range of 0.075 or more to 0.130 or less, more preferably in the range of 0.090 or more to 0.125 or less and most preferably in the range of 0.095 or more to 0.120 or less.

In yet another preferred embodiment the Δn of the liquid crystal media used in the switching element is in the range of 0.100 or more to 0.200 or less, more preferably in the range of 0.110 or more to 0.180 or less and most preferably in the range of 0.120 or more to 0.160 or less.

In a preferred embodiment the second switching layer and the optional additional switching layer of the switching element comprise one or more pleochroic dyes, in particular one or more dichroic dyes. Preferably, the media comprise two, three, four, five, six, seven or eight dichroic dyes. It is particularly preferred that the media comprise at least three dichroic dyes.

Preferably, the dichroic compounds are present in the liquid-crystalline medium in solution.

Each of the one or more dichroic dyes is preferably present in the liquid-crystalline medium in a proportion of 0.01% by weight to 10% by weight, more preferably 0.025% by weight to 7.5% by weight, even more preferably 0.05% by weight to 5% by weight, still even more preferably 0.1% by weight to 2.5% by weight and particularly preferably 0.25% by weight to 1% by weight, based on the overall weight of the entire medium.

Preferably, the one or more dichroic compounds are present in the liquid-crystalline medium overall in a total concentration which is in the range of 0.05% by weight to 15% by weight, more preferably 0.1% by weight to 10% by weight and even more preferably 0.5% by weight to 5% by weight.

The dichroic compounds preferably exhibit a high dichroic ratio, a favourable colour purity and large extinction coefficients, in particular in the VIS and/or NIR region of light, and in addition suitable lightfastness and suitable solubility in liquid-crystalline media.

The dichroic compounds and the amounts of the respective compounds are favourably chosen and mixed such that the desired or required colour effect for a given application can be obtained.

In an embodiment the dichroic compounds contained in the LC medium respectively have a red colour, a green colour and a blue colour. In a preferred embodiment the dichroic compounds in the LC medium have absorptions that in total cover the entire visible spectrum. In this way a colour-neutral or black appearance may be obtained. Such a colour-neutral appearance may be favourable in applications where colour artefacts or residual colour should be minimized or avoided, e.g. in certain smart windows applications.

It was further found that it can be advantageous to include one or more near-infrared dyes in the composition. This provision can favourably contribute to minimizing or even avoiding residual fluorescence in the visible spectrum such that unwanted colour artefacts, e.g. a red glow, may be avoided or at least substantially reduced.

In a particularly preferred embodiment the LC media of the switching element comprise at least one purple dye, at least one blue dye, at least one yellow dye, at least one red dye and at least one near-infrared dye.

It is particularly preferred that the absorption spectra of the dichroic dyes in the LC medium in the switching layer complement one another in such a way that the impression of a black colour arises for the eye. The dyes of the liquid-crystalline medium preferably cover a large part, more preferably the entire part, of the visible spectrum, and most preferably in addition parts of the NIR spectrum. The precise way in which a mixture of dyes which appears black or grey to the eye can be prepared is known in the art and is described, for example, in M. Richter, Einführung in die Farbmetrik [Introduction to Colorimetry], 2nd Edition, 1981, ISBN 3-11-008209-8, Walter de Gruyter & Co.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables, for example in the reference above. Different colour locations can be set by changing the proportions of the various dyes.

The dichroic compounds preferably are positive dichroic dyes, i.e. dyes which have a positive degree of anisotropy R.

The degree of anisotropy R is determined for the LC mixture comprising the dye from the values of the extinction coefficients for parallel and perpendicular alignment of the molecules relative to the direction of the polarisation of the light.

According to the invention the degree of anisotropy R preferably is greater than 0.4, more preferably greater than 0.6, even more preferably greater than 0.7, and in particular greater than 0.8.

The absorption preferably reaches a maximum when the polarisation direction of the light is parallel to the direction of the longest molecular elongation of the dichroic compounds, and it preferably reaches a minimum when the polarisation direction of the light is perpendicular to the direction of the longest molecular elongation of the dichroic compounds.

In an embodiment the dichroic dyes are preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

The dichroic dyes can generally belong to the classes of dichroic dyes which are known in the art and have been described in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, US 4340973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.

The dichroic dyes can preferably be selected from for example azo dyes, anthraquinones, methine compounds, azomethine compounds, merocyanine compounds, naphthoquinones, tetrazines, pyrromethene dyes, malononitrile dyes, rylenes, in particular perylenes and terylenes, thiadiazole dyes, thienothiadiazole dyes, benzothiadiazoles, thiadiazoloquinoxalines, pyrromethenes and diketopyrrolopyrroles. Particular preference is given to azo compounds, anthraquinones, benzothiadiazoles, in particular as described in WO 2014/187529, diketopyrrolopyrroles, in particular as described in WO 2015/090497, rylenes, in particular as described in WO 2014/090373, and thiadiazoloquinoxaline derivatives, in particular as described in WO 2016/177449. It is particularly preferred that the dichroic dyes are selected from azo dyes, benzothiadiazoles and/or thiadiazoloquinoxalines.

Examples of preferred dichroic dyes which may be present in the LC medium of the switching element of the multilayer arrangement are shown below

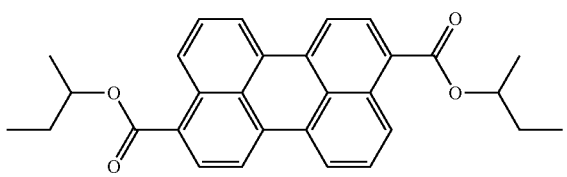

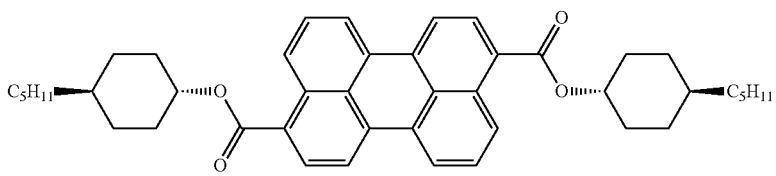

-continued
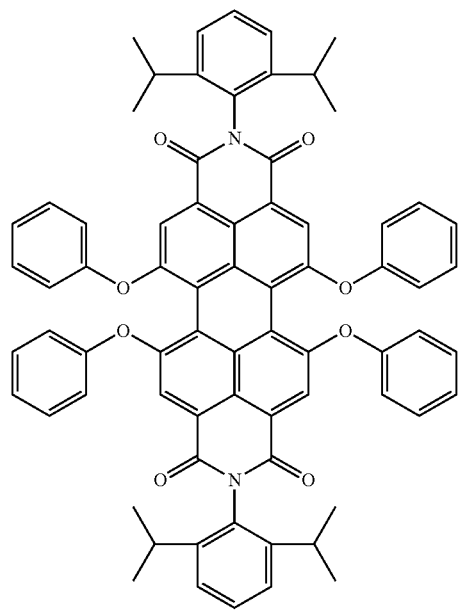
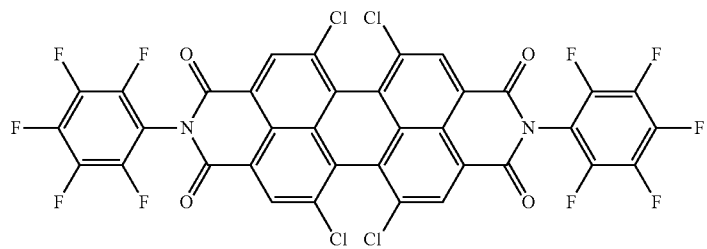
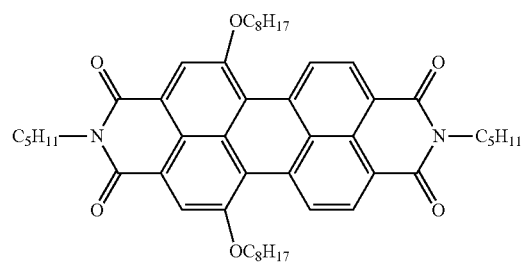
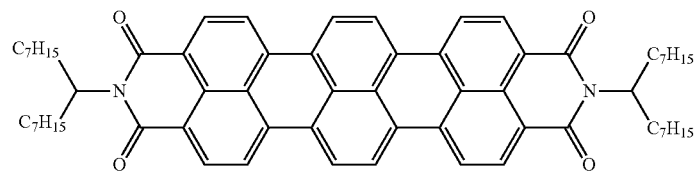
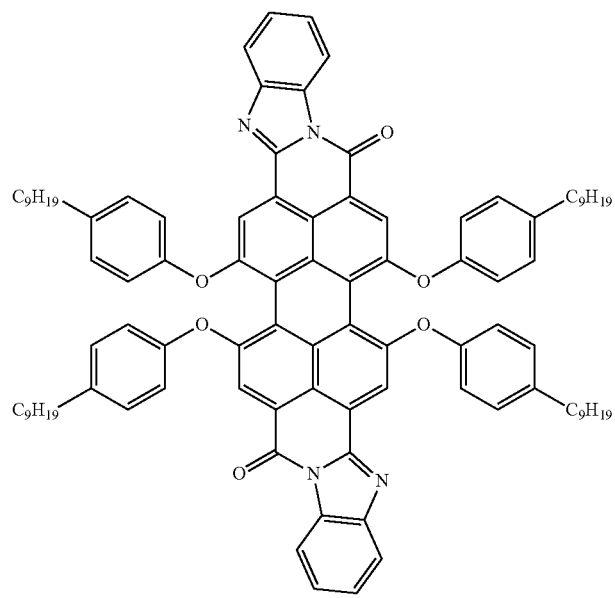

-continued
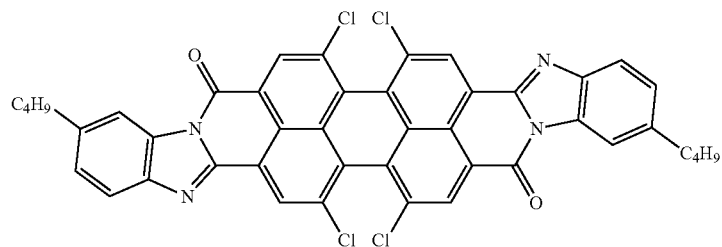
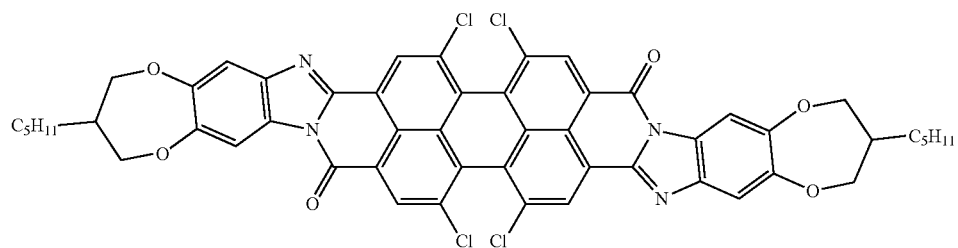
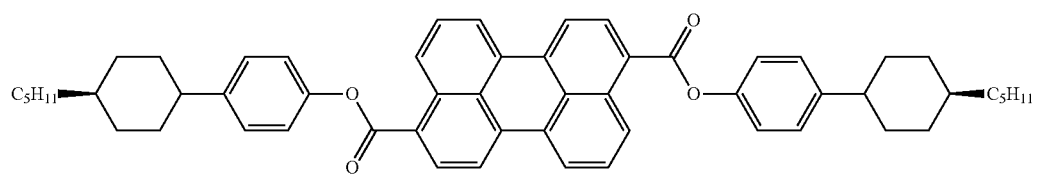
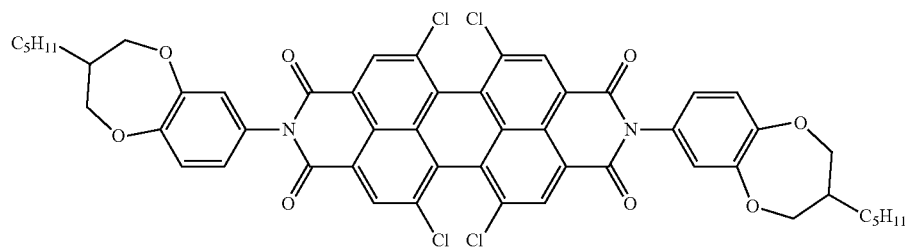
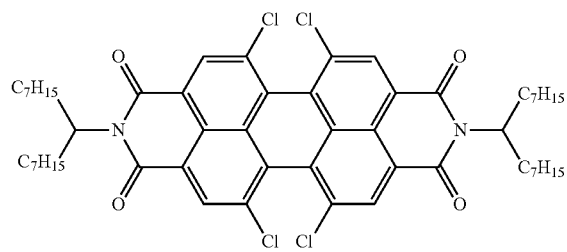
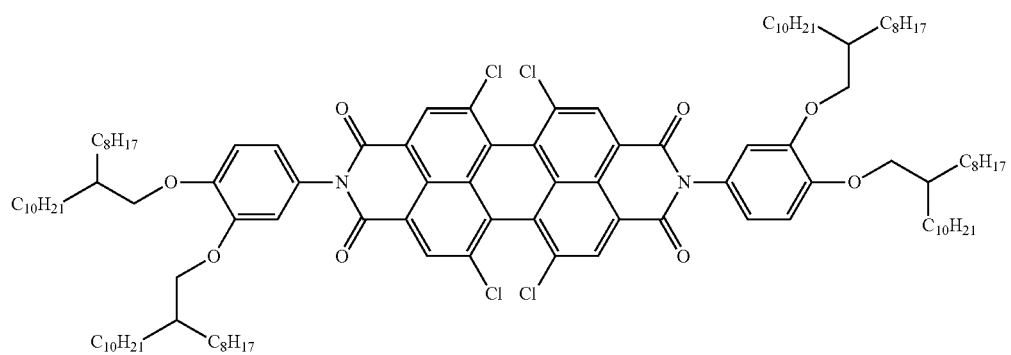

-continued
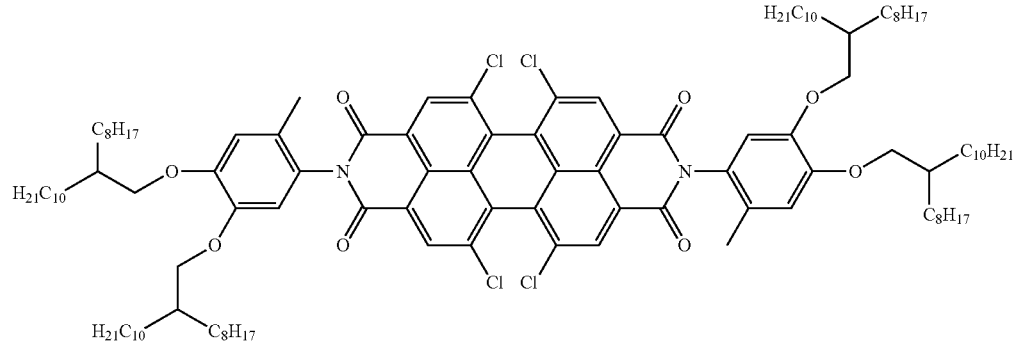
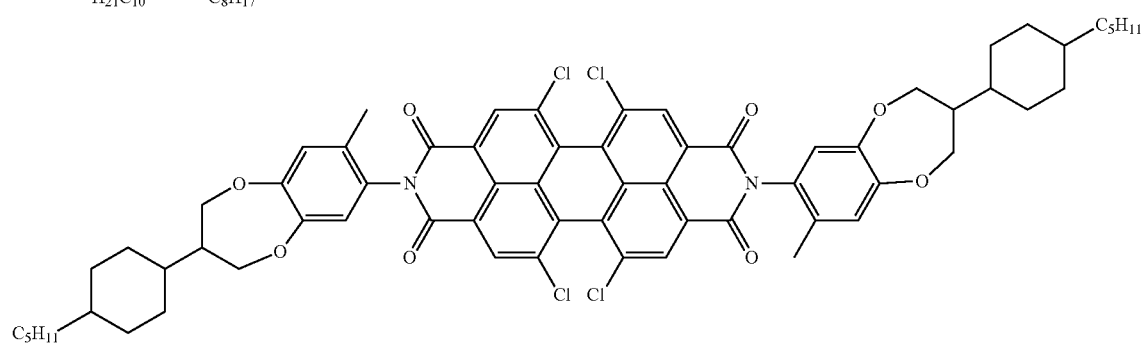
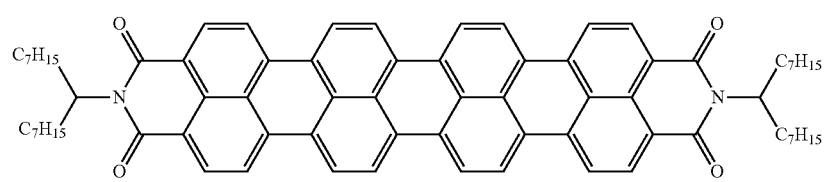
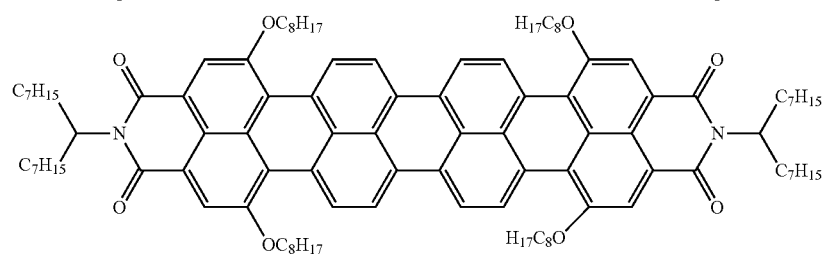
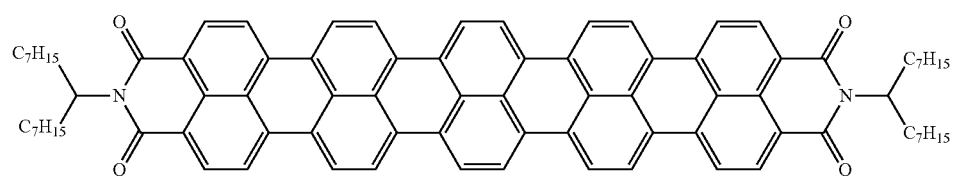
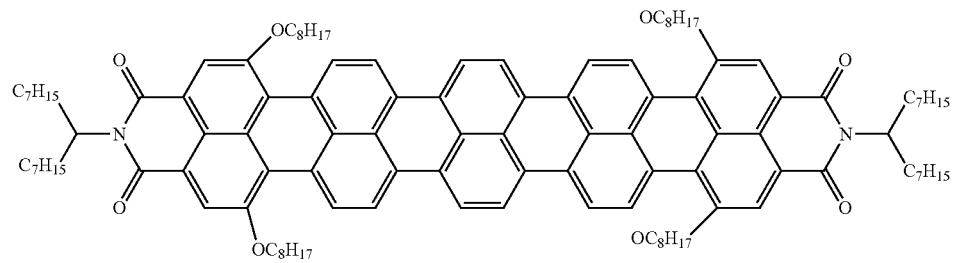
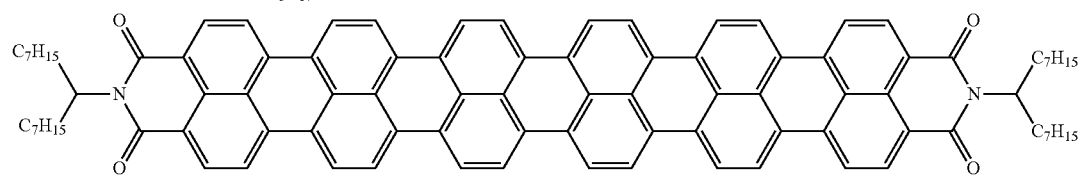

-continued
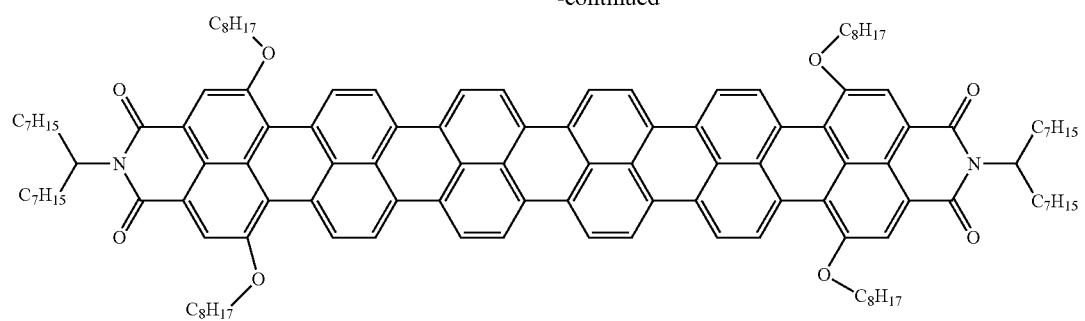
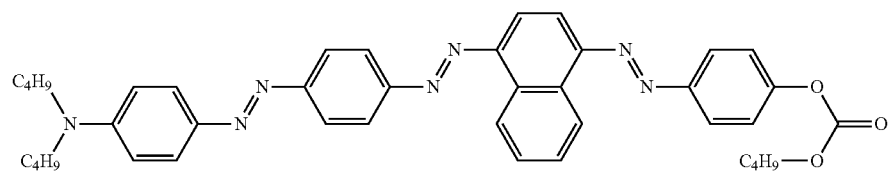
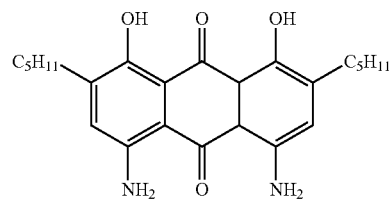
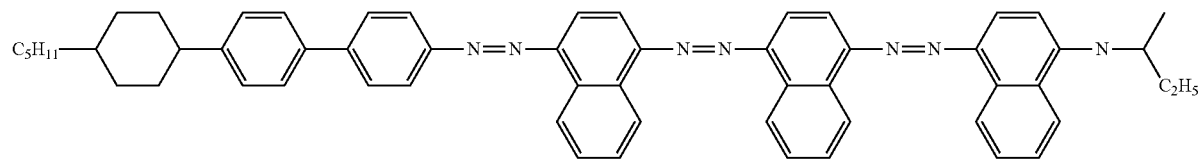
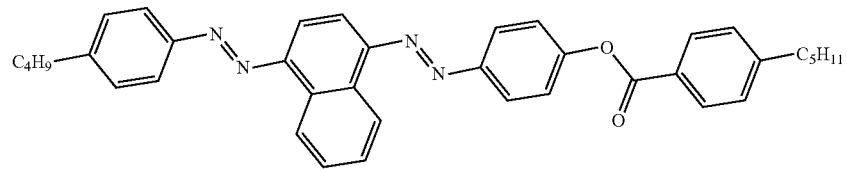
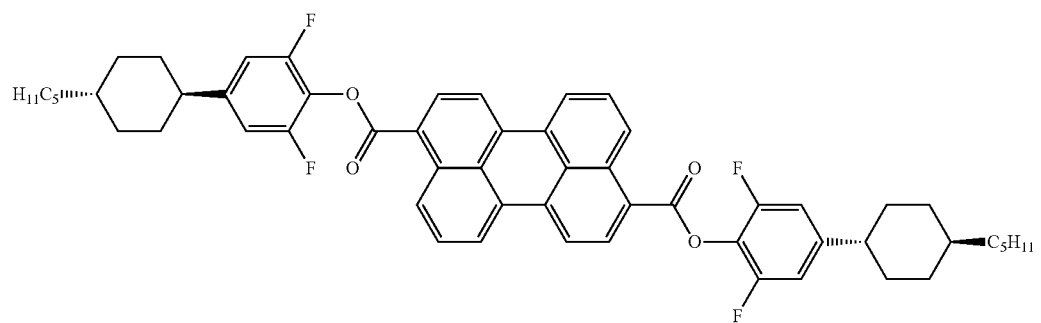

-continued
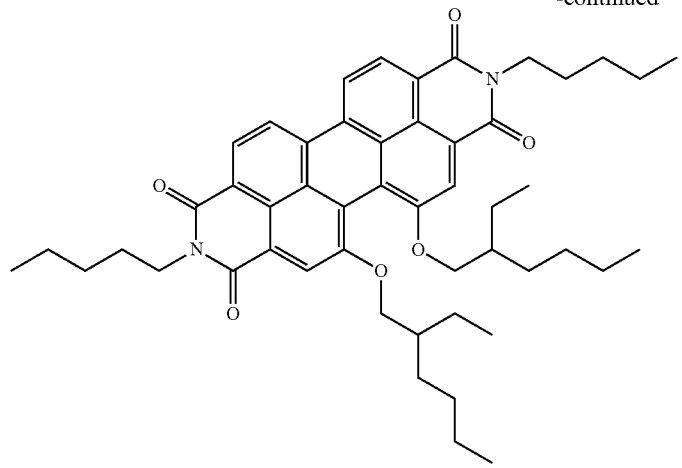
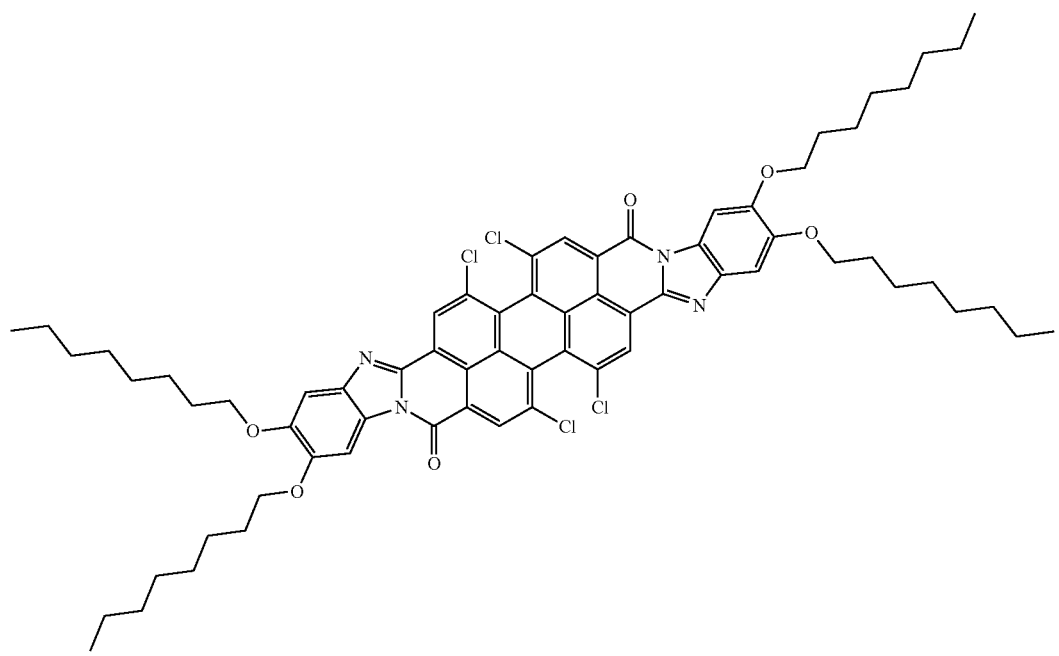
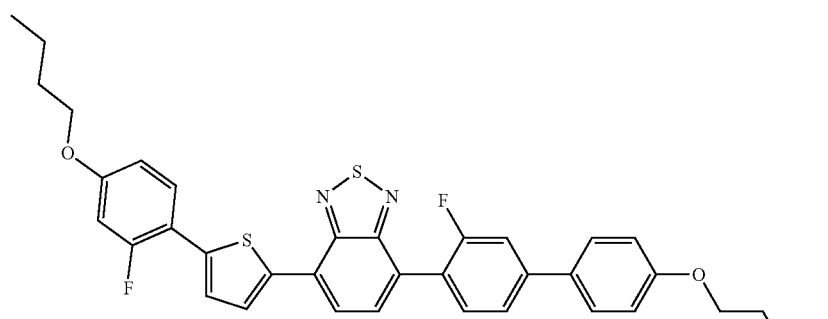
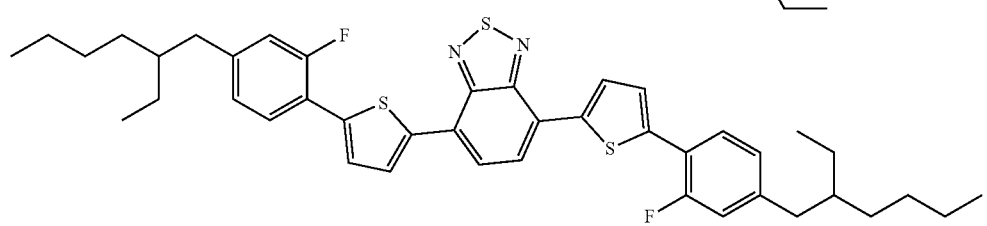

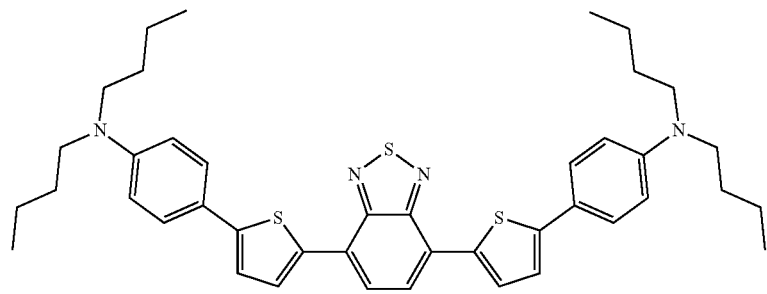
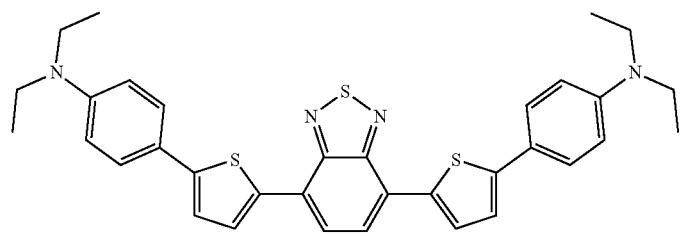
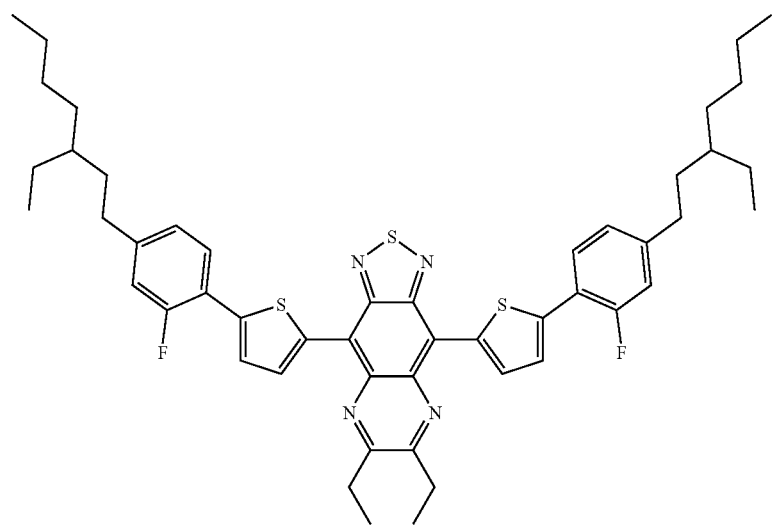
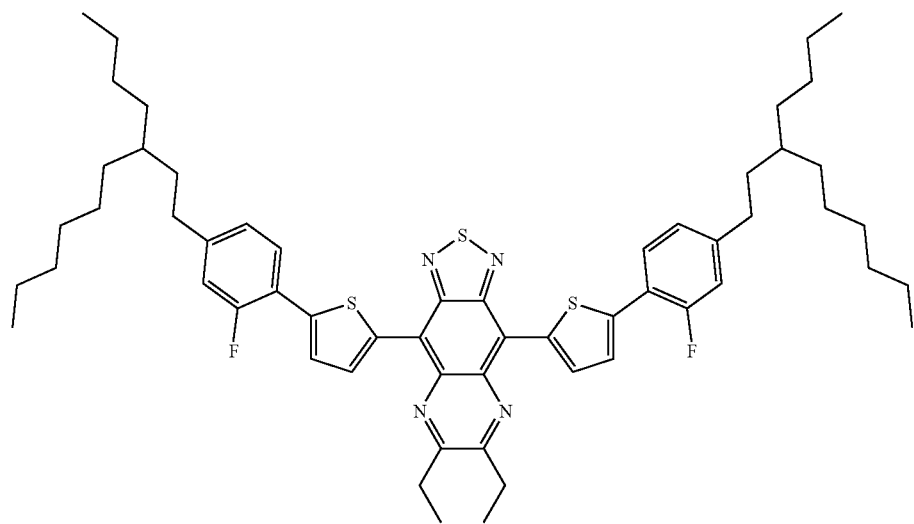

-continued
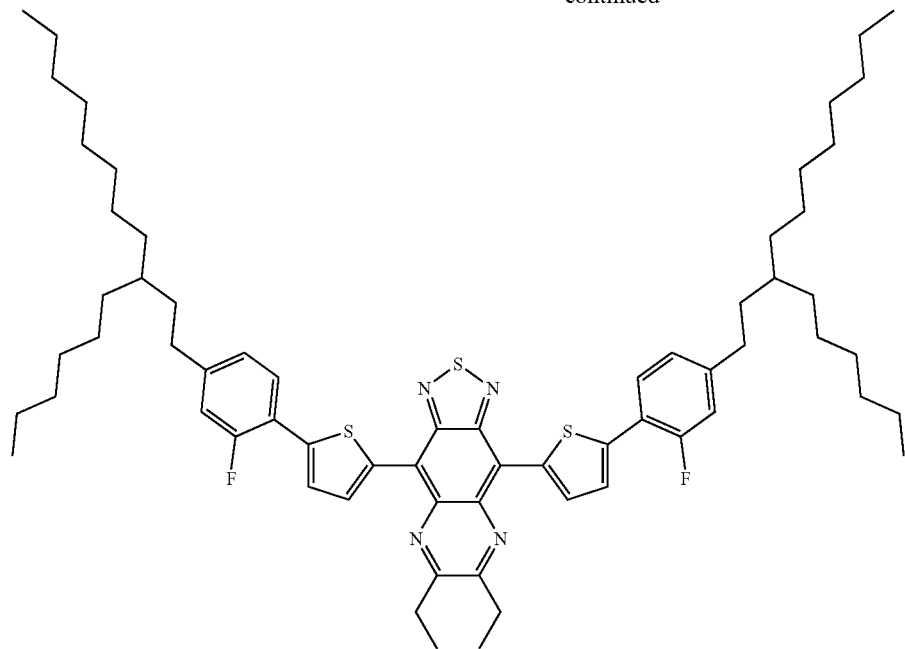
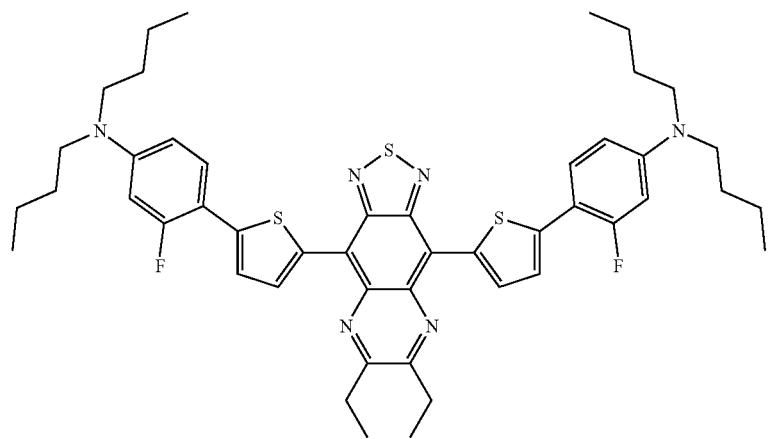
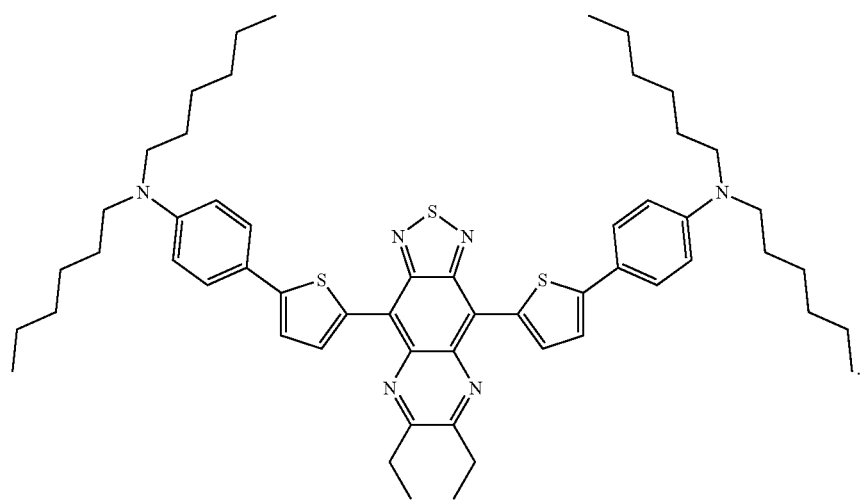

The liquid-crystalline media can in addition include suitable additives and auxiliary materials, e.g. stabilizers and quenchers.

It is preferred that the liquid-crystalline media as used in the second switching layer and the optional additional switching layer in the switching element of the multilayer arrangement contain no polymerisable compounds, in particular no polymerisable mesogenic compounds.

The LC media according to the invention are prepared in a manner conventional per se. In general, the components are dissolved in one another, preferably at elevated temperature. The mixing is preferably carried out under inert gas, for example under nitrogen or argon. The optional dyes are subsequently added, preferably at elevated temperature, more preferably at above 40° C. and particularly preferably at above 50° C. In general, the desired amount of the components used in smaller amount is dissolved in the components making up the principal constituent. It is also possible to mix solutions of the components in an organic solvent, for example in acetone, toluene, chloroform or methanol, and to remove the solvent again, for example by distillation, after mixing.

In an aspect of the invention the layer arrangement is comprised in a window element which is electrically switchable between a state which is optically clear and bright and a state which is light scattering and dark.

Preferably, the window element is further operable in and electrically switchable to a state which is optically clear and dark and a state which is light scattering and bright.

The window element preferably has a size of greater than $0.5\ m^2$, more preferably greater than $1\ m^2$, and even more preferably greater than $3\ m^2$. In an embodiment the window element has an area in the range of $0.10\ m^2$ to $10\ m^2$, and more preferably in the range of $0.5\ m^2$ to $10\ m^2$.

The window element according to the invention allows light to pass through it. It can be favourably used and included in windows, glazing units, including insulating glazing units, facade elements, room dividers, separating walls and the like and it can be used therein as the element which provides the different switching states on demand and thus anti-glare control as desired.

The window element as a switchable device can be used to regulate or modulate the passage of light from an exterior space into an interior space, e.g. into the interior of a building such as a residential building, an office building or a building used for commercial purposes, or vehicles. The window element can also be used to regulate or modulate the passage of light from an interior space into another interior space, in particular in structural elements which separate different functional areas or rooms.

The window elements and also the windows as a whole which include the window elements preferably do not comprise any light sources. Thus, any light transmitted through the window stems from an external light source such as the sun or a home lighting apparatus, in particular the sun.

According to the invention the state of the switching layers and the window element is controlled using an electric field which is applied by means of electrodes. The electrodes are preferably transparent electrodes which are arranged on the substrates in the form of a coating. The coating is commonly applied to the substrate side or surface which is facing the switching layer.

Preferably, the electrodes are not patterned and/or structured so that they are contiguous. Thus, the entire switchable area is addressed and switched at the same time by applying an electric field. In alternative embodiments the electrodes may be patterned to form individually addressable areas which may be switched independently from other areas by applying an electric field. In this case, the electrodes are preferably patterned such that 2 to 10 independently addressable areas are present.

Preferably, for ease of electronic driving the switching voltages to switch the first switching layer and the switching element with the second switching layer can be matched. Favourably comparatively low switching voltages may be useful and effective, wherein preferably switching voltages of 48 V or less are used.

In an embodiment the window element is switchable into the optically clear and bright state by applying an AC voltage V1 and which is switchable into the light scattering and dark state by applying an AC voltage V2, wherein V1>V2.

In the window element, preferably in the window including the window element which controls and regulates the passage of light, the first switching layer providing the scattering mode and the switching element which comprises the second switching layer and which provides switchable dimming of light may be suitably arranged and bonded, e.g. by lamination or using adhesives, but also separated by using for example one or more interjacent substrates or sheets, panes or panels, wherein optionally panes may be further separated by a vacuum or a gas filled space.

In an embodiment the first switching layer and the second switching layer included in the switching element are assembled in an insulating glazing unit, where the two layers are inter alia separated by a vacuum or a gas filled space and where optionally one or more of the substrates or carrier panes, in particular one or more glazing sheets, have a low-e coating. In this case it is preferred that the first switching layer is placed facing the outer side of the window element, i.e. the side facing the light source and in particular the sun, and the switching element with the second switching layer is facing the inner side, i.e. the switching element is far side of said light source.

The switching layers according to the invention preferably have a thickness in the range from 1 µm to 100 µm, more preferably from 2 µm to 50 µm, even more preferably from 4 µm to 40 µm and in particular from 10 µm to 25 µm.

To maintain a proper thickness of the switching layers, spacers may be included within the cell gap of the switching layers. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. In some embodiments it can be especially beneficial to use spacers which are black and sticky. Alternatively, the cell thickness may be set or maintained by other suitable means, e.g. by using column spacers. The column spacers may also be formed to give compartments, thus optionally allowing for free-cuttable structures. In some embodiments the switching layers may thus comprise segregated compartments which each contain the liquid crystalline medium, e.g. using rectangular or honeycomb structures.

The switching layers according to the invention can be arranged between two substrates, in particular two transparent substrates. The substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose). In a particularly preferred embodiment glass substrates are used. In an alternative embodiment plastic substrates are used.

Preferably alignment layers are used in the devices according to the invention, wherein the alignment layers can be any desired layers known to the person skilled in the art for this purpose. Preference is given to polyimide layers, particularly preferably layers comprising rubbed polyimide. In an embodiment planar alignment is provided, where more preferably a slight pretilt angle may be set. In an alternative embodiment homeotropic alignment is provided, where more preferably high pretilt angles are set.

In a preferred embodiment, the device according to the invention is a constituent of a window, more preferably a window component comprising at least one glass surface, particularly preferably a component of an insulated glazing unit.

The window element may suitably be integrated into the window, for example by lamination or gluing, preferably lamination to panes or glazing units.

Window here is taken to mean in particular a structure in a building, a car, a commercial vehicle, a boat, a train, an airplane and so on which comprises a frame and at least one substrate or pane, e.g. a plastic substrate or a glass pane, surrounded by this frame. In a preferred embodiment, in particular for architectural applications, the window preferably comprises a heat-insulating frame and two or more glass panes, i.e. multipane insulating glass.

According to a preferred embodiment, the device according to the invention is applied directly to a glass surface of a window, e.g. by lamination, particularly preferably in the interspace between two glass panes of multipane insulating glass.

The window element according to the invention or the window in which the window element can be integrated, e.g. arranged as a switchable glazing unit and in particular an insulated glazing unit, preferably comprises one or more layers which block UV light. In particular, the window element preferably comprises one or more layers which do not allow, or only do so to a very small proportion, the passage of light having a wavelength of less than 350 nm, preferably extending to less than 360 nm, particularly preferably even extending to less than 380 nm. In addition, low emissivity (low-e) coating may preferably be applied to one or more of the sheets.

The window can be part of a building, a container, a vehicle or another substantially closed space. The use of the window element for inside spaces which are subjected to strong insolation and/or strongly varying insolation from an outside place is particularly preferred.

Advantageously the window element can be operated such that even in the dark and scattering state meaningful quantities of daylight may still be transmitted, including direct and diffused light. This means that sufficient daylight can pass through such that the use of artificial lighting can be limited or even completely avoided leading to cost and energy savings.

Preferably, in the state which is light scattering and dark the window element according to the invention exhibits a transmittance, preferably a direct transmittance, of visible light, preferably of light having a wavelength of 550 nm, of less than 40%, preferably of less than 36%, more preferably of less than 30% and in particular less than 20%. In an embodiment the transmittance of the window element according to the invention in the state which is light scattering and dark is in the range from 14% to 36%.

By providing dimming and scattering together in the switchable device as presently configured, it is possible to more evenly distribute sunlight in an interior space, e.g. a building, wherein the scattering preferably occurs over a wide range of angles such that a more homogeneous distribution of light over all angles may be achieved. This form of light modulation can favourably result in effectively reduced glare from sunlight radiation and comfortable lighting conditions.

This favourable transmission behaviour of the multilayer arrangement and the window element may be determined using a bidirectional transmittance distribution function (BTDF).

Preferably, for a normally incident collimated light beam from a white light source, in the state which is light scattering and dark the window element according to the invention exhibits a ratio of the averaged intensity of light transmitted into radiation angles from −3° to +3° to the averaged intensity of light transmitted into radiation angles from −60° to +60° of 15 or less, more preferably 10 or less, even more preferably 5 or less, still more preferably 3.5 or less and in particular 2 or less. Preferably, the viewing angle dependent measurements, in particular the BTDF measurements, are performed using a viewing angle photometer based on Fourier optics, in particular an EZLite 120R instrument from Eldim using a white light source and normal incidence of the light to determine the angular dependence of the luminance of the transmitted light and the ratio of the averaged intensity of light transmitted into the different radiation angle ranges or cones.

In the present invention and especially in the following Examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| | Ring elements |
|---|---|
| C | (cyclohexane) |
| P | (benzene) |
| D | (dioxane) |

TABLE A-continued

| | Ring elements |
|---|---|
| A | [tetrahydropyran, 2,5-disubstituted] |
| G | [3-fluoro-1,4-phenylene] |
| U | [3,5-difluoro-1,4-phenylene] |
| Y | [2,3-difluoro-1,4-phenylene] |
| DI | [1,3-dioxane, 2,5-disubstituted] |
| AI | [tetrahydropyran, 2,5-disubstituted] |
| GI | [2-fluoro-1,4-phenylene] |
| UI | [2,6-difluoro-1,4-phenylene] |
| M | [pyrimidine-2,5-diyl] |
| N | [pyridine-2,5-diyl] |
| Np | [naphthalene-2,6-diyl] |
| N3f | [trifluoronaphthalene] |
| tH | [5,6,7,8-tetrahydronaphthalene-2,6-diyl] |
| tH2f | [difluorotetrahydronaphthalene] |
| K | [trifluoroindane] |
| L | [cyclohexene-1,4-diyl] |
| MI | [pyrimidine-2,5-diyl] |
| NI | [pyridine-2,5-diyl] |
| dH | [decahydronaphthalene-2,6-diyl] |
| N3fl | [trifluoronaphthalene] |
| tHI | [5,6,7,8-tetrahydronaphthalene-2,6-diyl] |
| tH2fl | [difluorotetrahydronaphthalene] |

TABLE A-continued

Ring elements

| | |
|---|---|
| KI |  |
| LI |  |
| F | 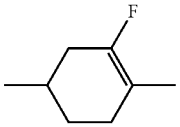 |
| Nf | 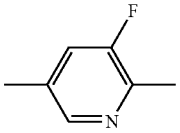 |
| FI | 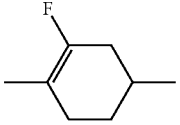 |
| Nfl | 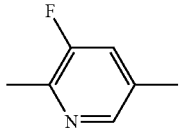 |

TABLE B

Linking groups

| | |
|---|---|
| E | —$CH_2CH_2$— |
| V | —CH=CH— |
| X | —CF=CH— |
| XI | —CH=CF— |
| B | —CF=CF— |
| T | —C≡C— |
| W | —$CF_2CF_2$— |
| Z | —CO—O— |
| ZI | —O—CO— |
| O | —$CH_2$—O— |
| OI | —O—$CH_2$— |
| Q | —$CF_2$—O— |
| QI | —O—$CF_2$— |

TABLE C

End groups

| Left-hand side | | Right-hand side | |
|---|---|---|---|
| \multicolumn{4}{c}{Used alone} | | | |
| -n- | $C_nH_{2n+1}$— | -n | —$C_nH_{2n+1}$ |
| -nO- | $C_nH_{2n+1}$—O— | -On | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -Cl- | Cl— | -Cl | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -FXO- | $CF_2$=CH-O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| \multicolumn{4}{c}{Used together with one another and with others} | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots are place-holders for other abbreviations from this table.

The following table shows illustrative structures together with their respective abbreviations. These are shown in order to illustrate the meaning of the rules for the abbreviations. They furthermore represent compounds which may be preferably used.

TABLE D

Illustrative structures

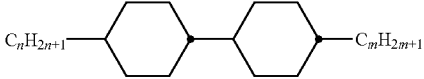

CC-n-m

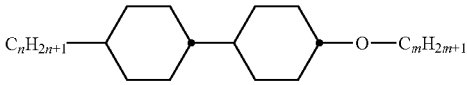

CC-n-Om

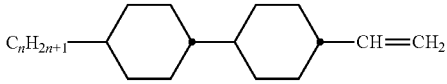

CC-n-V

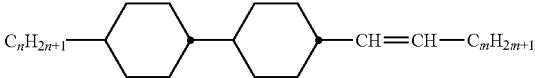

CC-n-Vm

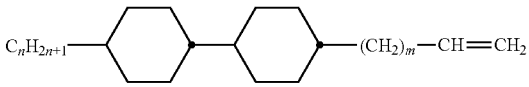

CC-n-mV

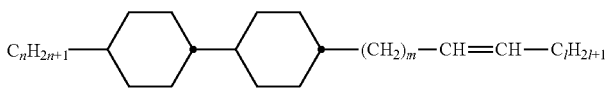

CC-n-mVl

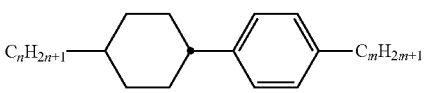

CP-n-m

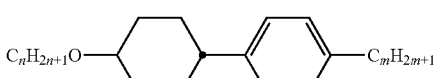

CP-nO-m

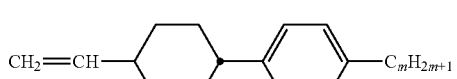

CP-V-m

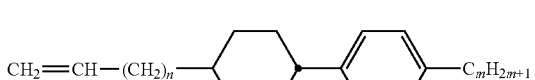

CP-Vn-m

TABLE D-continued
Illustrative structures
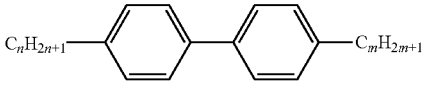
PP-n-m
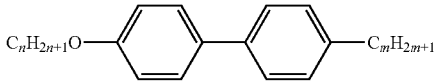
PP-nO-m
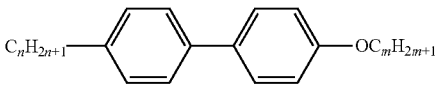
PP-n-Om
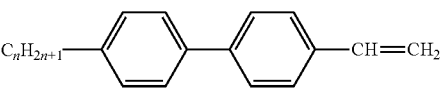
PP-n-V
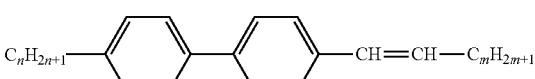
PP-n-Vm
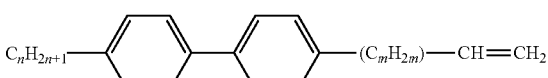
PP-n-mV
CCP-n-m
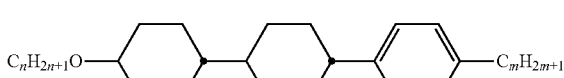
CCP-nO-m
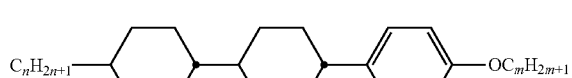
CCP-n-Om
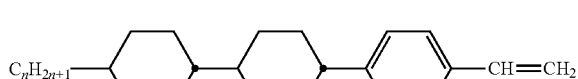
CCP-n-V
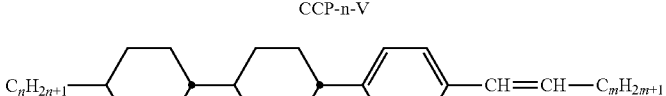
CCP-n-Vm TABLE D-continued
Illustrative structures
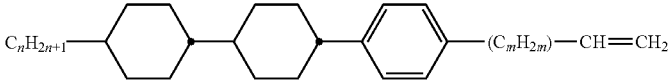
CCP-n-mV
CPP-n-m
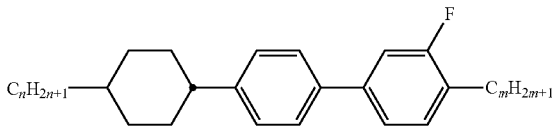
CPG-n-m
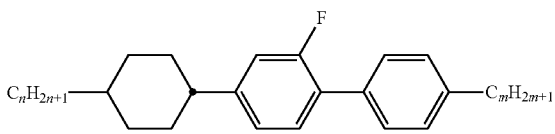
CGP-n-m
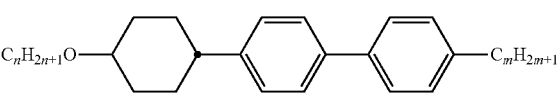
CPP-nO-m
CPP-n-Om
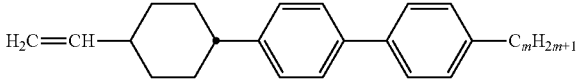
CPP-V-m
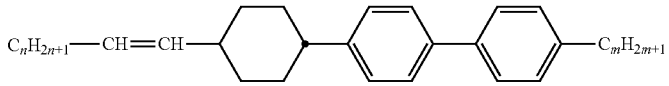
CPP-nV-m
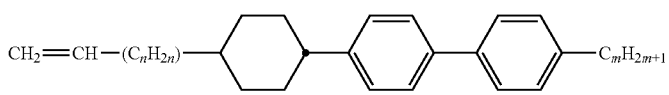
CPP-Vn-m
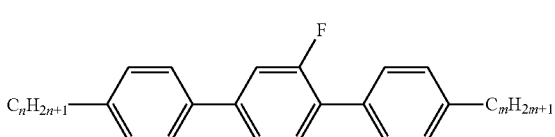
PGP-n-m TABLE D-continued
| Illustrative structures |
|---|
| 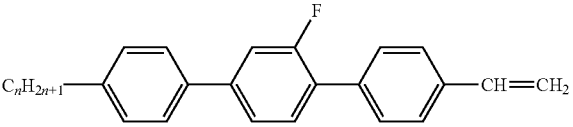 PGP-n-V |
| 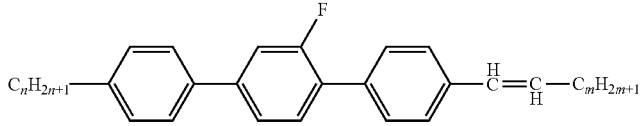 PGP-n-Vm |
| 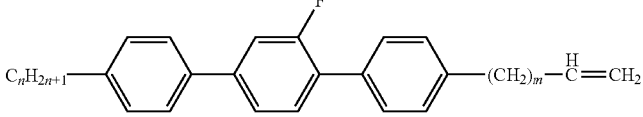 PGP-n-mV |
| 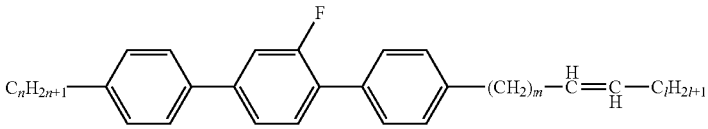 PGP-n-mVl |
| 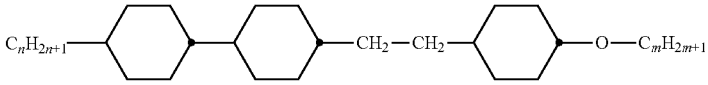 CCEC-n-Om |
| 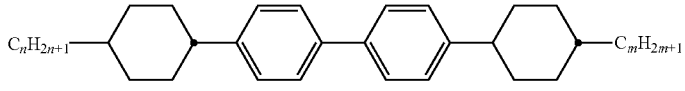 CPPC-n-m |
| 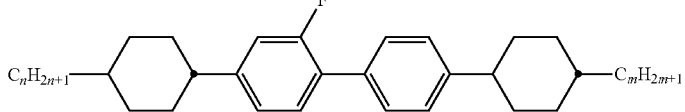 CGPC-n-m |
| 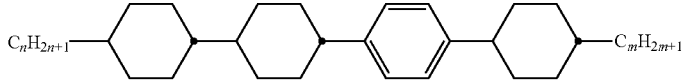 CCPC-n-m |

TABLE D-continued
Illustrative structures
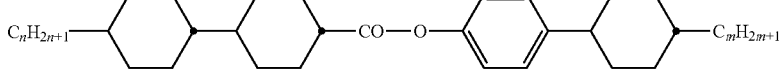
CCZPC-n-m
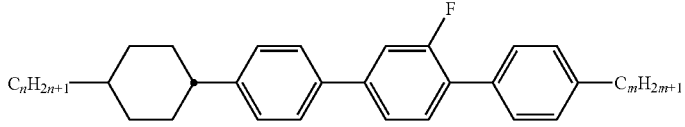
CPGP-n-m
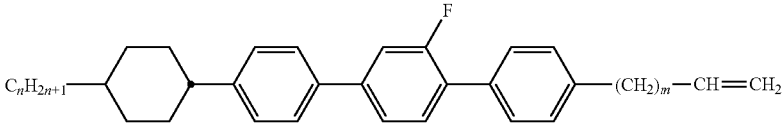
CPGP-n-mV
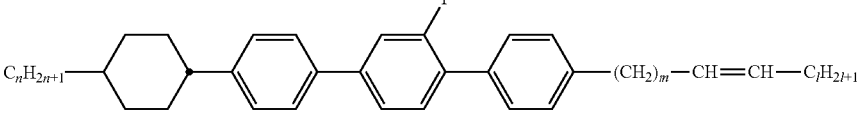
CPGP-n-mVI
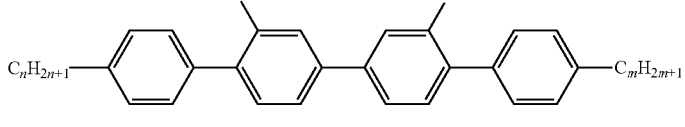
PGIGP-n-m
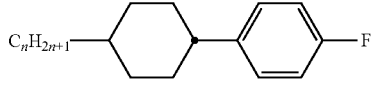
CP-n-F
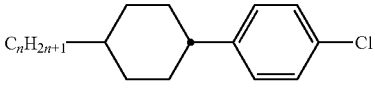
CP-n-Cl
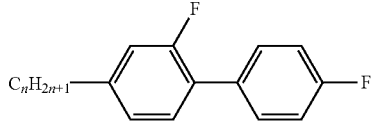
GP-n-F
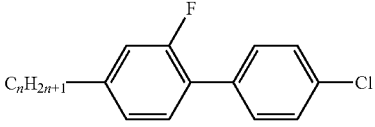
GP-n-Cl TABLE D-continued
Illustrative structures
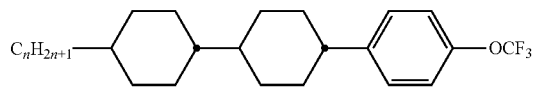
CCP-n-OT
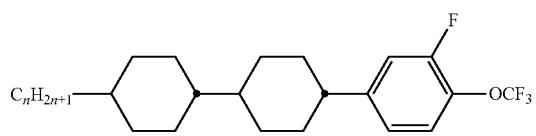
CCG-n-OT
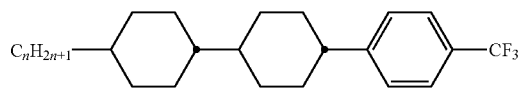
CCP-n-T
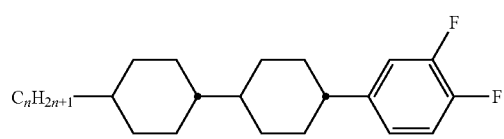
CCG-n-F
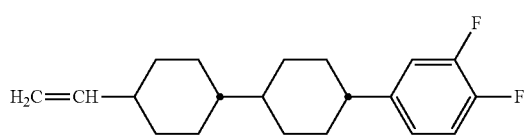
CCG-V-F
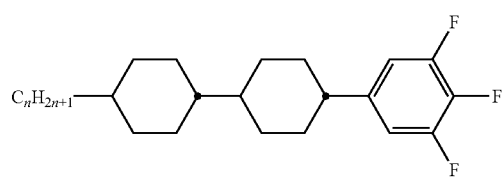
CCU-n-F
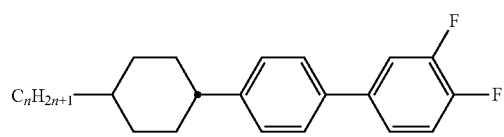
CPG-n-F
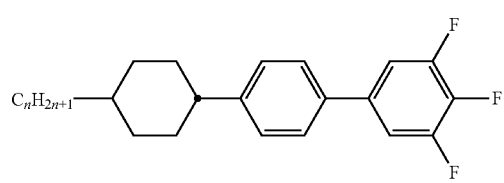
CPU-n-F TABLE D-continued
Illustrative structures
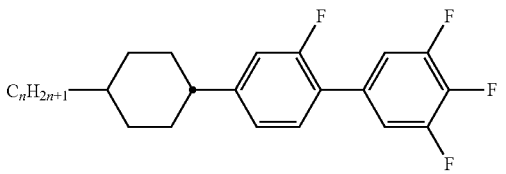
CGU-n-F
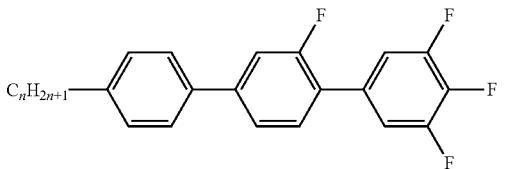
PGU-n-F
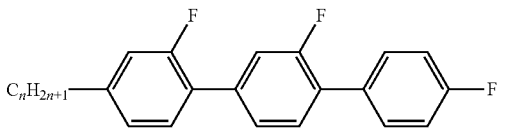
GGP-n-F
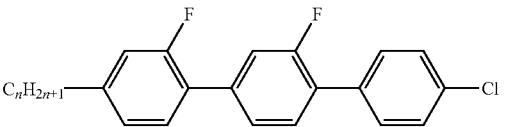
GGP-n-Cl
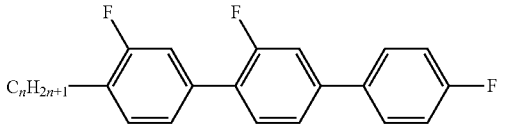
PGIGI-n-F
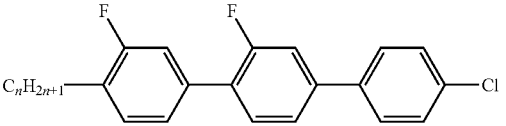
PGIGI-n-Cl
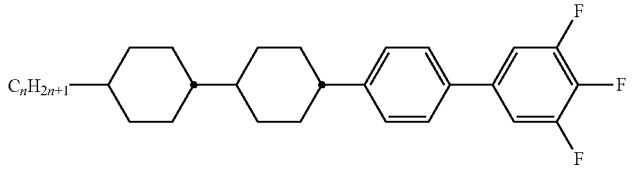
CCPU-n-F
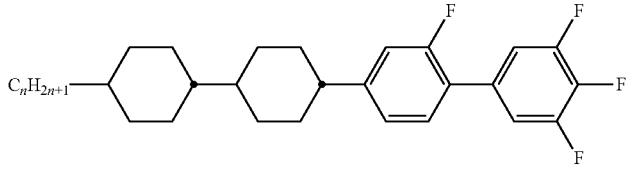
CCGU-n-F TABLE D-continued
Illustrative structures
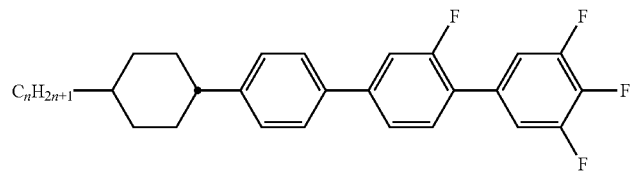
CPGU-n-F
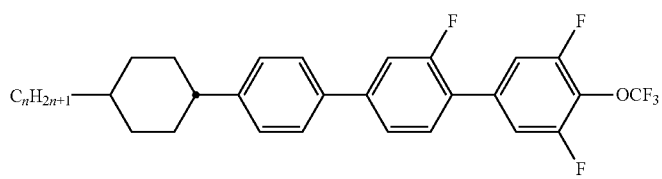
CPGU-n-OT
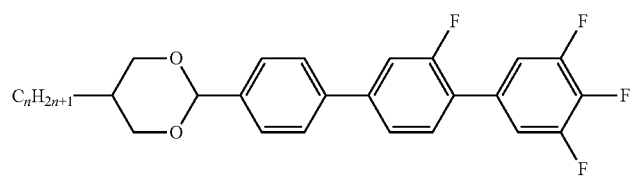
DPGU-n-F
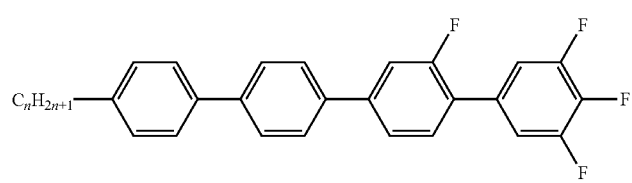
PPGU-n-F
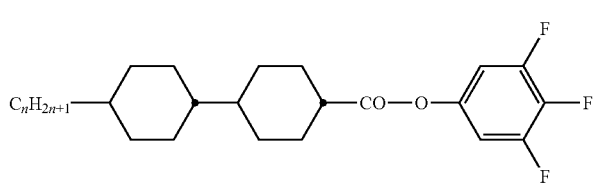
CCZU-n-F
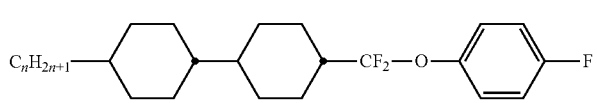
CCQP-n-F
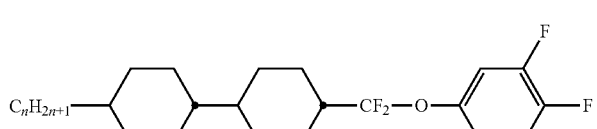
CCQG-n-F TABLE D-continued
Illustrative structures
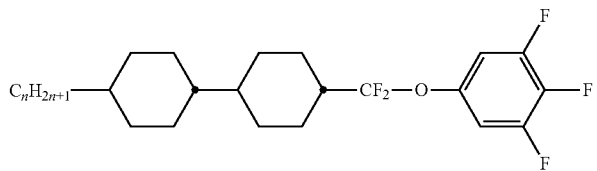
CCQU-n-F
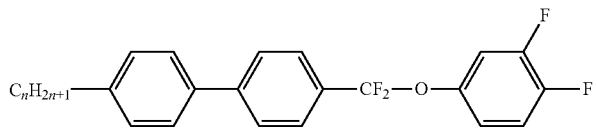
PPQG-n-F
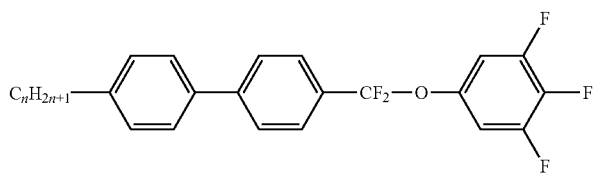
PPQU-n-F
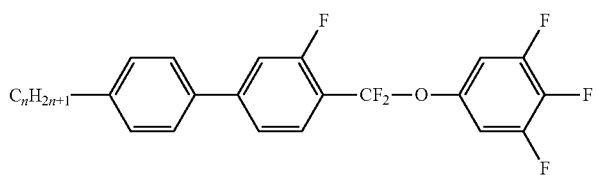
PGQU-n-F
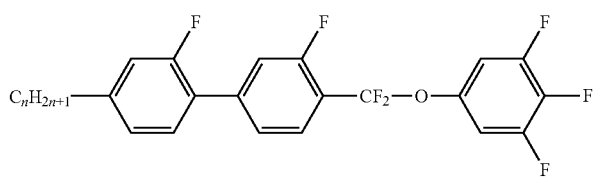
GGQU-n-F
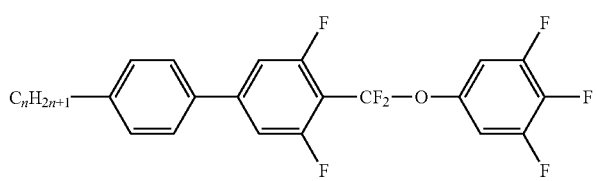
PUQU-n-F
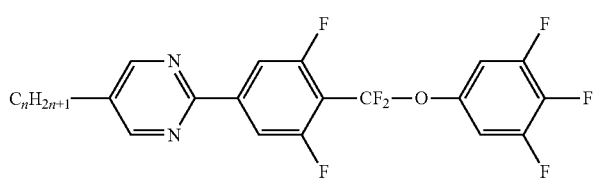
MUQU-n-F TABLE D-continued
Illustrative structures
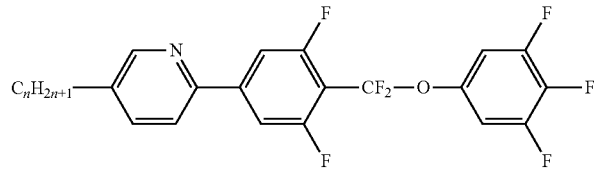
NUQU-n-F
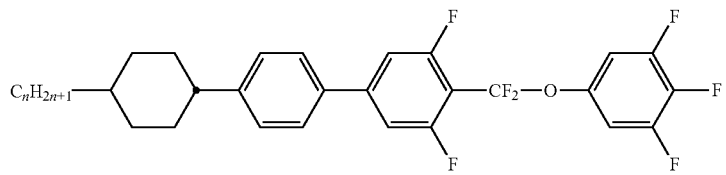
CPUQU-n-F
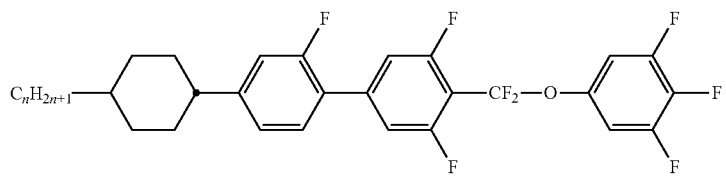
CGUQU-n-F
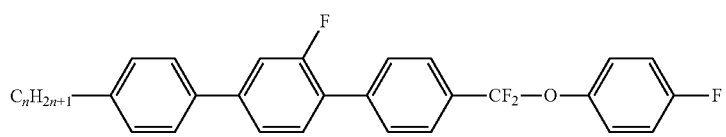
PGPQP-n-F
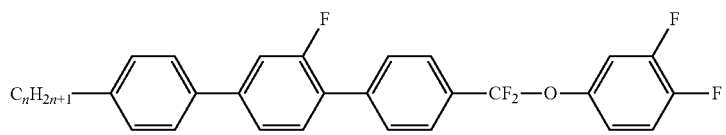
PGPQG-n-F
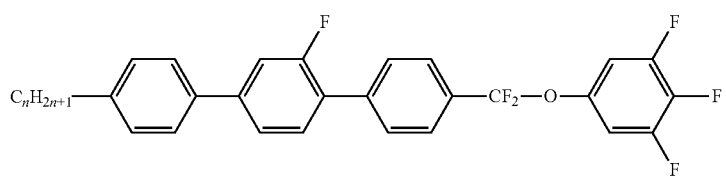
PGPQU-n-F
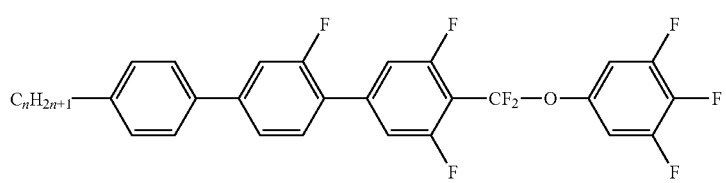
PGUQU-n-F TABLE D-continued
Illustrative structures
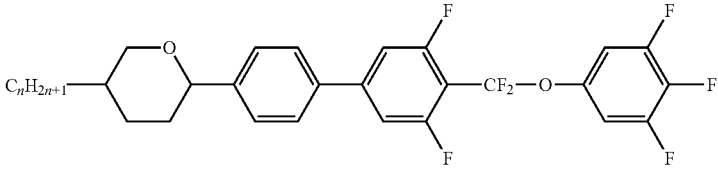
APUQU-n-F
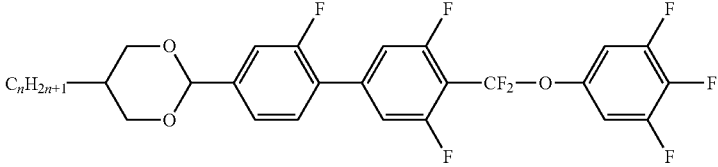
DGUQU-n-F
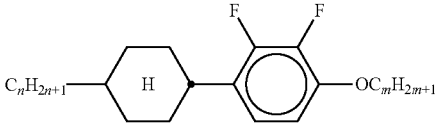
CY-n-Om
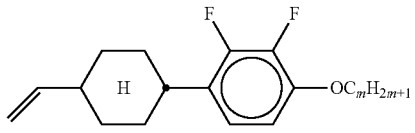
CY-V-Om
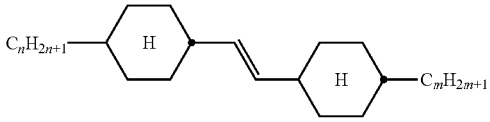
CVC-n-m
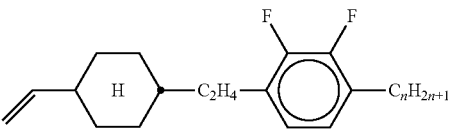
CEY-V-m
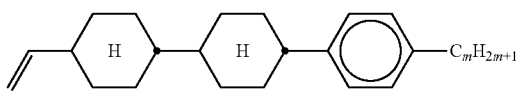
CCP-V-m
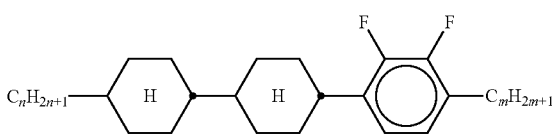
CCY-n-m TABLE D-continued
Illustrative structures
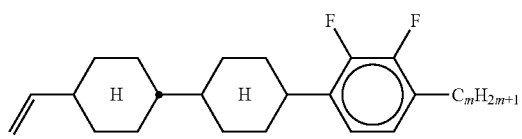
CCY-V-m
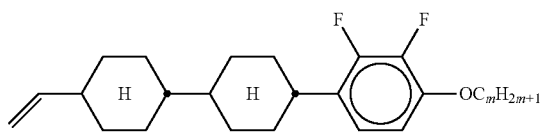
CCY-V-Om
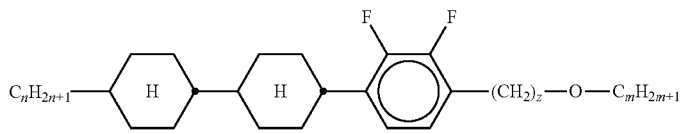
CCY-n-zOm
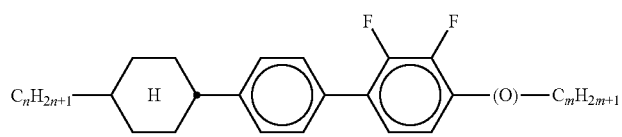
CPY-n-(O)m
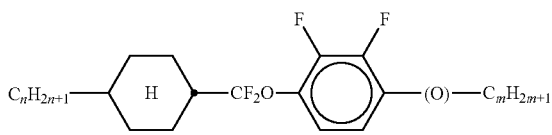
CQY-n-(O)m
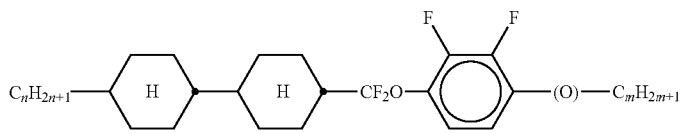
CCQY-n-(O)m
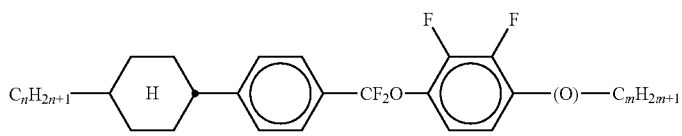
CPQY-n-(O)m
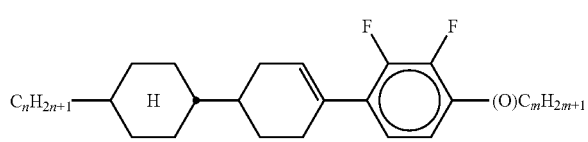
CLY-n-(O)m TABLE D-continued
Illustrative structures
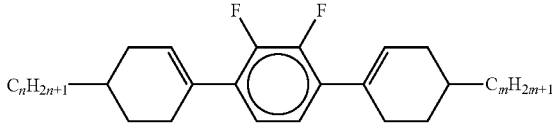
LYLI-n-m
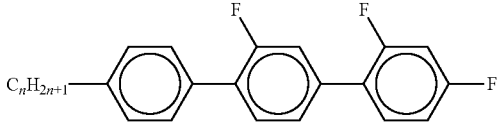
PGIGI-n-F
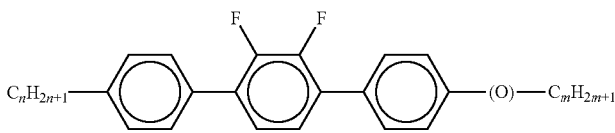
PYP-n-(O)m
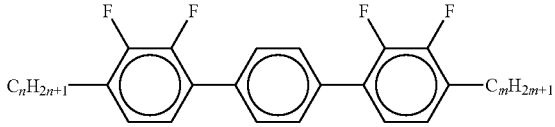
YPY-n-m
BCH-nm
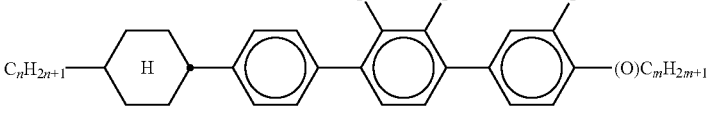
CPYP-n-(O)m
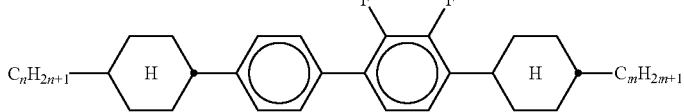
CPYC-n-m
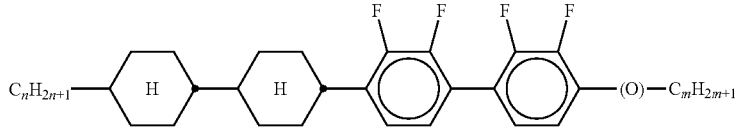
CCYY-n-m
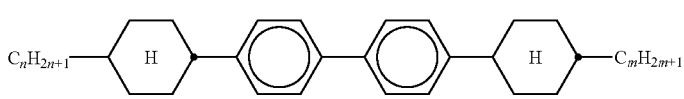
CBC-nm TABLE D-continued
Illustrative structures
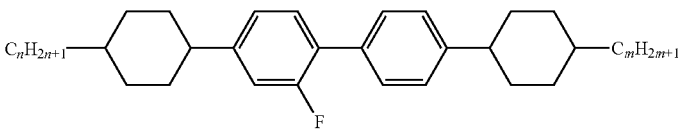
CBC-nmF
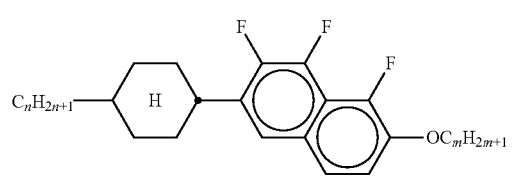
CNap-n-Om
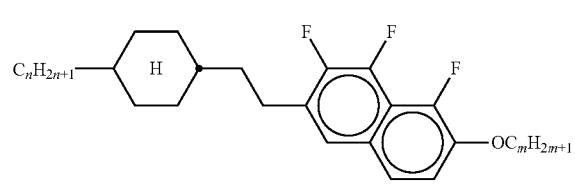
CENap-n-Om
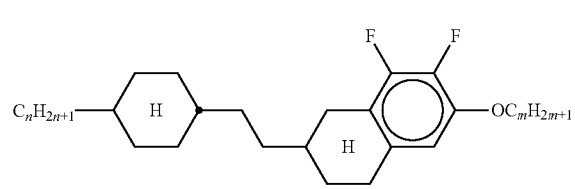
CETNap-n-Om
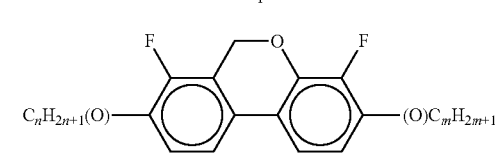
DFDBC-n(O)-(O)m
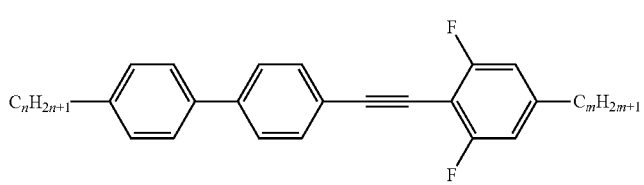
PPTUI-n-m
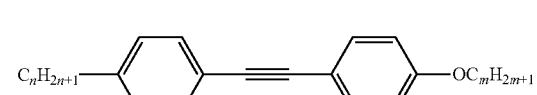
PTP-nOm
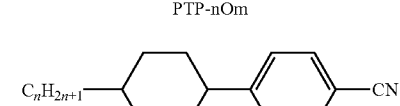
PCH-n TABLE D-continued Illustrative structures

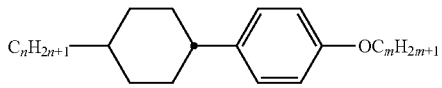

PCH-nOm

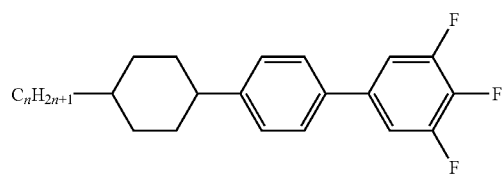

BCH-nF.F.F

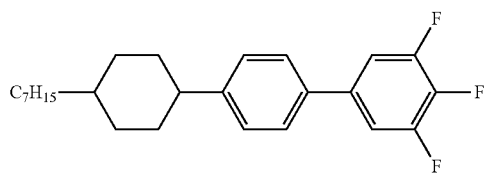

BCH-7F.F.F

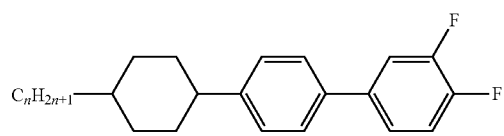

BCH-nF.F

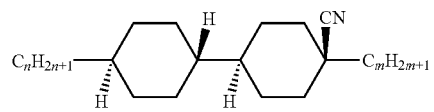

CC(CN)-n-m

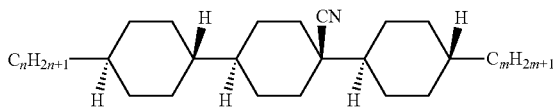

CC(CN)C-n-m wherein n, m and l preferably, independently of one another, denote 1 to 7.

The following table shows illustrative compounds which can be used as stabilizers in the media according to the present invention.

Table E shows possible stabilizers which can be added to the LC media according to the invention, wherein n denotes an integer from 1 to 12, preferably 1, 2, 3, 4, 5, 6, 7 or 8.

TABLE E

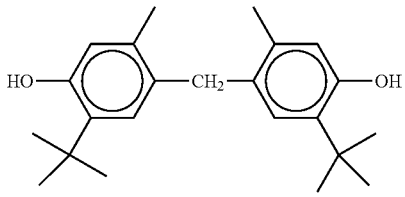

TABLE E-continued
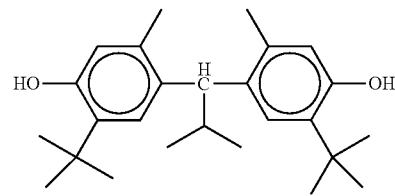
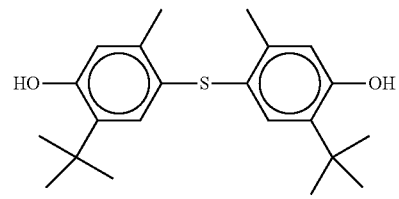
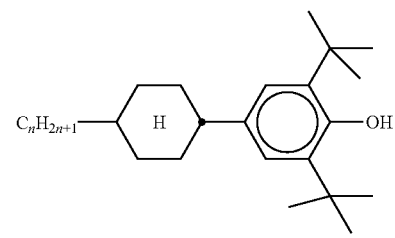
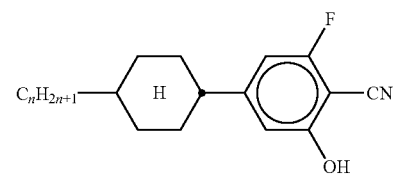
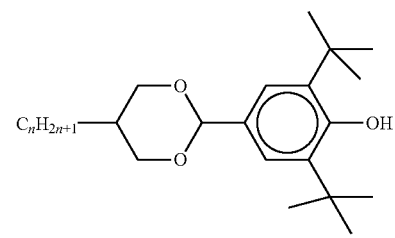
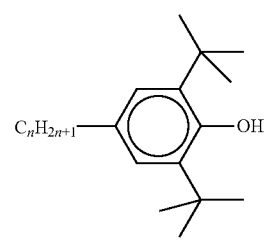
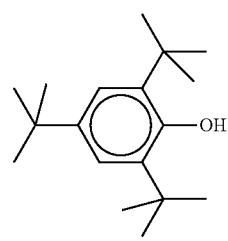

TABLE E-continued
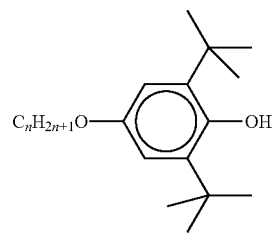
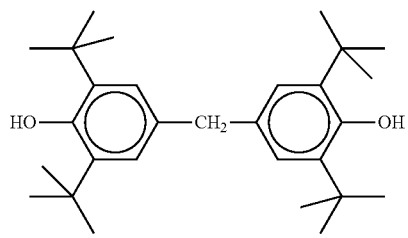
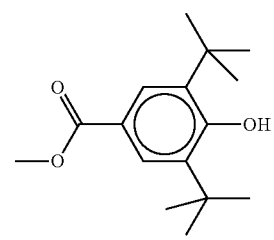
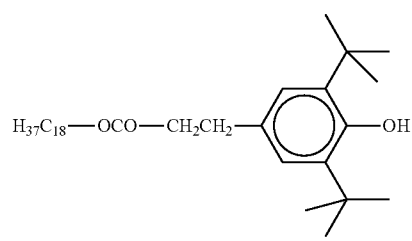
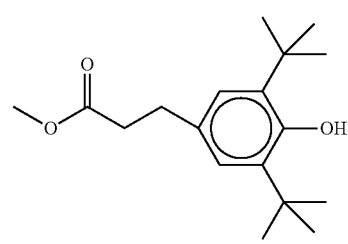
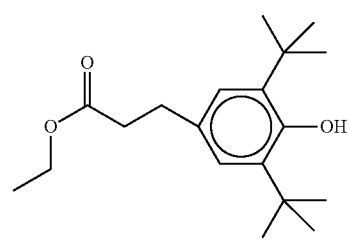

TABLE E-continued
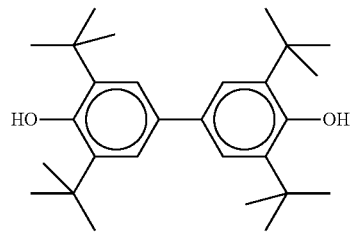
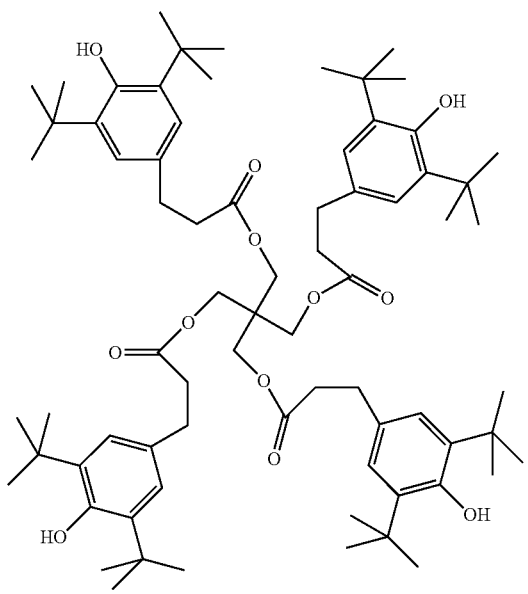 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
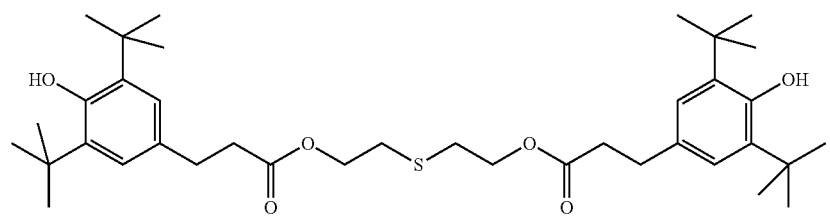 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
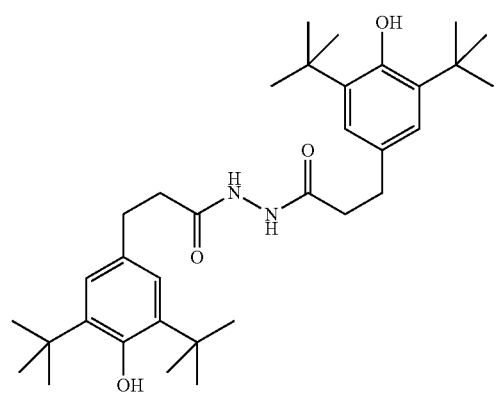 [SMILES: CC(C)(C)c1cc(CCC(=O)NNC(=O)CCc2cc(C(C)(C)C)c(O)c(C(C)(C)C)c2)cc(C(C)(C)C)c1O]

TABLE E-continued
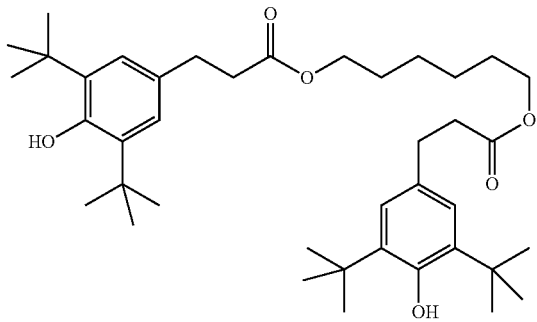 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
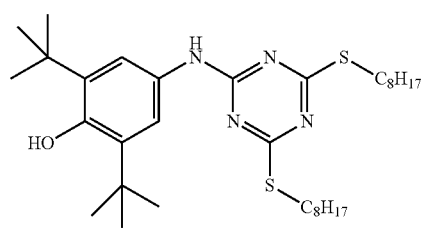
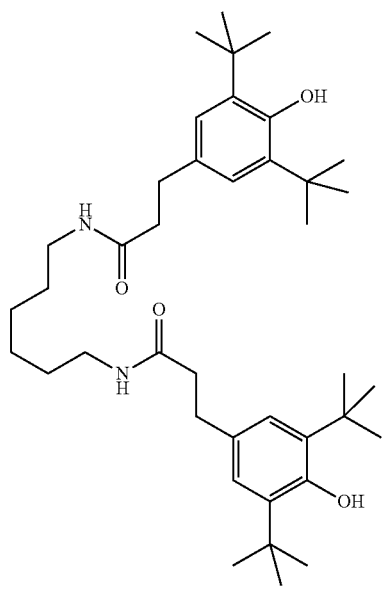 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
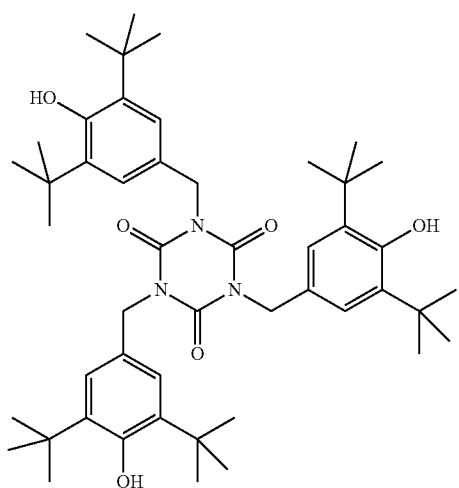 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE E-continued
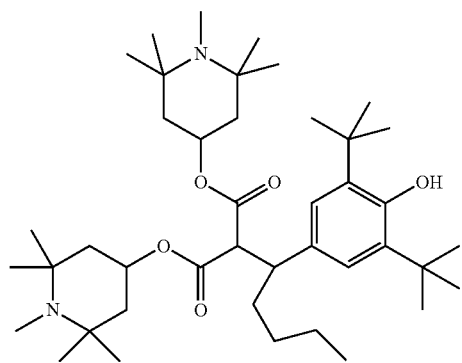 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
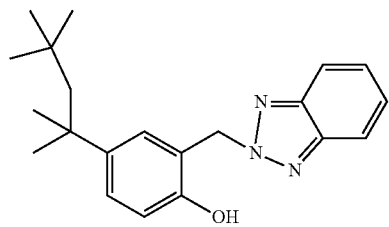 [SMILES: CC(C)(C)CC(C)(C)c1ccc(O)c(Cn2nc3ccccc3n2)c1]
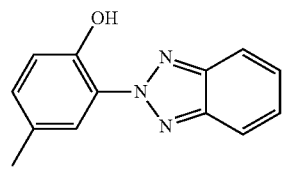 [SMILES: Cc1ccc(O)c(-n2nc3ccccc3n2)c1]
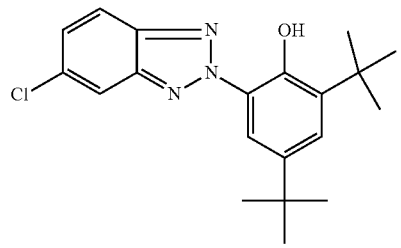 [SMILES: CC(C)(C)c1cc(-n2nc3ccc(Cl)cc3n2)c(O)c(C(C)(C)C)c1]
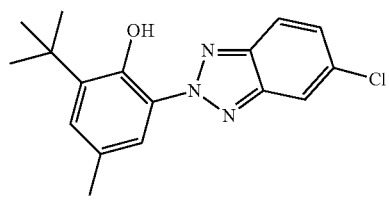 [SMILES: Cc1cc(-n2nc3ccc(Cl)cc3n2)c(O)c(C(C)(C)C)c1]
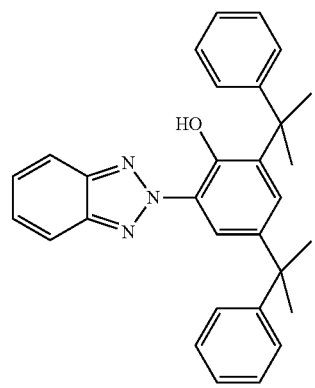 [SMILES: CC(C)(c1ccccc1)c1cc(-n2nc3ccccc3n2)c(O)c(C(C)(C)c2ccccc2)c1]

TABLE E-continued
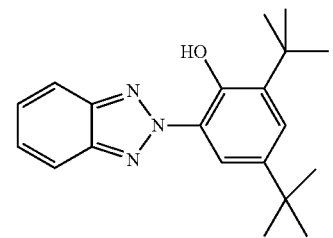 [SMILES: CC(C)(C)c1cc(-n2nc3ccccc3n2)c(O)c(C(C)(C)C)c1]
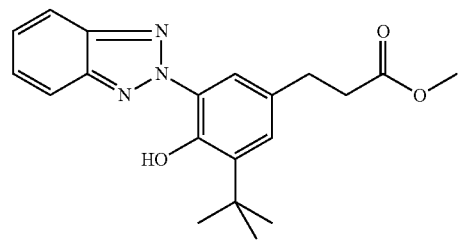 [SMILES: COC(=O)CCc1cc(-n2nc3ccccc3n2)c(O)c(C(C)(C)C)c1]
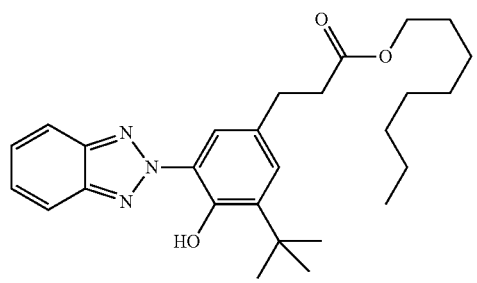 [SMILES: CCCCCCCCOC(=O)CCc1cc(-n2nc3ccccc3n2)c(O)c(C(C)(C)C)c1]
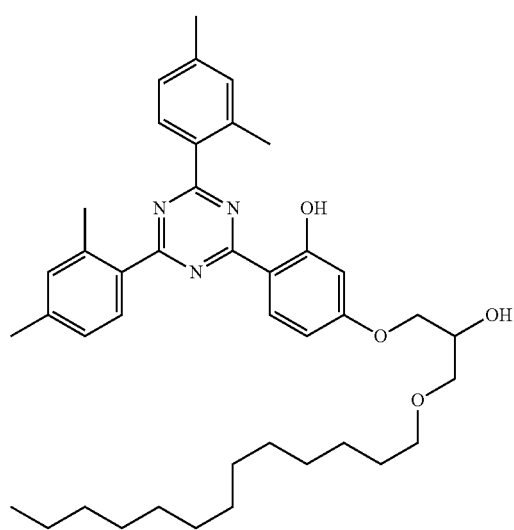 [SMILES: CCCCCCCCCCCCCOCC(O)COc1ccc(-c2nc(-c3ccc(C)cc3C)nc(-c3ccc(C)cc3C)n2)c(O)c1]

TABLE E-continued
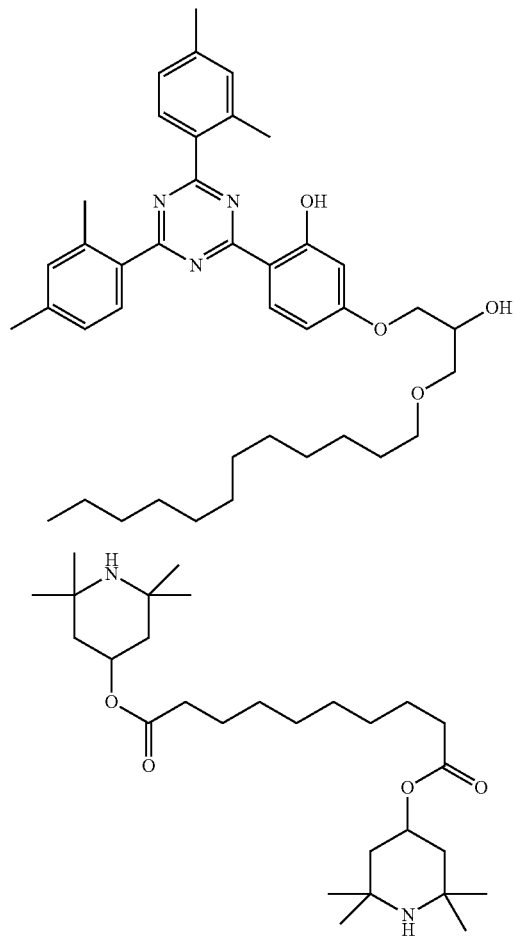
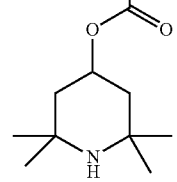
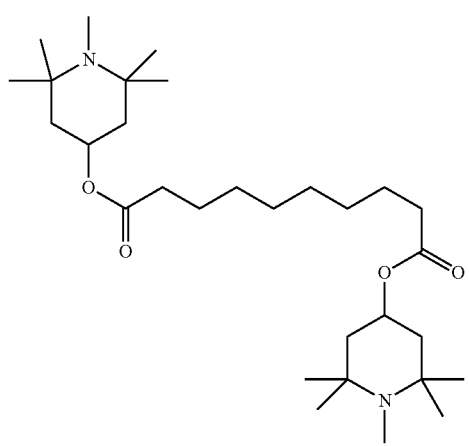

TABLE E-continued
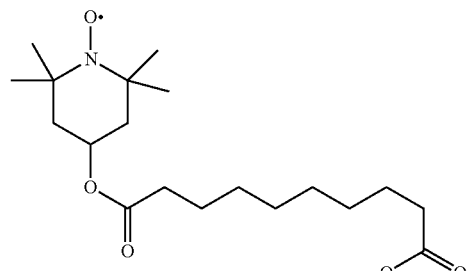
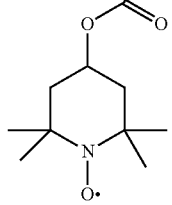
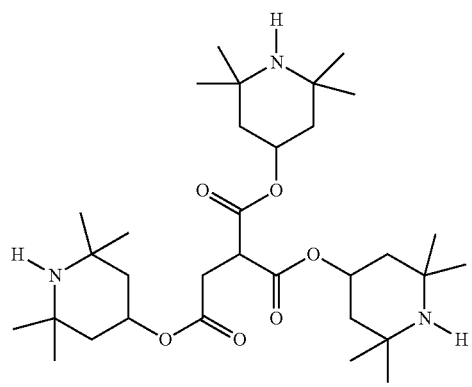
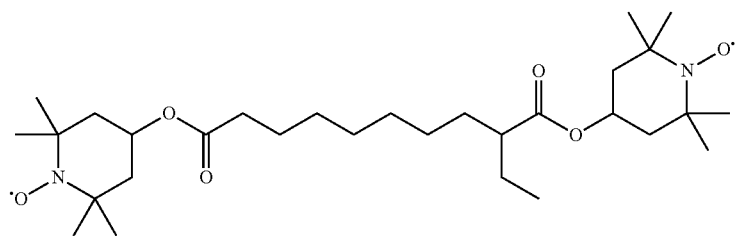
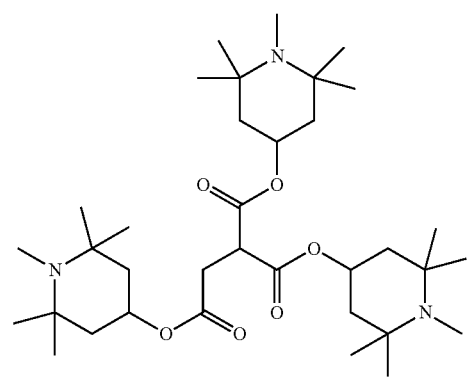

TABLE E-continued
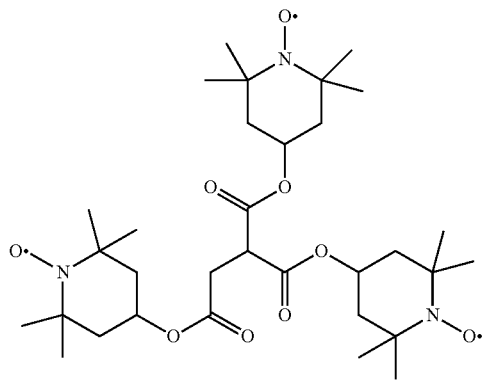
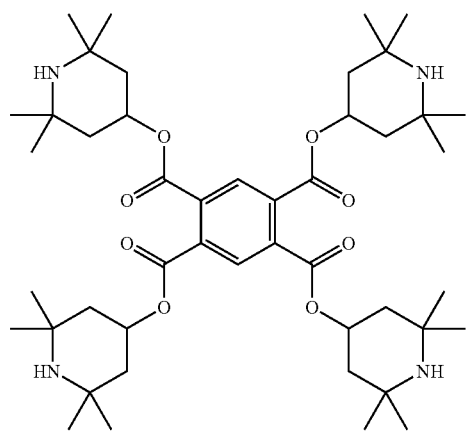
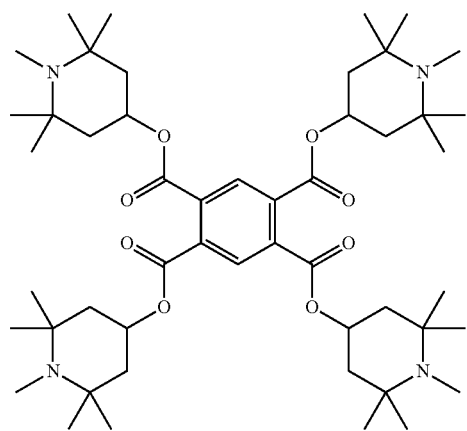

TABLE E-continued
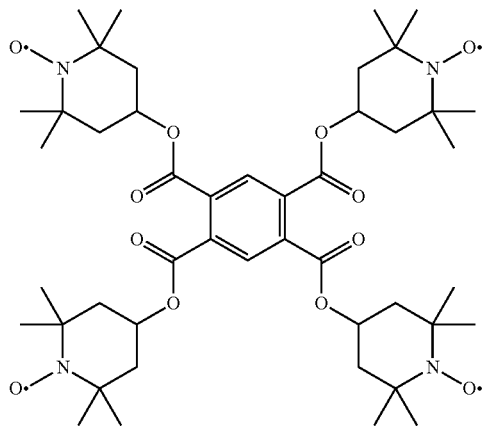
The LC media preferably comprise 0 to 10% by weight, in particular 1 ppm to 5% by weight, particularly preferably 1 ppm to 1% by weight, of stabilizers.
Table F below shows illustrative compounds which can preferably be used as chiral dopants in the mesogenic media according to the present invention.
TABLE F
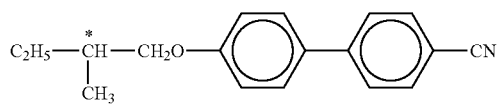
C 15
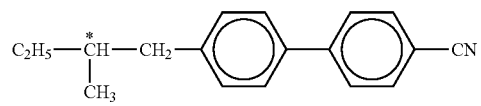
CB 15
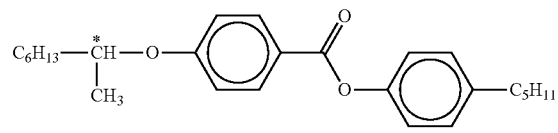
CM 21
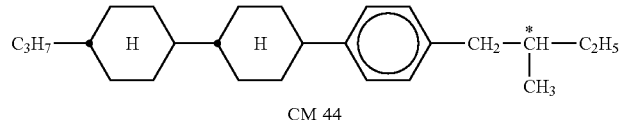
CM 44
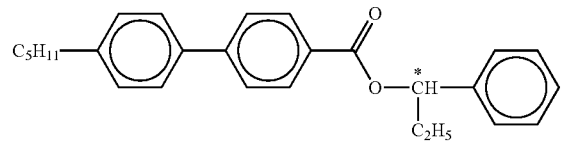
CM 45
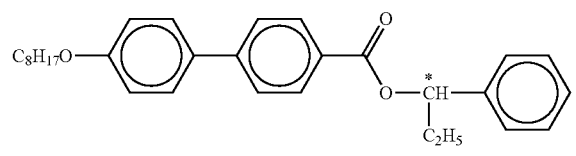
CM 47

TABLE F-continued
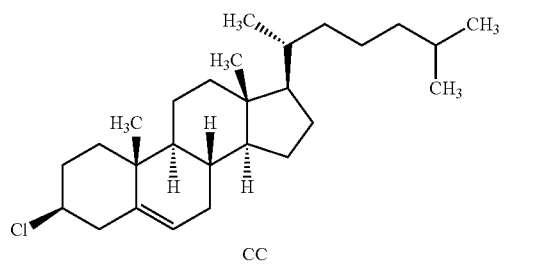
CC
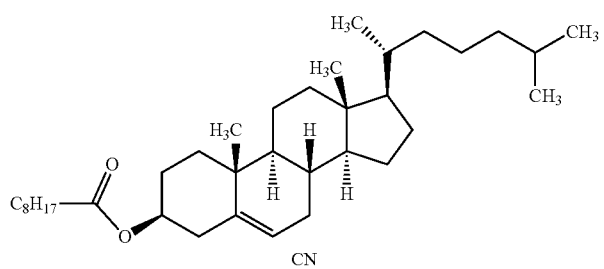
CN
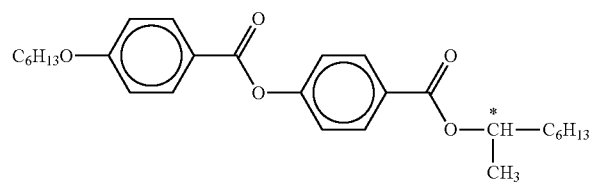
R/S-811
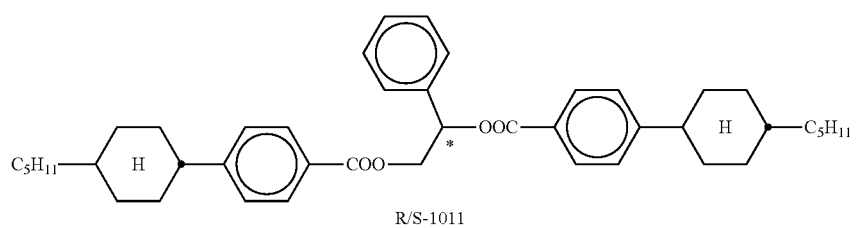
R/S-1011
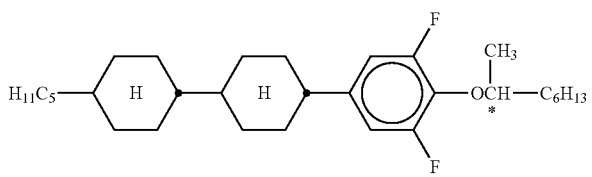
R/S-2011
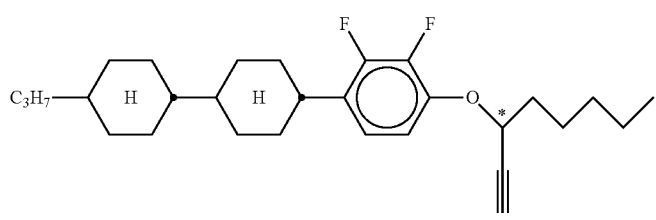
R/S-3011
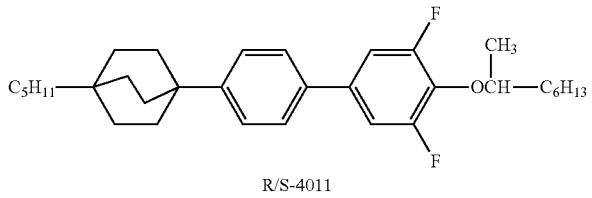
R/S-4011

TABLE F-continued

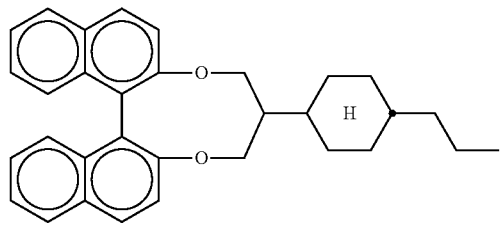

2
R/S-5011

In a preferred embodiment of the present invention, the mesogenic media comprise one or more compounds selected from the compounds shown in Table F.

The mesogenic media according to the present invention preferably comprise two or more, preferably four or more, compounds selected from the compounds shown in the above tables D to F.

In an embodiment the LC media according to the present invention preferably comprise three or more, more preferably five or more compounds shown in Table D.

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

TABLE G

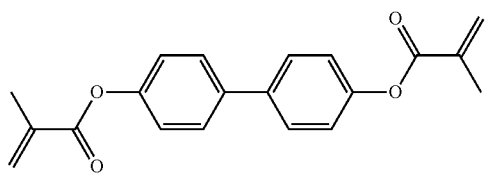

RM-1

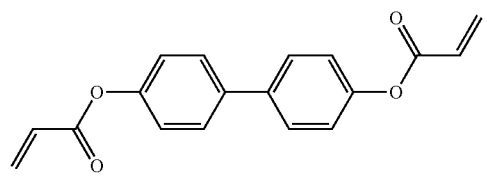 [SMILES: C=CC(=O)Oc1ccc(-c2ccc(OC(=O)C=C)cc2)cc1]

RM-2

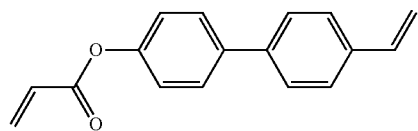 [SMILES: C=CC(=O)Oc1ccc(-c2ccc(C=C)cc2)cc1]

RM-3

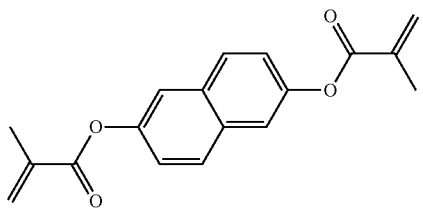 [SMILES: C=C(C)C(=O)Oc1ccc2cc(OC(=O)C(=C)C)ccc2c1]

RM-4

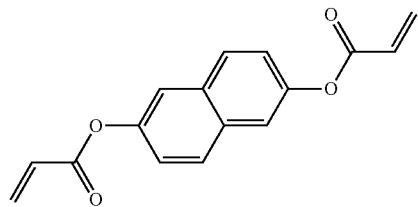 [SMILES: C=CC(=O)Oc1ccc2cc(OC(=O)C=C)ccc2c1]

RM-5

TABLE G-continued
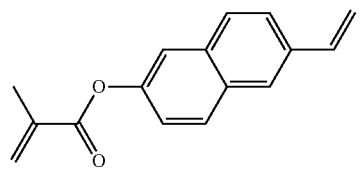 [SMILES: C=Cc1ccc2cc(OC(=O)C(=C)C)ccc2c1] RM-6
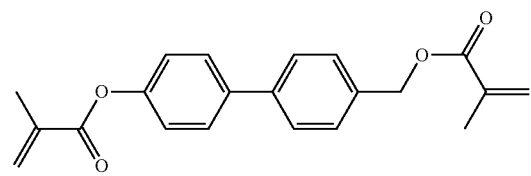 [SMILES: C=C(C)C(=O)OCc1ccc(-c2ccc(OC(=O)C(=C)C)cc2)cc1] RM-7
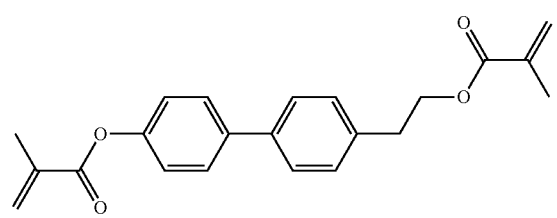 [SMILES: C=C(C)C(=O)OCCc1ccc(-c2ccc(OC(=O)C(=C)C)cc2)cc1] RM-8
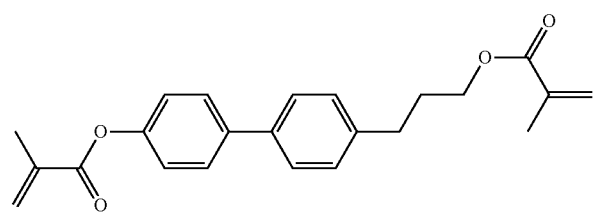 [SMILES: C=C(C)C(=O)OCCCc1ccc(-c2ccc(OC(=O)C(=C)C)cc2)cc1] RM-9
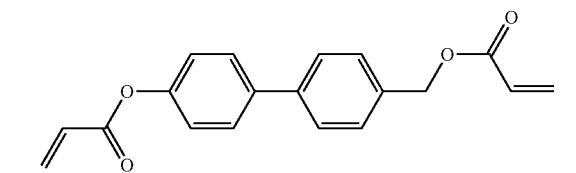 [SMILES: C=CC(=O)OCc1ccc(-c2ccc(OC(=O)C=C)cc2)cc1] RM-10
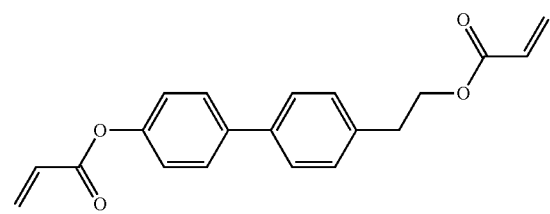 [SMILES: C=CC(=O)OCCc1ccc(-c2ccc(OC(=O)C=C)cc2)cc1] RM-11
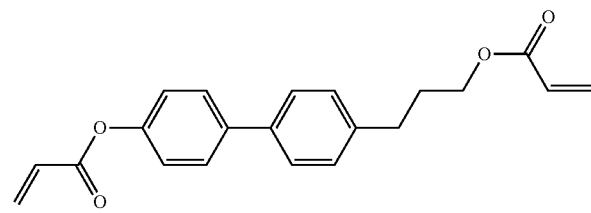 [SMILES: C=CC(=O)OCCCc1ccc(-c2ccc(OC(=O)C=C)cc2)cc1] RM-12
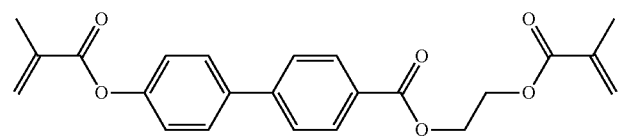 [SMILES: C=C(C)C(=O)OCCOC(=O)c1ccc(-c2ccc(OC(=O)C(=C)C)cc2)cc1] RM-13

TABLE G-continued
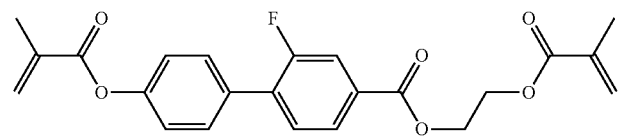 [SMILES: C=C(C)C(=O)OCCOC(=O)c1ccc(-c2ccc(OC(=O)C(=C)C)cc2)c(F)c1] RM-14
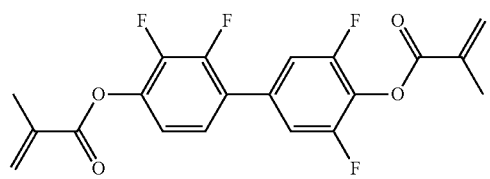 RM-15
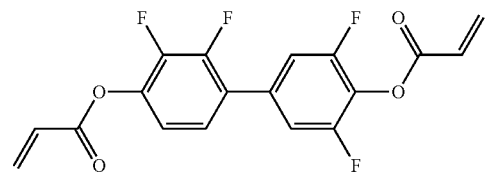 [SMILES: C=CC(=O)Oc1ccc(-c2cc(F)c(OC(=O)C=C)c(F)c2)c(F)c1F] RM-16
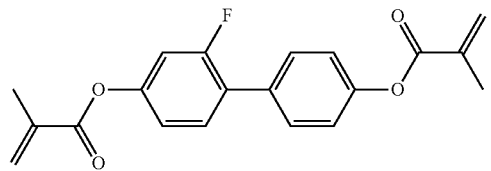 [SMILES: C=C(C)C(=O)Oc1ccc(-c2ccc(OC(=O)C(=C)C)cc2F)cc1] RM-17
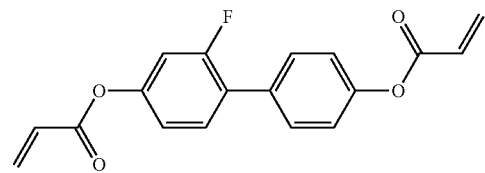 RM-18
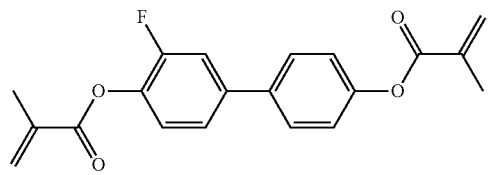 [SMILES: C=C(C)C(=O)Oc1ccc(-c2ccc(OC(=O)C(=C)C)c(F)c2)cc1] RM-19
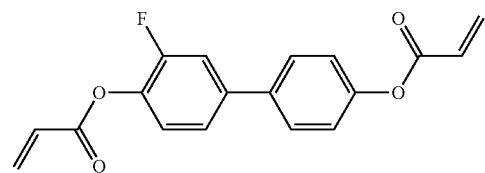 [SMILES: C=CC(=O)Oc1ccc(-c2ccc(OC(=O)C=C)c(F)c2)cc1] RM-20
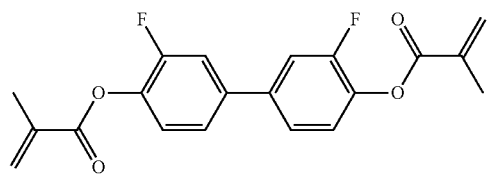 [SMILES: C=C(C)C(=O)Oc1ccc(-c2ccc(OC(=O)C(=C)C)c(F)c2)cc1F] RM-21
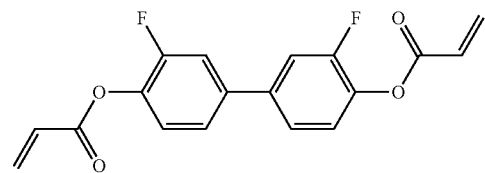 RM-22

TABLE G-continued
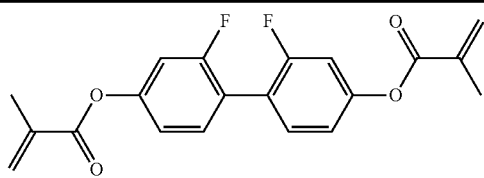 RM-23
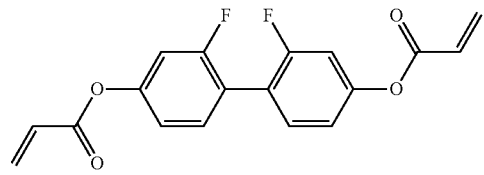 [SMILES: C=CC(=O)Oc1ccc(-c2ccc(OC(=O)C=C)cc2F)c(F)c1] RM-24
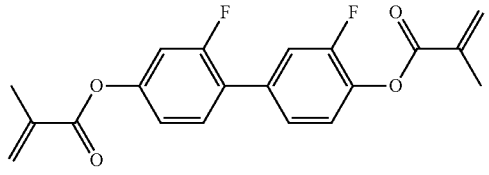 RM-25
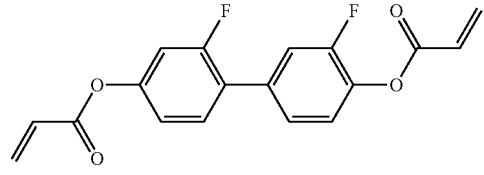 RM-26
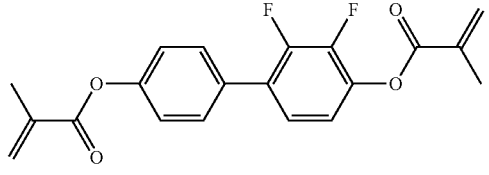 [SMILES: C=C(C)C(=O)Oc1ccc(-c2ccc(OC(=O)C(=C)C)c(F)c2F)cc1] RM-27
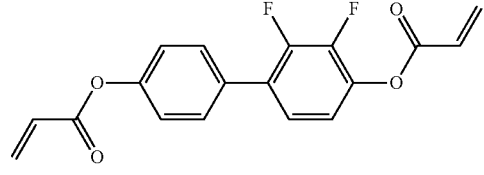 [SMILES: C=CC(=O)Oc1ccc(-c2ccc(OC(=O)C=C)c(F)c2F)cc1] RM-28
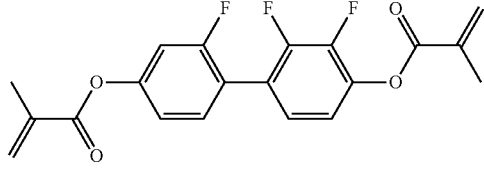 [SMILES: C=C(C)C(=O)Oc1ccc(-c2ccc(OC(=O)C(=C)C)c(F)c2F)c(F)c1] RM-29
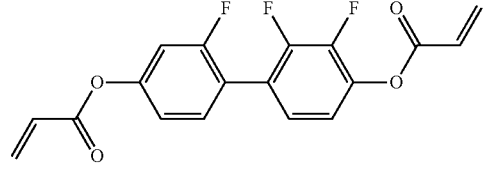 RM-30
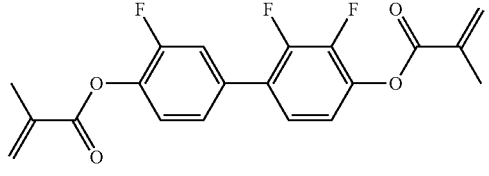 [SMILES: C=C(C)C(=O)Oc1ccc(-c2ccc(OC(=O)C(=C)C)c(F)c2F)cc1F] RM-31

TABLE G-continued
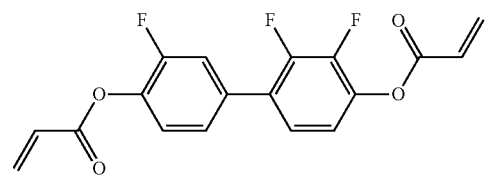 [SMILES: C=CC(=O)Oc1ccc(-c2ccc(OC(=O)C=C)c(F)c2F)cc1F] RM-32
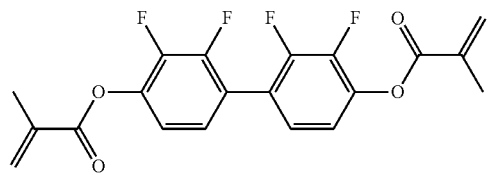 [SMILES: C=C(C)C(=O)Oc1ccc(-c2ccc(OC(=O)C(=C)C)c(F)c2F)c(F)c1F] RM-33
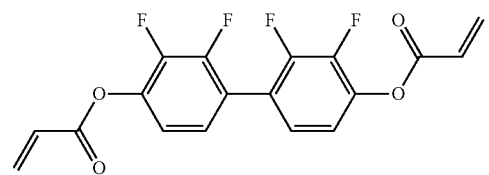 RM-34
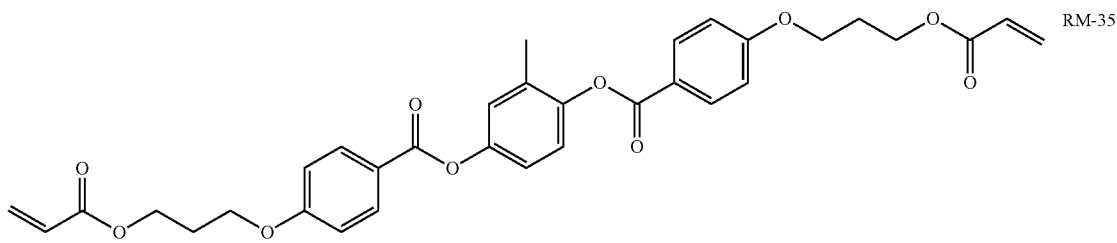 RM-35
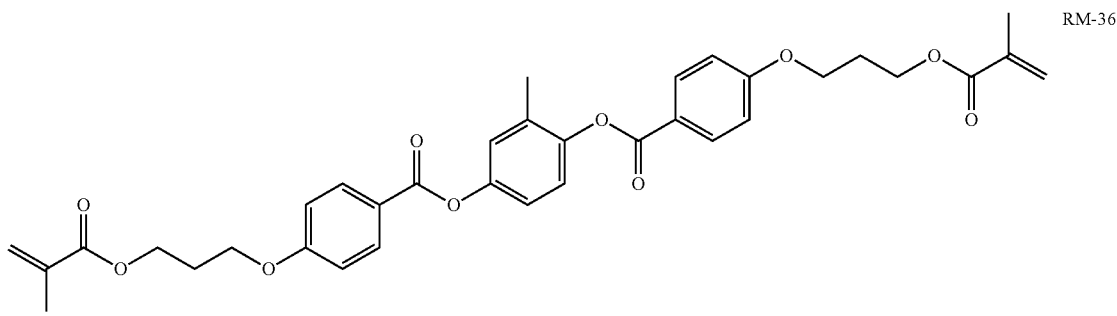 RM-36
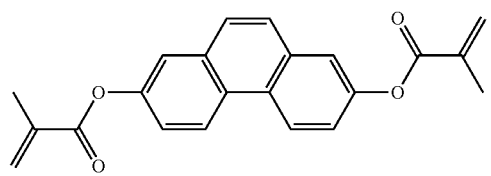 [SMILES: C=C(C)C(=O)Oc1ccc2c(ccc3cc(OC(=O)C(=C)C)ccc32)c1] RM-37
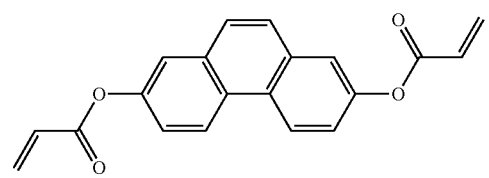 [SMILES: C=CC(=O)Oc1ccc2c(ccc3cc(OC(=O)C=C)ccc32)c1] RM-38

TABLE G-continued
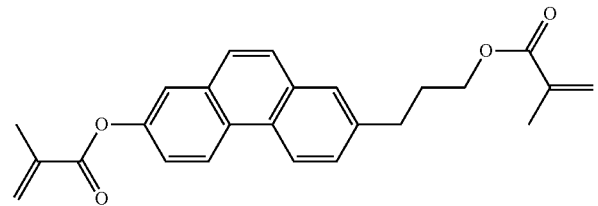 [SMILES: C=C(C)C(=O)OCCCc1ccc2c(ccc3cc(OC(=O)C(=C)C)ccc32)c1]
RM-39
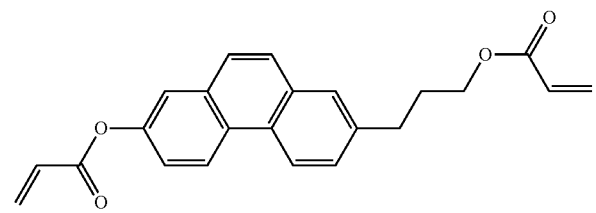 [SMILES: C=CC(=O)OCCCc1ccc2c(ccc3cc(OC(=O)C=C)ccc32)c1]
RM-40
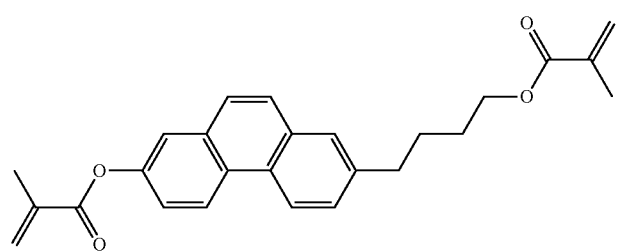
RM-41
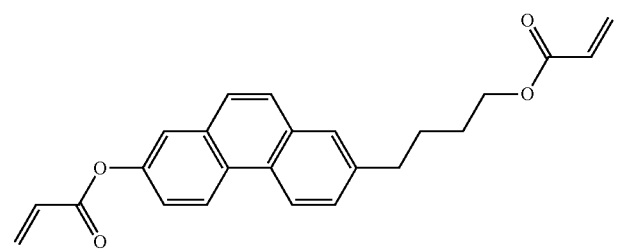 [SMILES: C=CC(=O)OCCCCc1ccc2c(ccc3cc(OC(=O)C=C)ccc32)c1]
RM-42
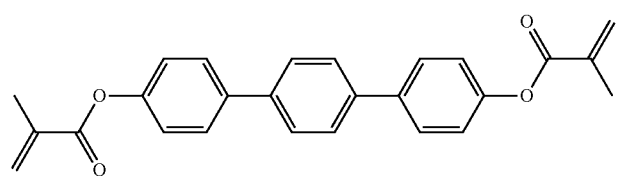
RM-43
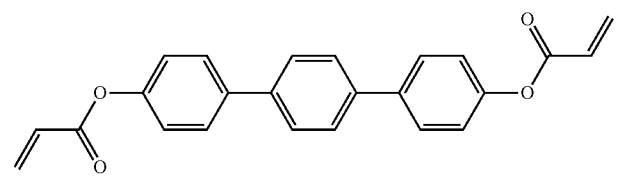
RM-44
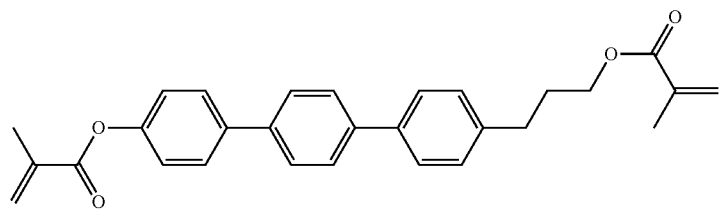 [SMILES: C=C(C)C(=O)OCCCc1ccc(-c2ccc(-c3ccc(OC(=O)C(=C)C)cc3)cc2)cc1]
RM-45

TABLE G-continued
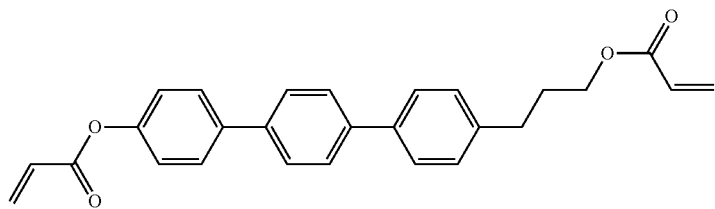 [SMILES: C=CC(=O)OCCCc1ccc(-c2ccc(-c3ccc(OC(=O)C=C)cc3)cc2)cc1] RM-46
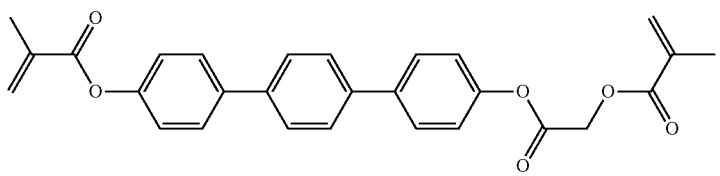 RM-47
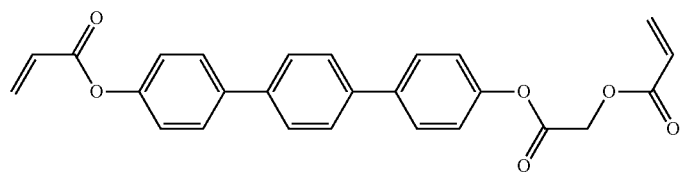 [SMILES: C=CC(=O)OCC(=O)Oc1ccc(-c2ccc(-c3ccc(OC(=O)C=C)cc3)cc2)cc1] RM-48
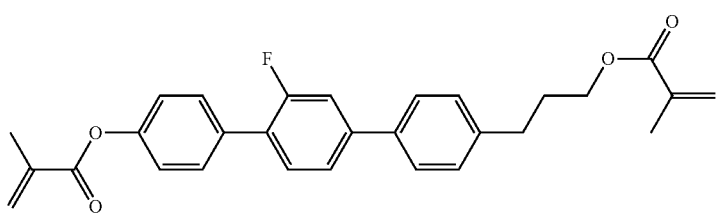 [SMILES: C=C(C)C(=O)OCCCc1ccc(-c2ccc(-c3ccc(OC(=O)C(=C)C)cc3)c(F)c2)cc1] RM-49
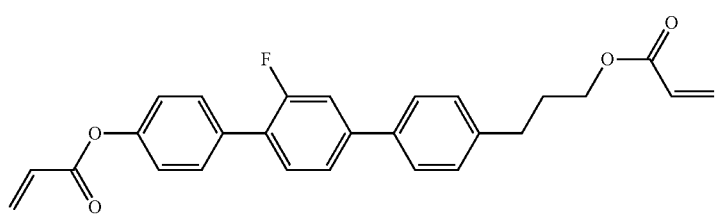 [SMILES: C=CC(=O)OCCCc1ccc(-c2ccc(-c3ccc(OC(=O)C=C)cc3)c(F)c2)cc1] RM-50
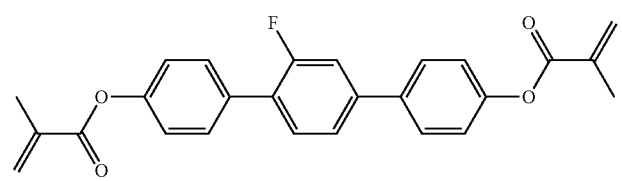 [SMILES: C=C(C)C(=O)Oc1ccc(-c2ccc(-c3ccc(OC(=O)C(=C)C)cc3)c(F)c2)cc1] RM-51
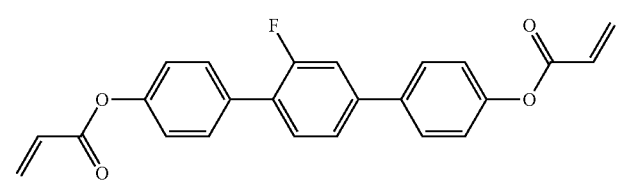 RM-52
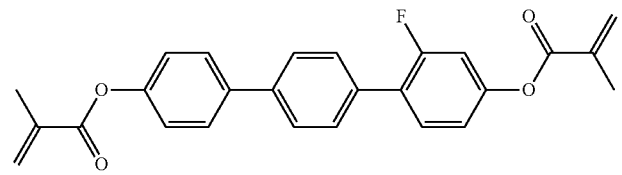 [SMILES: C=C(C)C(=O)Oc1ccc(-c2ccc(-c3ccc(OC(=O)C(=C)C)cc3F)cc2)cc1] RM-53

TABLE G-continued
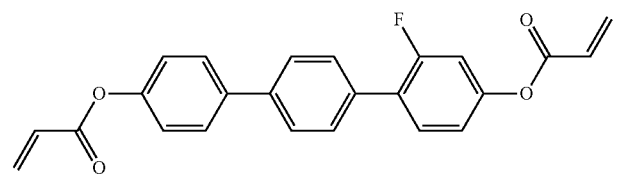 [SMILES: C=CC(=O)Oc1ccc(-c2ccc(-c3ccc(OC(=O)C=C)cc3F)cc2)cc1] RM-54
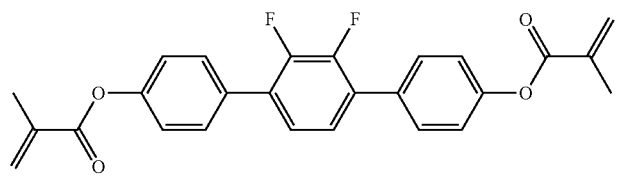 RM-55
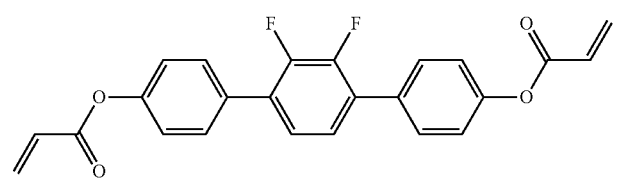 [SMILES: C=C(C)C(=O)Oc1ccc(-c2ccc(-c3ccc(OC(=O)C(=C)C)cc3)c(F)c2F)cc1] RM-56
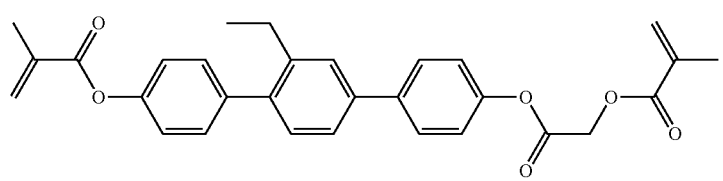 [SMILES: C=C(C)C(=O)OCC(=O)Oc1ccc(-c2ccc(-c3ccc(OC(=O)C(=C)C)cc3)c(CC)c2)cc1] RM-57
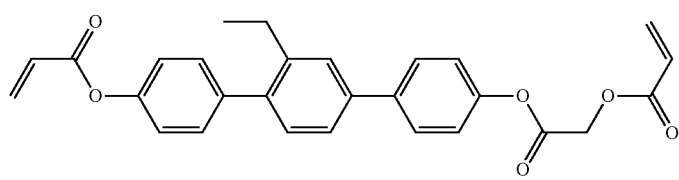 [SMILES: C=CC(=O)OCC(=O)Oc1ccc(-c2ccc(-c3ccc(OC(=O)C=C)cc3)c(CC)c2)cc1] RM-58
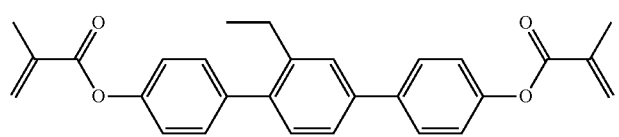 [SMILES: C=C(C)C(=O)Oc1ccc(-c2ccc(-c3ccc(OC(=O)C(=C)C)cc3)c(CC)c2)cc1] RM-59
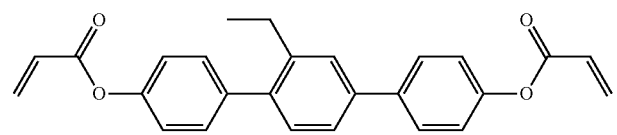 RM-60
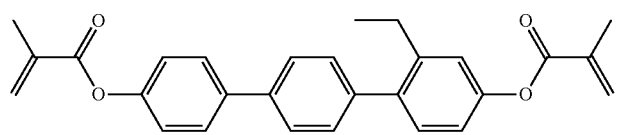 [SMILES: C=C(C)C(=O)Oc1ccc(-c2ccc(-c3ccc(OC(=O)C(=C)C)cc3CC)cc2)cc1] RM-61
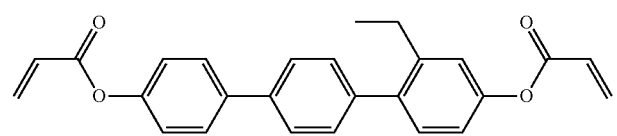 RM-62

TABLE G-continued
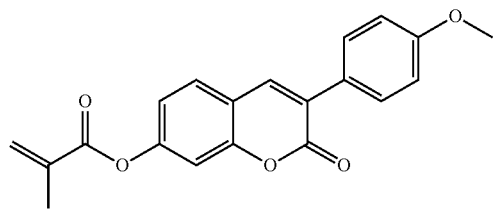 [SMILES: C=C(C)C(=O)Oc1ccc2cc(-c3ccc(OC)cc3)c(=O)oc2c1] RM-63
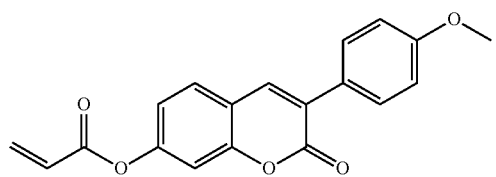 [SMILES: C=CC(=O)Oc1ccc2cc(-c3ccc(OC)cc3)c(=O)oc2c1] RM-64
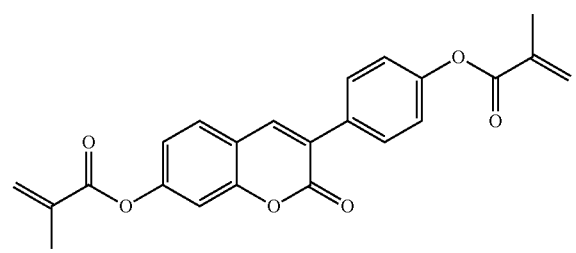 [SMILES: C=C(C)C(=O)Oc1ccc(-c2cc3ccc(OC(=O)C(=C)C)cc3oc2=O)cc1] RM-65
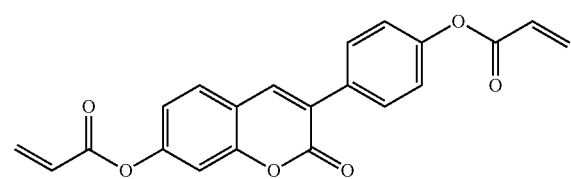 [SMILES: C=CC(=O)Oc1ccc(-c2cc3ccc(OC(=O)C=C)cc3oc2=O)cc1] RM-66
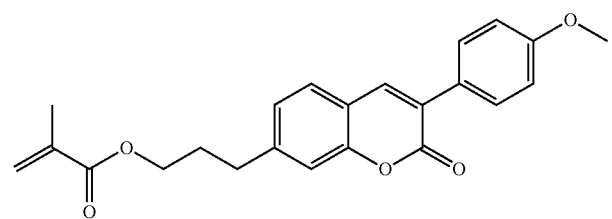 [SMILES: C=C(C)C(=O)OCCCc1ccc2cc(-c3ccc(OC)cc3)c(=O)oc2c1] RM-67
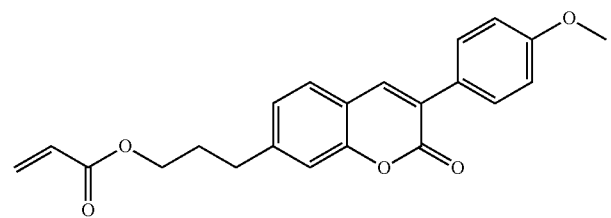 [SMILES: C=CC(=O)OCCCc1ccc2cc(-c3ccc(OC)cc3)c(=O)oc2c1] RM-68
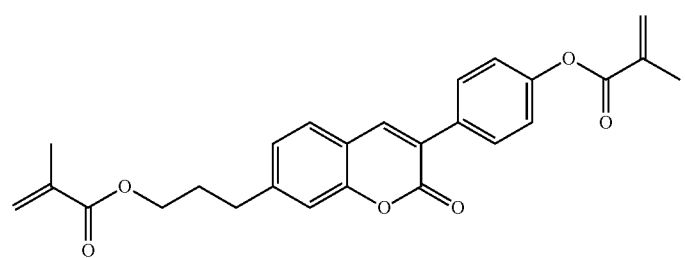 [SMILES: C=C(C)C(=O)OCCCc1ccc2cc(-c3ccc(OC(=O)C(=C)C)cc3)c(=O)oc2c1] RM-69

TABLE G-continued
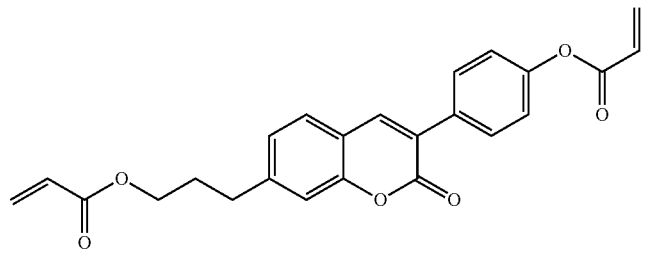 [SMILES: C=CC(=O)OCCCc1ccc2cc(-c3ccc(OC(=O)C=C)cc3)c(=O)oc2c1]
RM-70
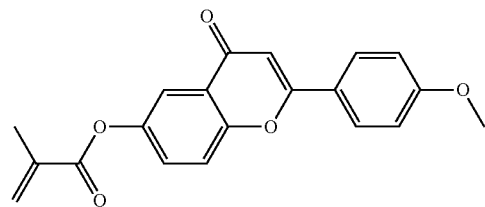 [SMILES: C=C(C)C(=O)Oc1ccc2oc(-c3ccc(OC)cc3)cc(=O)c2c1]
RM-71
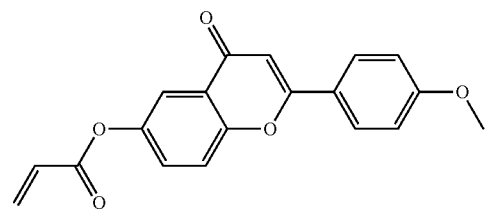 [SMILES: C=CC(=O)Oc1ccc2oc(-c3ccc(OC)cc3)cc(=O)c2c1]
RM-72
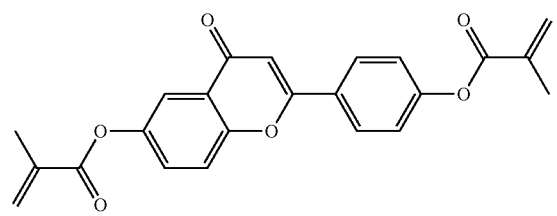 [SMILES: C=C(C)C(=O)Oc1ccc(-c2cc(=O)c3cc(OC(=O)C(=C)C)ccc3o2)cc1]
RM-73
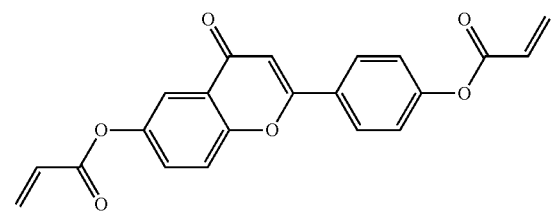 [SMILES: C=CC(=O)Oc1ccc(-c2cc(=O)c3cc(OC(=O)C=C)ccc3o2)cc1]
RM-74
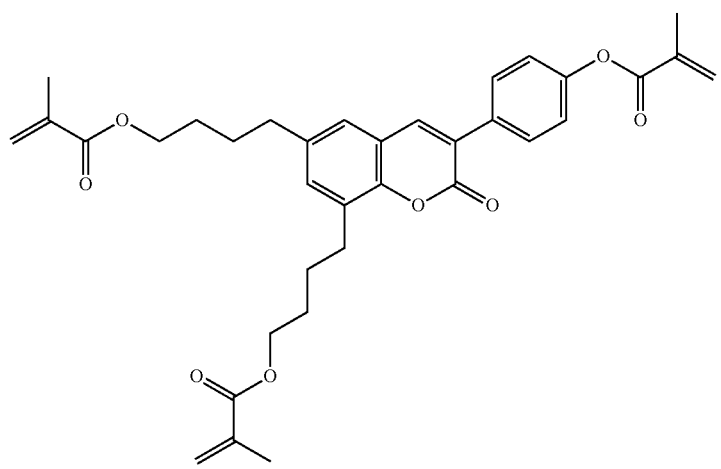 [SMILES: C=C(C)C(=O)OCCCCc1cc(CCCCOC(=O)C(=C)C)c2oc(=O)c(-c3ccc(OC(=O)C(=C)C)cc3)cc2c1]
RM-75

TABLE G-continued
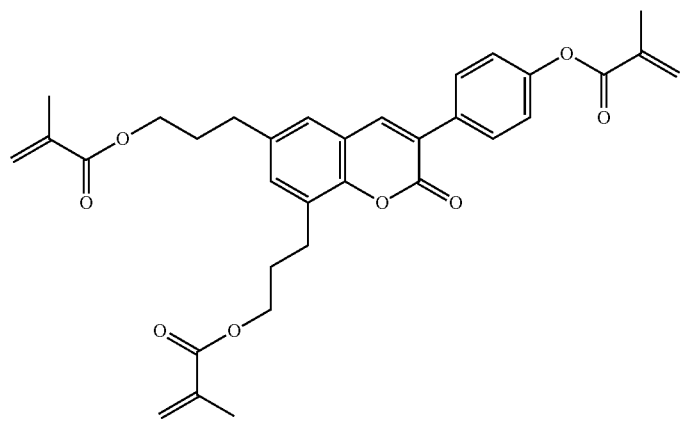 [SMILES: C=C(C)C(=O)OCCCc1cc(CCCOC(=O)C(=C)C)c2oc(=O)c(-c3ccc(OC(=O)C(=C)C)cc3)cc2c1]
RM-76
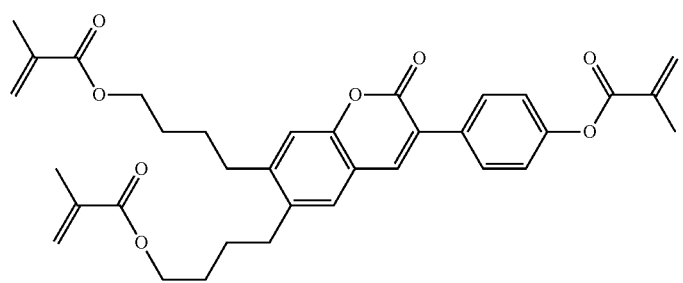 [SMILES: C=C(C)C(=O)OCCCCc1cc2cc(-c3ccc(OC(=O)C(=C)C)cc3)c(=O)oc2cc1CCCCOC(=O)C(=C)C]
RM-77
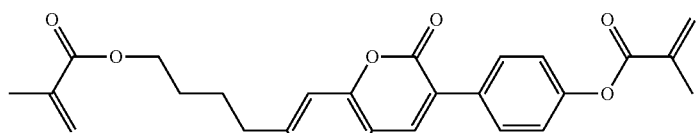
RM-78
RM-79
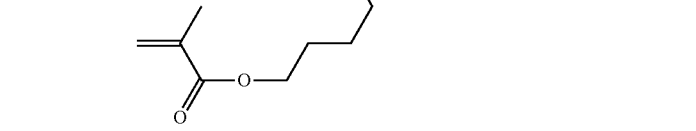
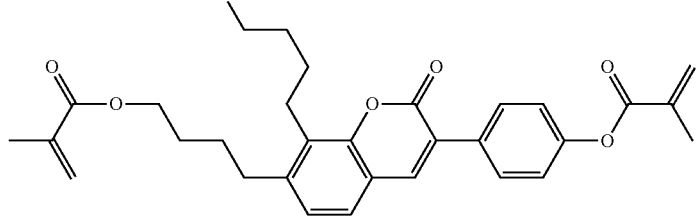
RM-80
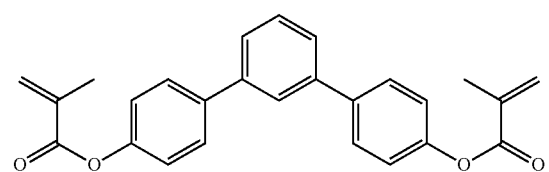 [SMILES: C=C(C)C(=O)Oc1ccc(-c2cccc(-c3ccc(OC(=O)C(=C)C)cc3)c2)cc1]

TABLE G-continued
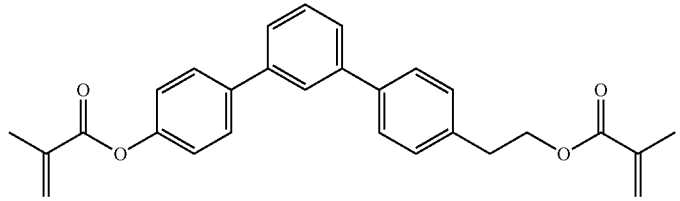 [SMILES: C=C(C)C(=O)OCCc1ccc(-c2cccc(-c3ccc(OC(=O)C(=C)C)cc3)c2)cc1]
RM-81
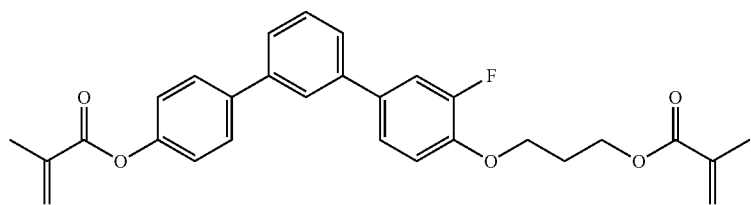 [SMILES: C=C(C)C(=O)OCCCOc1ccc(-c2cccc(-c3ccc(OC(=O)C(=C)C)cc3)c2)cc1F]
RM-82
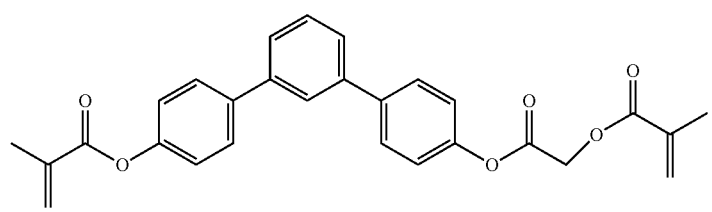 [SMILES: C=C(C)C(=O)OCC(=O)Oc1ccc(-c2cccc(-c3ccc(OC(=O)C(=C)C)cc3)c2)cc1]
RM-83
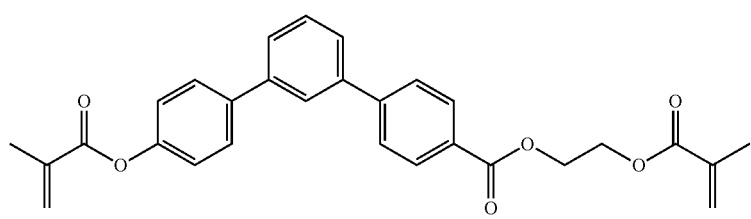 [SMILES: C=C(C)C(=O)OCCOC(=O)c1ccc(-c2cccc(-c3ccc(OC(=O)C(=C)C)cc3)c2)cc1]
RM-84
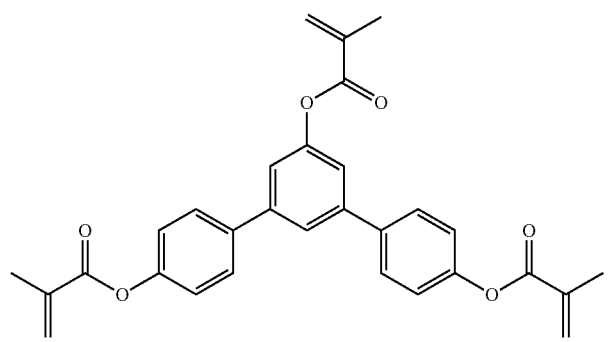 [SMILES: C=C(C)C(=O)Oc1ccc(-c2cc(OC(=O)C(=C)C)cc(-c3ccc(OC(=O)C(=C)C)cc3)c2)cc1]
RM-85
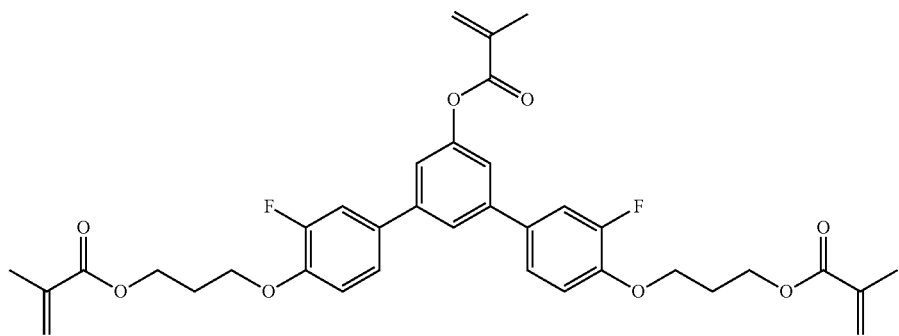 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-86

TABLE G-continued
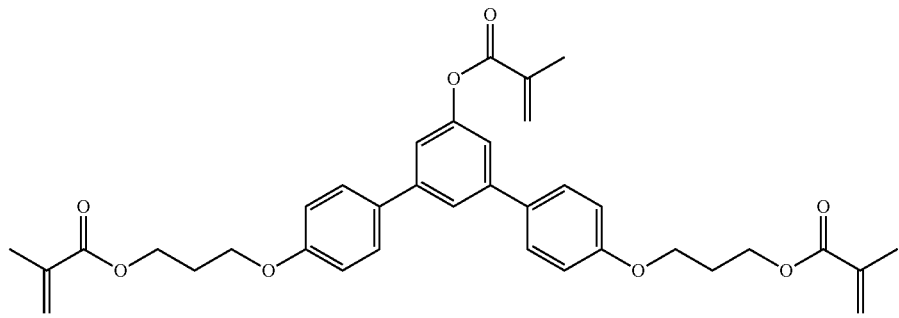 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-87
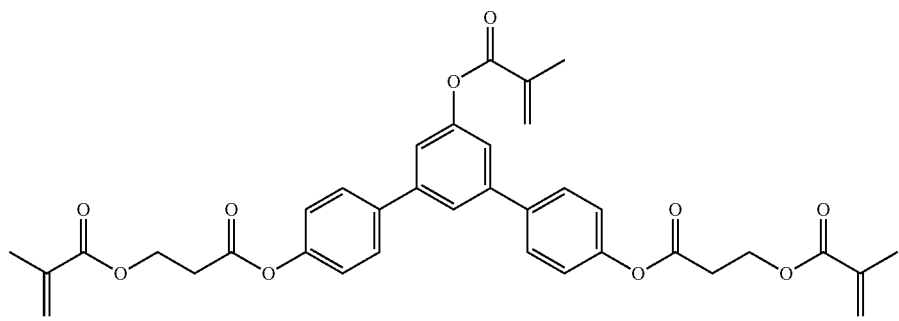 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-88
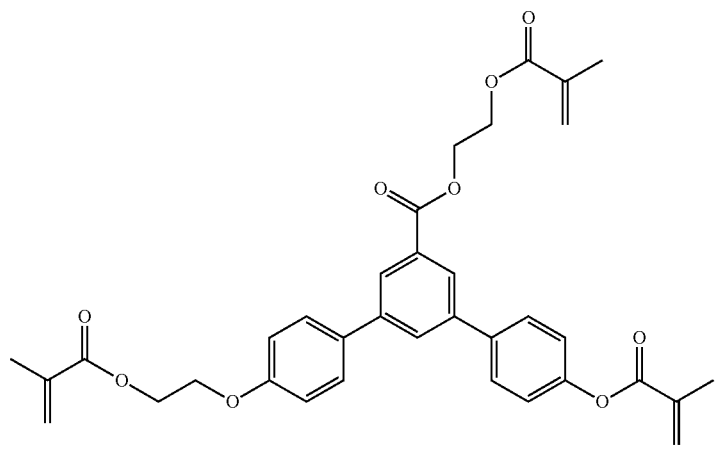 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-89
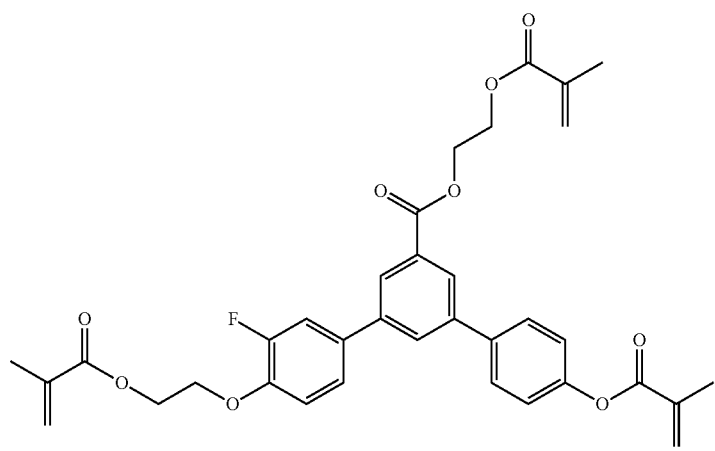 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-90

TABLE G-continued
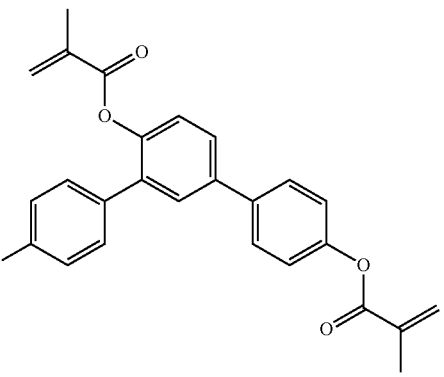
RM-91
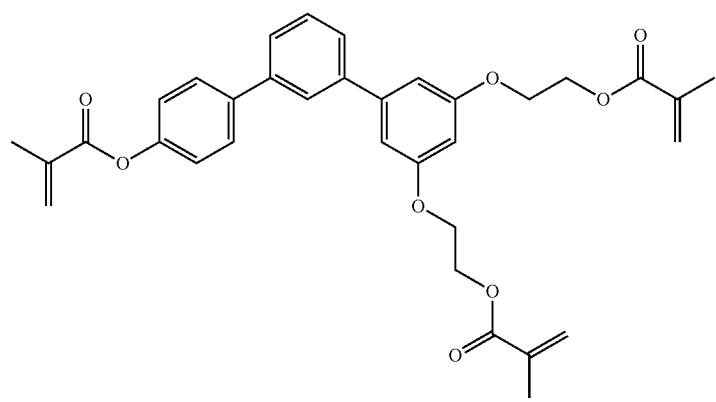 [SMILES: C=C(C)C(=O)OCCOc1cc(OCCOC(=O)C(=C)C)cc(-c2cccc(-c3ccc(OC(=O)C(=C)C)cc3)c2)c1]
RM-92
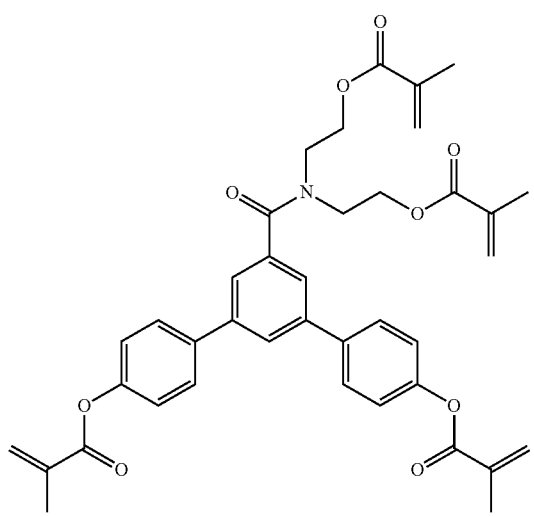 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-93
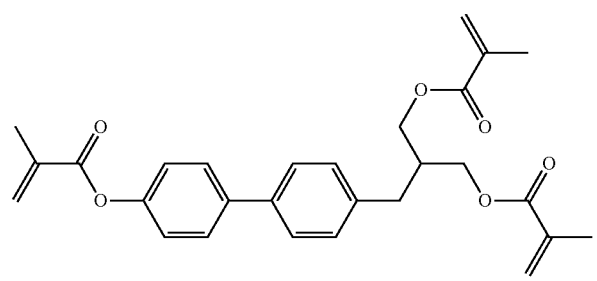 [SMILES: C=C(C)C(=O)OCC(COC(=O)C(=C)C)Cc1ccc(-c2ccc(OC(=O)C(=C)C)cc2)cc1]
RM-94

TABLE G-continued
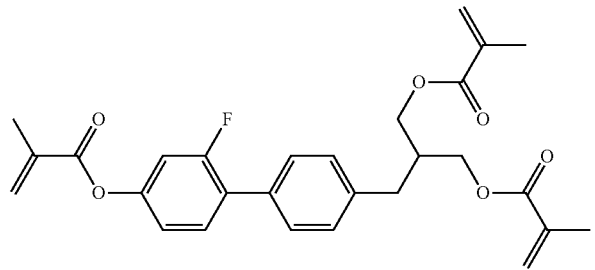 [SMILES: C=C(C)C(=O)OCC(COC(=O)C(=C)C)Cc1ccc(-c2ccc(OC(=O)C(=C)C)cc2F)cc1]
RM-95
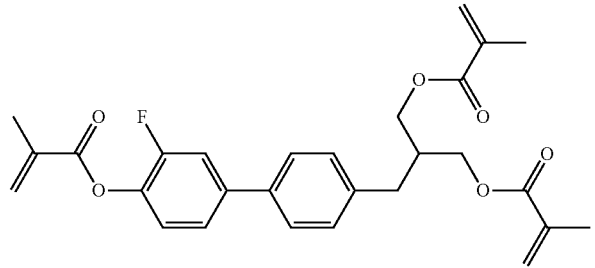 [SMILES: C=C(C)C(=O)OCC(COC(=O)C(=C)C)Cc1ccc(-c2ccc(OC(=O)C(=C)C)c(F)c2)cc1]
RM-96
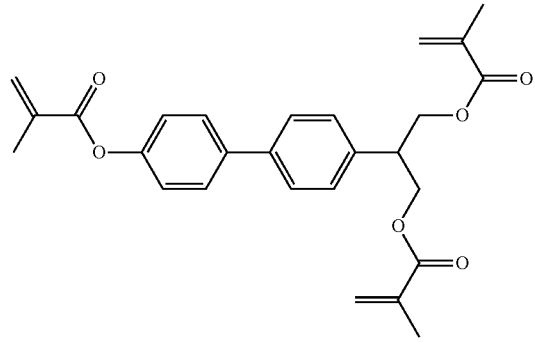 [SMILES: C=C(C)C(=O)OCC(COC(=O)C(=C)C)c1ccc(-c2ccc(OC(=O)C(=C)C)cc2)cc1]
RM-97
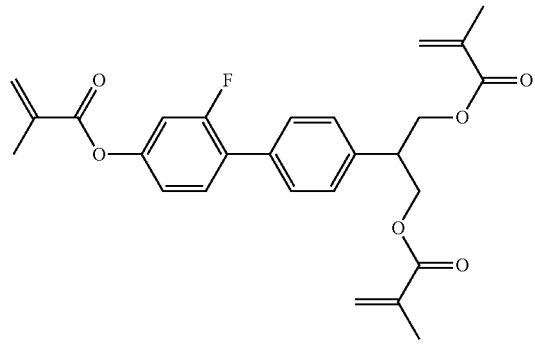 [SMILES: C=C(C)C(=O)OCC(COC(=O)C(=C)C)c1ccc(-c2ccc(OC(=O)C(=C)C)cc2F)cc1]
RM-98
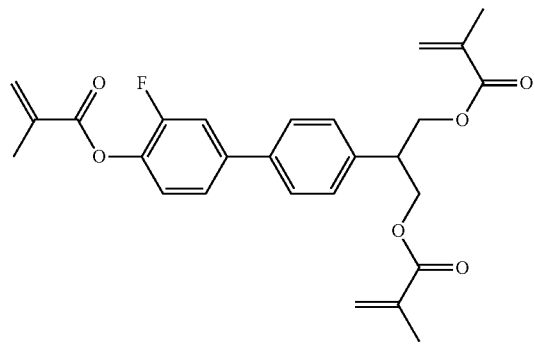 [SMILES: C=C(C)C(=O)OCC(COC(=O)C(=C)C)c1ccc(-c2ccc(OC(=O)C(=C)C)c(F)c2)cc1]
RM-99

TABLE G-continued
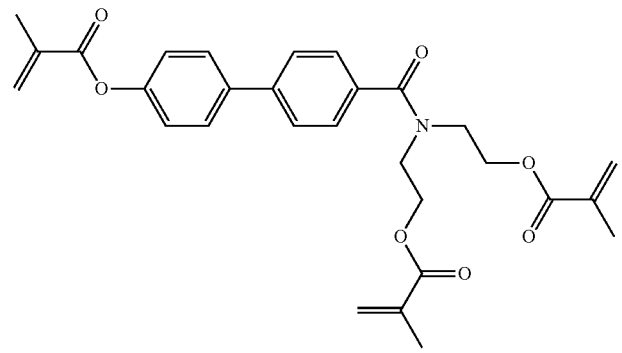 [SMILES: C=C(C)C(=O)OCCN(CCOC(=O)C(=C)C)C(=O)c1ccc(-c2ccc(OC(=O)C(=C)C)cc2)cc1] RM-100
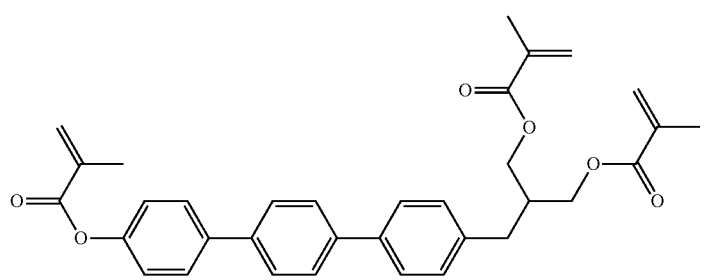 RM-101
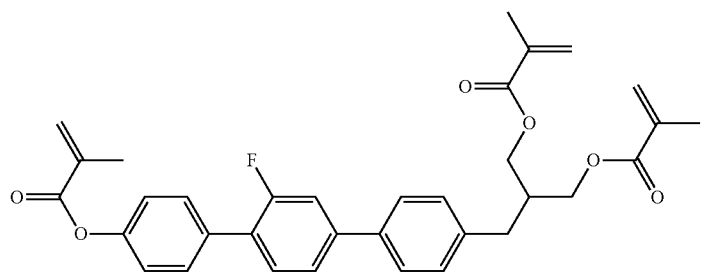 [SMILES: C=C(C)C(=O)OCC(COC(=O)C(=C)C)Cc1ccc(-c2ccc(-c3ccc(OC(=O)C(=C)C)cc3)c(F)c2)cc1] RM-102
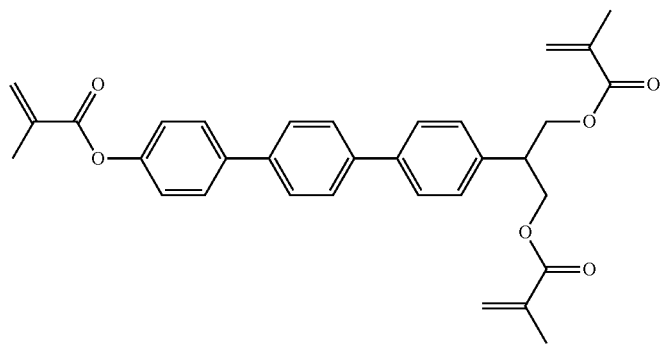 [SMILES: C=C(C)C(=O)OCC(COC(=O)C(=C)C)c1ccc(-c2ccc(-c3ccc(OC(=O)C(=C)C)cc3)cc2)cc1] RM-103
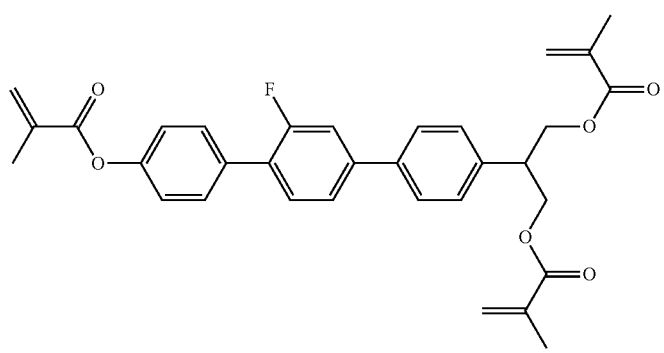 [SMILES: C=C(C)C(=O)OCC(COC(=O)C(=C)C)c1ccc(-c2ccc(-c3ccc(OC(=O)C(=C)C)cc3)c(F)c2)cc1] RM-104

TABLE G-continued
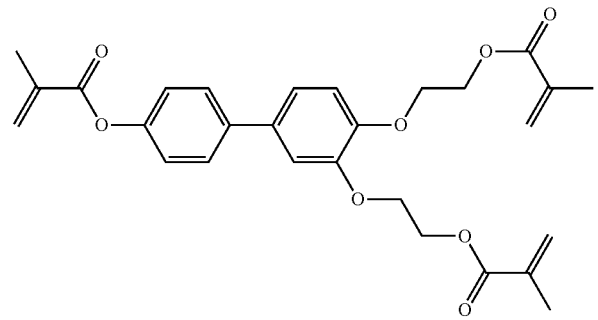 [SMILES: C=C(C)C(=O)OCCOc1ccc(-c2ccc(OC(=O)C(=C)C)cc2)cc1OCCOC(=O)C(=C)C]
RM-105
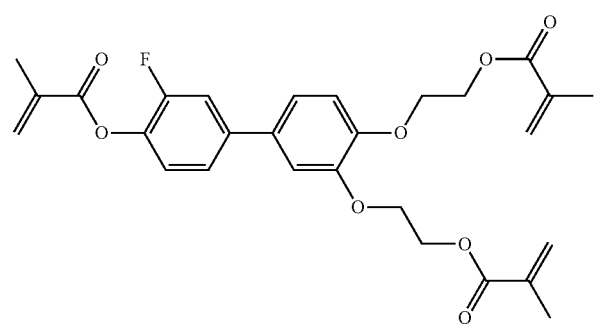 [SMILES: C=C(C)C(=O)OCCOc1ccc(-c2ccc(OC(=O)C(=C)C)c(F)c2)cc1OCCOC(=O)C(=C)C]
RM-106
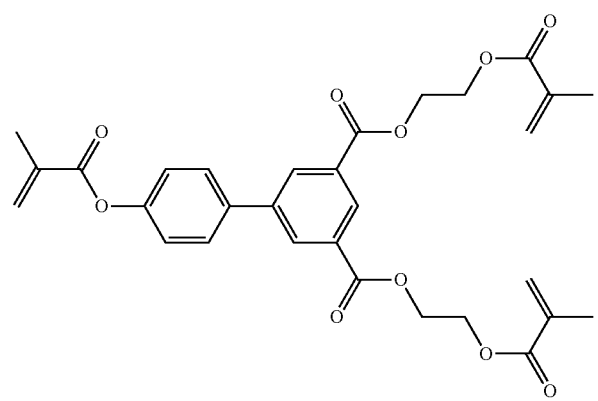 [SMILES: C=C(C)C(=O)OCCOC(=O)c1cc(C(=O)OCCOC(=O)C(=C)C)cc(-c2ccc(OC(=O)C(=C)C)cc2)c1]
RM-107
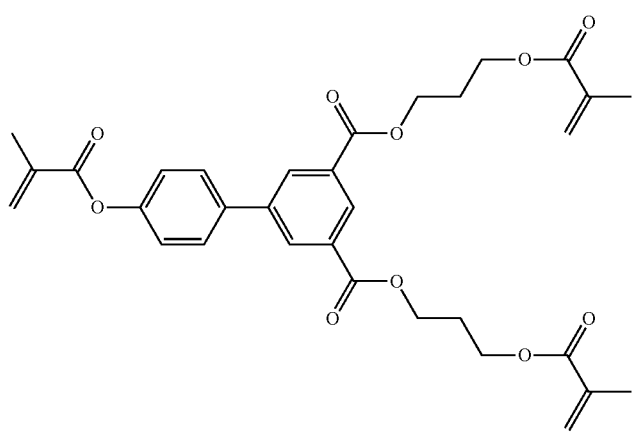 [SMILES: C=C(C)C(=O)OCCCOC(=O)c1cc(C(=O)OCCCOC(=O)C(=C)C)cc(-c2ccc(OC(=O)C(=C)C)cc2)c1]
RM-108

TABLE G-continued
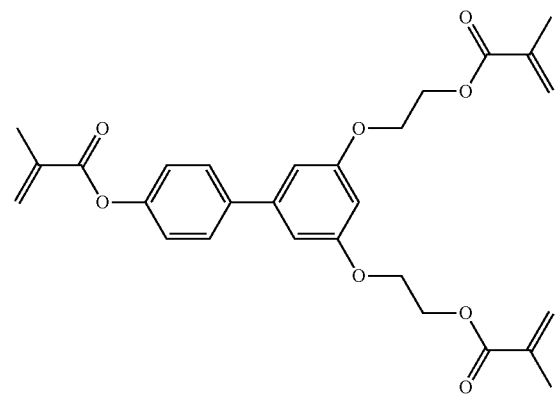 [SMILES: C=C(C)C(=O)OCCOc1cc(OCCOC(=O)C(=C)C)cc(-c2ccc(OC(=O)C(=C)C)cc2)c1]
RM-109
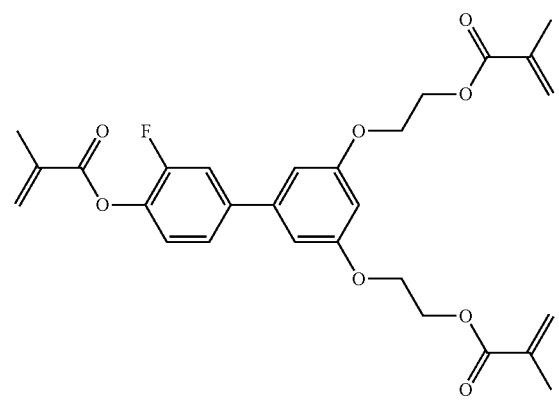 [SMILES: C=C(C)C(=O)OCCOc1cc(OCCOC(=O)C(=C)C)cc(-c2ccc(OC(=O)C(=C)C)c(F)c2)c1]
RM-110
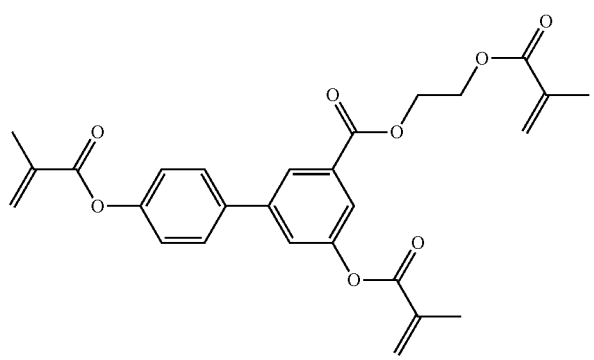 [SMILES: C=C(C)C(=O)OCCOC(=O)c1cc(OC(=O)C(=C)C)cc(-c2ccc(OC(=O)C(=C)C)cc2)c1]
RM-111
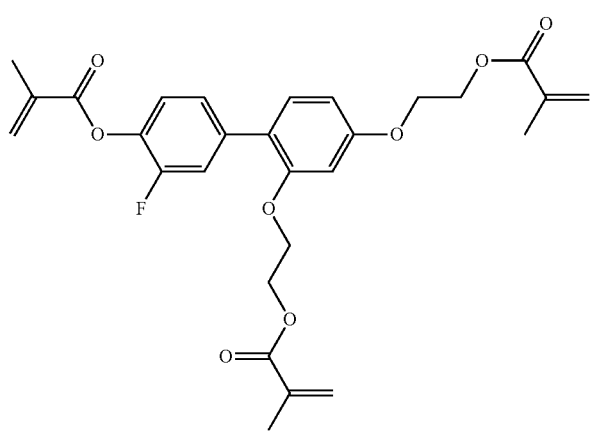 [SMILES: C=C(C)C(=O)OCCOc1ccc(-c2ccc(OC(=O)C(=C)C)c(F)c2)c(OCCOC(=O)C(=C)C)c1]
RM-112

TABLE G-continued
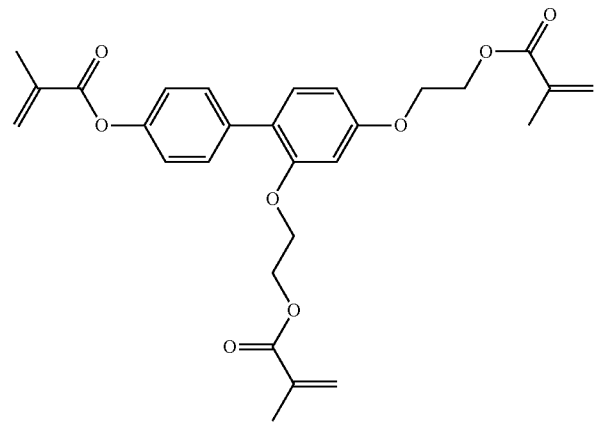 [SMILES: C=C(C)C(=O)OCCOc1ccc(-c2ccc(OC(=O)C(=C)C)cc2)c(OCCOC(=O)C(=C)C)c1]
RM-113
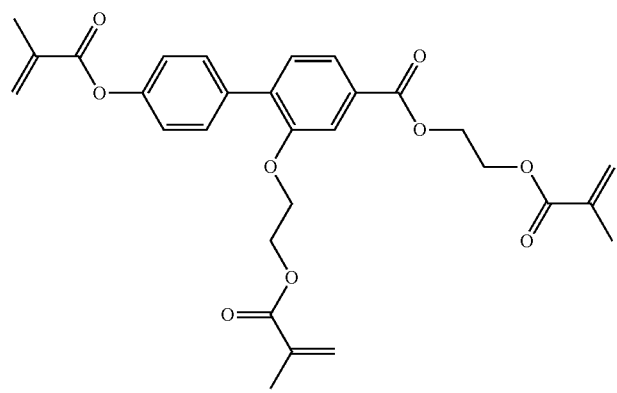 [SMILES: C=C(C)C(=O)OCCOC(=O)c1ccc(-c2ccc(OC(=O)C(=C)C)cc2)c(OCCOC(=O)C(=C)C)c1]
RM-114
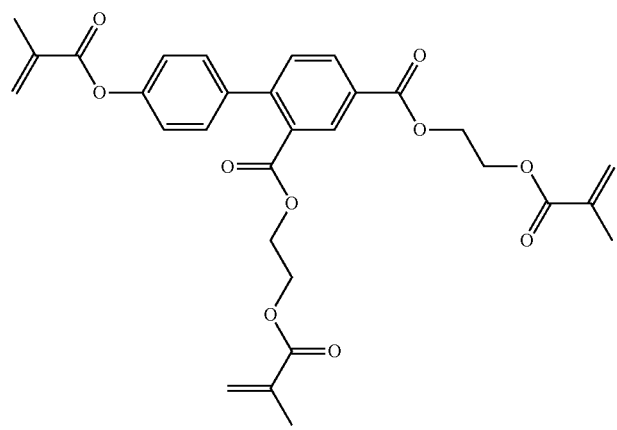 [SMILES: C=C(C)C(=O)OCCOC(=O)c1ccc(-c2ccc(OC(=O)C(=C)C)cc2)c(C(=O)OCCOC(=O)C(=C)C)c1]
RM-115
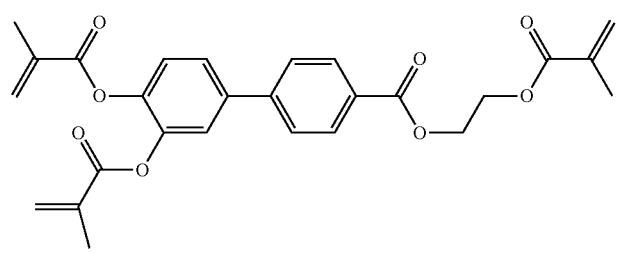 [SMILES: C=C(C)C(=O)OCCOC(=O)c1ccc(-c2ccc(OC(=O)C(=C)C)c(OC(=O)C(=C)C)c2)cc1]
RM-116

TABLE G-continued
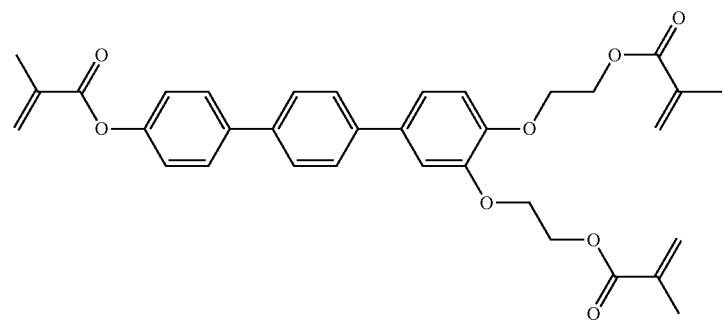 [SMILES: C=C(C)C(=O)OCCOc1ccc(-c2ccc(-c3ccc(OC(=O)C(=C)C)cc3)cc2)cc1OCCOC(=O)C(=C)C]
RM-117
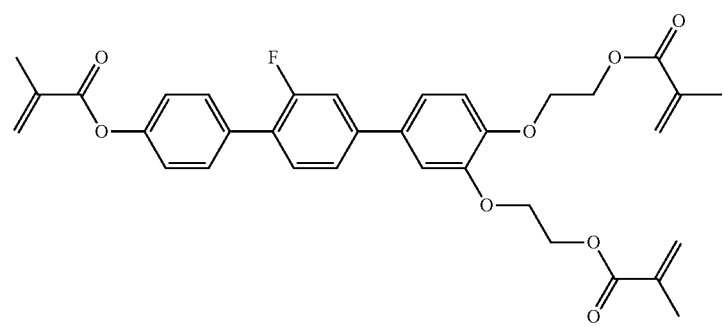 [SMILES: C=C(C)C(=O)OCCOc1ccc(-c2ccc(-c3ccc(OC(=O)C(=C)C)cc3)c(F)c2)cc1OCCOC(=O)C(=C)C]
RM-118
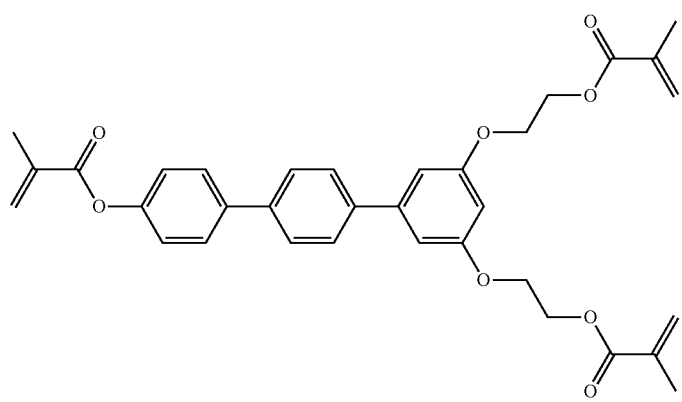 [SMILES: C=C(C)C(=O)OCCOc1cc(OCCOC(=O)C(=C)C)cc(-c2ccc(-c3ccc(OC(=O)C(=C)C)cc3)cc2)c1]
RM-119
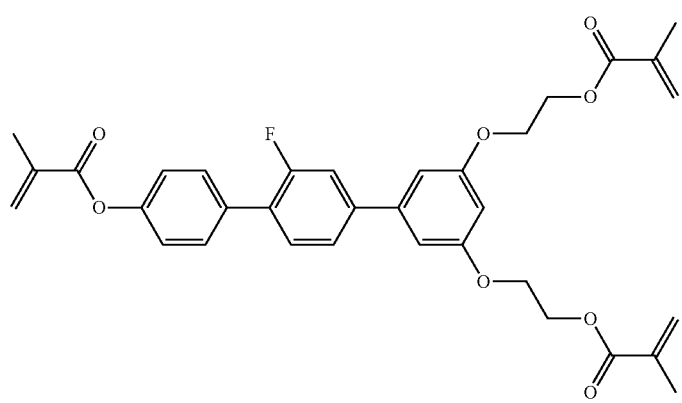 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-120

TABLE G-continued

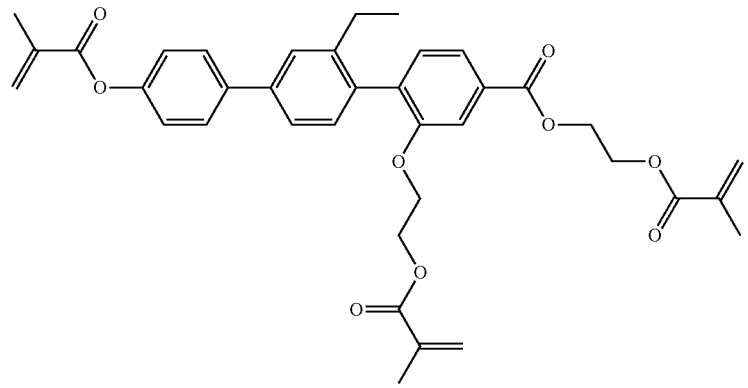 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

RM-121

In a preferred embodiment of the present invention, the mesogenic media comprise one or more compounds selected from the group of the compounds from Table G.

The liquid crystalline media according to the present invention comprise preferably four or more, more preferably six or more, even more preferably seven or more, and particularly preferably eight or more compounds selected from the group of compounds of table D, preferably compounds of three or more different formulae selected from the group of formulae of table D. It is particularly preferred that the medium additionally contains one, two or more compounds selected from the group of formulae of table E. Even more preferably the medium further contains one, two or more compounds selected from the group of formulae of table G.

The following examples are merely illustrative of the present invention and they should not be considered as limiting the scope of the invention in any way. The examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

EXAMPLES

In the Examples,
$V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
Δn denotes optical anisotropy at 20° C. and 589 nm,
ε∥ denotes dielectric permittivity parallel to the director at 20° C. and 1 kHz,
ε⊥ denotes dielectric permittivity perpendicular to the director at 20° C. and 1 kHz,
Δε denotes dielectric anisotropy at 20° C. and 1 kHz,
cl.p., T(N,l) denotes clearing point [° C.],
$γ_1$ denotes rotational viscosity measured at 20° C. [mPa·s], determined by the rotation method in a magnetic field,
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN], The term "threshold voltage" for the present invention relates to the capacitive threshold ($V_0$), unless explicitly indicated otherwise. In the Examples, as is generally usual, the optical threshold can also be indicated for 10% relative contrast ($V_{10}$).

Liquid crystal mixtures and composite systems are realized with the compositions and properties as given in the following. Their properties and optical performance are investigated.

Reference Example 1

A liquid-crystal base mixture B-1 is prepared and characterized with respect to its general physical properties, having the composition and properties as indicated in the following table.

| GGP-5-Cl | 17.00% | Clearing point: | 101.0° C. |
|---|---|---|---|
| PGIGI-3-F | 7.00% | Δn [589 nm, 20° C.]: | 0.181 |
| CPG-2-F | 8.00% | $n_e$ [589 nm, 20° C.]: | 1.69 |
| CPG-3-F | 8.00% | Δε [1 kHz, 20° C.]: | 13.2 |
| CPG-5-F | 5.00% | ε∥ [1 kHz, 20° C.]: | 18.0 |
| CGU-2-F | 7.00% | | |
| CGU-3-F | 7.00% | | |
| CGU-5-F | 4.00% | | |
| PGU-2-F | 8.00% | | |
| PGU-3-F | 8.00% | | |
| CCGU-3-F | 10.00% | | |
| CPP-3-2 | 5.00% | | |
| CGPC-3-3 | 3.00% | | |
| CGPC-5-3 | 3.00% | | |
| Σ | 100.00% | | |

Reference Example 2

A liquid-crystal base mixture B-2 is prepared and characterized with respect to its general physical properties, having the composition and properties as indicated in the following table.

| PGIGI-3-F | 10.00% | clearing point: [° C.] | 105 |
|---|---|---|---|
| CPG-2-F | 6.00% | Δn [589 nm, 20° C.]: | 0.160 |
| CPG-3-F | 7.00% | $n_e$ [589 nm, 20° C.]: | 1.66 |
| CPG-5-F | 5.00% | Δε [1 kHz, 20° C.]: | 11.4 |
| CPU-5-F | 10.00% | ε⊥ [1 kHz, 20° C.]: | 4.3 |

-continued

| | | | |
|---|---|---|---|
| CPU-7-F | 10.00% | | |
| PGU-3-F | 4.00% | | |
| PGU-5-F | 7.00% | | |
| CCGU-3-F | 8.00% | | |
| CPP-3-2 | 4.00% | | |
| CBC-33F | 3.00% | | |
| CBC-53F | 3.00% | | |
| CBC-55F | 3.00% | | |
| CPGU-3-OT | 5.00% | | |
| CP-5-N | 15.00% | | |
| Σ | 100.00% | | |

Reference Example 3

A liquid-crystal base mixture B-3 is prepared and characterized with respect to its general physical properties, having the composition and properties as indicated in the following table.

| | | | |
|---|---|---|---|
| CPG-3-F | 5.00% | clearing point: [° C.]: | 114.5 |
| CPG-5-F | 5.00% | Δn [589 nm, 20° C.]: | 0.135 |
| CPU-3-F | 15.00% | $n_e$ [589 nm, 20° C.]: | 1.63 |
| CPU-5-F | 15.00% | Δε [1 kHz, 20° C.]: | 11.3 |
| CP-3-N | 16.00% | $ε_⊥$ [1 kHz, 20° C.]: | 4.2 |
| CP-5-N | 16.00% | $K_1$ [pN, 20° C.]: | 13.4 |
| CCGU-3-F | 7.00% | $K_3$ [pN, 20° C.]: | 18.5 |
| CBC-33F | 4.00% | $V_0$ [V, 20° C.]: | 1.15 |
| CBC-53F | 4.00% | | |
| CBC-55F | 4.00% | | |
| CCZPC-3-3 | 3.00% | | |
| CCZPC-3-4 | 3.00% | | |
| CCZPC-3-5 | 3.00% | | |
| Σ | 100.00% | | |

A host mixture H-3 is prepared by mixing 99.97% of mixture B-3 with 0.03% of the compound of formula

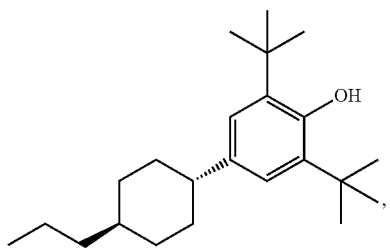 [SMILES: CCC[C@H]1CC[C@H](c2cc(C(C)(C)C)c(O)c(C(C)(C)C)c2)CC1]

which in the following will be referred to ST-1.

Reference Example 4

A liquid-crystal base mixture B-4 is prepared and characterized with respect to its general physical properties, having the composition and properties as indicated in the following table.

| | | | |
|---|---|---|---|
| CY-3-O2 | 9.00% | clearing point: [° C.]: | 110.5 |
| CY-3-O4 | 9.00% | Δn [589 nm, 20° C.]: | 0.132 |
| CY-5-O2 | 12.00% | $n_e$ [589 nm, 20° C.]: | 1.62 |
| CY-5-O4 | 8.00% | Δε [1 kHz, 20° C.]: | -4.9 |
| CCY-3-O2 | 5.00% | $ε_⊥$ [1 kHz, 20° C.]: | 8.8 |
| CCY-3-O3 | 5.00% | $K_1$ [pN, 20° C.]: | 16.8 |
| CCY-4-O2 | 5.00% | $K_3$ [pN, 20° C.]: | 20.4 |
| CPY-2-O2 | 7.00% | $V_0$ [V, 20° C.]: | 2.14 |
| CPY-3-O2 | 6.00% | | |
| PYP-2-3 | 12.00% | | |
| CCP-V-1 | 6.00% | | |
| CCZPC-3-3 | 3.00% | | |
| CCZPC-3-4 | 3.00% | | |
| CBC-33F | 5.00% | | |
| CBC-53F | 5.00% | | |
| Σ | 100.00% | | |

A host mixture H-4 is prepared by mixing 99.97% of mixture B-4 with 0.03% of the compound ST-1 as shown in Reference Example 3 above.

Reference Example 5

A liquid-crystal base mixture B-5 is prepared and characterized with respect to its general physical properties, having the composition and properties as indicated in the following table.

| | | | |
|---|---|---|---|
| CPG-3-F | 8.00% | clearing point: [° C.]: | 114 |
| CPG-5-F | 8.00% | Δn [589 nm, 20° C.]: | 0.130 |
| CPU-5-F | 14.00% | $n_e$ [589 nm, 20° C.]: | 1.62 |
| CPU-7-F | 11.00% | Δε [1 kHz, 20° C.]: | 10.0 |
| CP-5-N | 18.00% | $ε_⊥$ [1 kHz, 20° C.]: | 4.0 |
| CP-7-N | 13.00% | | |
| CCGU-3-F | 7.00% | | |
| CC-3-O3 | 2.00% | | |
| CBC-33F | 4.00% | | |
| CBC-53F | 4.00% | | |
| CBC-55F | 3.00% | | |
| CCZPC-3-3 | 3.00% | | |
| CCZPC-3-4 | 3.00% | | |
| CCZPC-3-5 | 2.00% | | |
| Σ | 100.00% | | |

Reference Example 6

A liquid-crystal base mixture B-6 is prepared and characterized with respect to its general physical properties, having the composition and properties as indicated in the following table.

| | | | |
|---|---|---|---|
| CC(CN)-4-7 | 14.00% | clearing point: [° C.]: | 114.6 |
| CC(CN)-5-5 | 14.00% | Δn [589 nm, 20° C.]: | 0.045 |
| CC(CN)-3-3 | 6.00% | $n_e$ [589 nm, 20° C.]: | 1.52 |
| CCZC-3-3 | 3.00% | Δε [1 kHz, 20° C.]: | -5.2 |
| CCZC-3-5 | 3.00% | $ε_⊥$ [1 kHz, 20° C.]: | 8.5 |
| CCZC-4-3 | 3.00% | | |
| CCZC-4-5 | 3.00% | | |
| CC-3-O1 | 11.00% | | |
| CC-5-O1 | 4.00% | | |
| CC-5-O2 | 4.00% | | |
| CC(CN)C-3-5 | 10.00% | | |
| CC(CN)C-5-5 | 12.00% | | |
| CC(CN)C-5-3 | 10.00% | | |
| CCZPC-3-3 | 3.00% | | |
| Σ | 100.00% | | |

Reference Example 7

A liquid-crystal base mixture B-7 is prepared and characterized with respect to its general physical properties, having the composition and properties as indicated in the following table.

| | |
|---|---|
| CPG-3-F | 8.00% |
| CPG-5-F | 8.00% |
| CPU-5-F | 14.00% |
| CPU-7-F | 11.00% |
| CP-3-N | 18.00% |
| CP-7-N | 13.00% |
| CCGU-3-F | 7.00% |
| CC-3-O3 | 2.00% |
| CBC-33F | 4.00% |
| CBC-53F | 4.00% |

-continued

| | |
|---|---|
| PGU-2-F | 9.00% |
| PGU-3-F | 9.00% |
| PGU-5-F | 9.00% |
| CPP-3-2 | 7.00% |
| CBC-33F | 3.00% |
| CBC-53F | 3.00% |
| CBC-55F | 3.00% |
| CBC-33 | 4.00% |
| PGIGI-3-F | 7.00% |
| Σ | 100.00% |

Comparative Example 1

A mixture M-1 is prepared by mixing 98.877% of mixture B-1 as described in Reference Example 1 with 0.470% of chiral dopant R-5011 available from Merck KGaA, Darmstadt, Germany and shown in Table F above, 0.129% of compound of formula DD-1

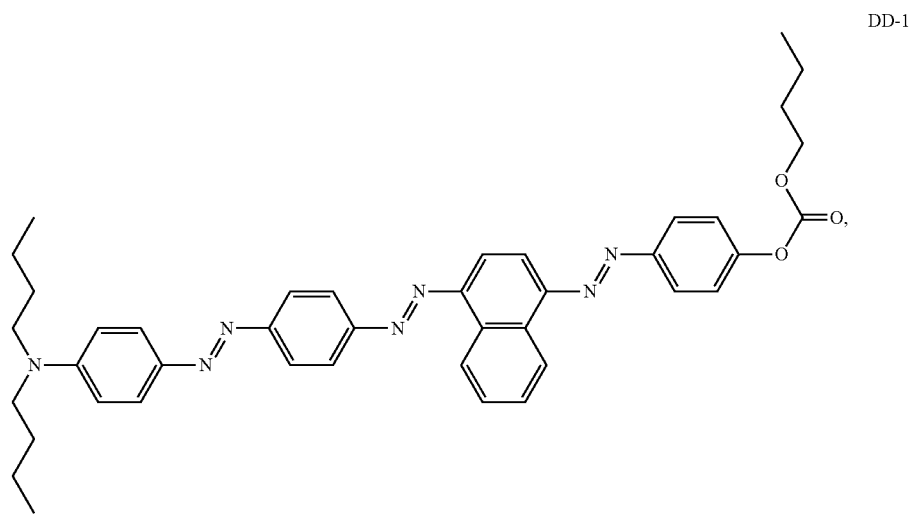 [SMILES: CCCCOC(=O)Oc1ccc(/N=N/c2ccc(/N=N/c3ccc(/N=N/c4ccc(N(CCCC)CCCC)cc4)cc3)c3ccccc23)cc1]

DD-1

0.244% of compound of formula DD-2

-continued

| | |
|---|---|
| CBC-55F | 3.00% |
| CCZPC-3-3 | 3.00% |
| CCZPC-3-4 | 3.00% |
| CCZPC-3-5 | 2.00% |
| Σ | 100.00% |

Reference Example 8

A liquid-crystal base mixture B-8 is prepared and characterized with respect to its general physical properties, having the composition and properties as indicated in the following table.

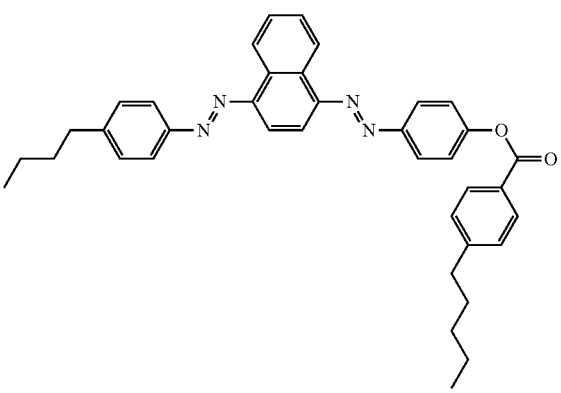

DD-2

| | | | |
|---|---|---|---|
| CP-5-N | 15.00% | clearing point: [° C.]: | 92 |
| CP-7-N | 14.00% | Δn [589 nm, 20° C.]: | 0.163 |
| CPG-2-F | 6.00% | $n_e$ [589 nm, 20° C.]: | 1.67 |
| CPG-3-F | 6.00% | | |
| CPG-5-F | 5.00% | | | and 0.280% of compound of formula DD-3

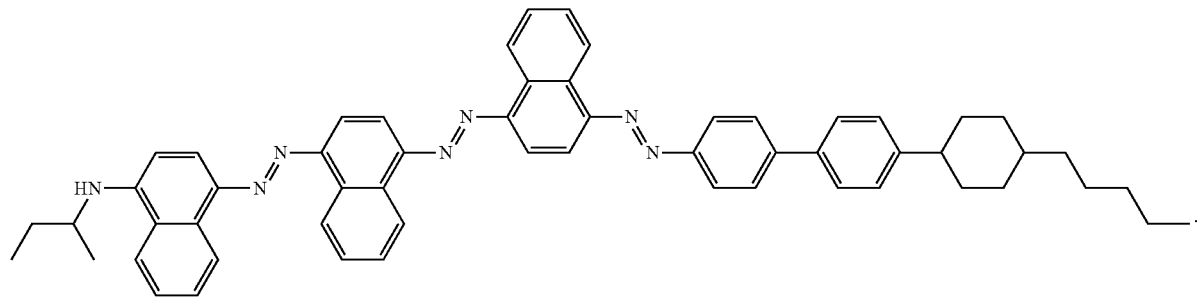

DD-3

The mixture M-1 is filled by vacuum filling into a cell having glass substrates with ITO electrodes as well as polyimide alignment layers (AL-1054 from Japan Synthetic Rubber, planar, TN), wherein the cell gap is 25 μm, and the filling ports are sealed. Electrical wiring is applied to the cell by soldering.

The obtained cell has a clear state which at 48 V has 3% haze and 64.5% transmission. Furthermore, at 5 V the cell has a dark privacy state with 83% haze and 22% transmission.

Unwanted off-axis colour effects are observed when viewed from the side. A bidirectional transmittance distribution function (BTDF) measurement is performed with an EZLite 120R instrument from Eldim using a white light source and normal incidence of the light.

The ratio of the averaged intensity of light transmitted into radiation angles from −3° to +3° to the averaged intensity of light transmitted into radiation angles from −60° to +60°, $<I_{-3°<\theta<3°}>/<I_{-60°<\theta<60°}>$, is 15.7.

Although the cell effectively dims the overall light intensity, the light is not sufficiently diffused. The cell does not sufficiently reduce the contrast of a bright light source and thus does not reliably prevent glare from e.g. sunlight.

Comparative Example 2

A mixture M-2 is prepared by mixing 98.72% of mixture H-3 as described in Reference Example 3 with 0.05% of chiral dopant S-811 available from Merck KGaA, Darmstadt, Germany and shown in Table F above, 0.24% of compound of formula DD-1 as shown in Comparative Example 1 above, 0.46% of compound of formula DD-2 as shown in Comparative Example 1 above and 0.53% of compound of formula DD-3 as shown in Comparative Example 1 above.

The mixture M-2 is filled by vacuum filling into a cell having glass substrates with ITO electrodes as well as polyimide alignment layers (AL-1054 from Japan Synthetic Rubber, planar, TN), wherein the cell gap is 25 μm, and the filling ports are sealed. Electrical wiring is applied to the cell by soldering.

The obtained cell has a clear state which at 12 V has 49% transmission. Furthermore, at 0 V the cell has a dark state with 25% transmission.

A bidirectional transmittance distribution function (BTDF) measurement is performed with an EZLite 120R instrument from Eldim using a white light source and normal incidence of the light.

The ratio of the averaged intensity of light transmitted into radiation angles from −3° to +3° to the averaged intensity of light transmitted into radiation angles from −60° to +60°, $<I_{-3°<\theta<3°}>/<I_{-60°<\theta<60°}>$, is 18.7.

Although the cell effectively dims the overall light intensity, the light is not sufficiently diffused. The cell does not sufficiently reduce the contrast of a bright light source and thus does not reliably prevent glare from e.g. sunlight.

Comparative Example 3

A cholesteric mixture C-1 is prepared by mixing 98.61% of mixture B-2 as described in Reference Example 2 with 0.64% of chiral dopant R-5011 available from Merck KGaA, Darmstadt, Germany and shown in Table F above and 0.75% of compound of formula RM-A

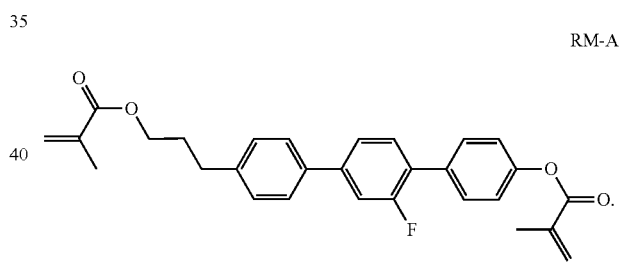

RM-A

The mixture C-1 is filled by vacuum filling into a cell having glass substrates with ITO electrodes as well as polyimide alignment layers (AL-1054 from Japan Synthetic Rubber, planar, TN), wherein the cell gap is 25 μm, and the filling ports are sealed. Electrical wiring is applied to the cell by soldering.

Subsequently polymerisation is carried out by irradiating the cell with UV light (UVA and UVB, 3.5 mW/cm² light intensity) while a square-wave voltage (50V, 60 Hz) is applied for 30 minutes.

The obtained cell after polymerisation has a clear state which at 60 V has 6.6% haze and 88% transmission. Furthermore, at 0 V the cell has a privacy (scattering) state with 99% haze and 72% transmission.

The transmission in the privacy state is still too high to reliably eliminate glare from sunlight experienced by a user.

Example 1

A stack of cells is arranged combining a cell prepared according to Comparative Example 3 together with a cell prepared according to Comparative Example 1.

This assembly of the combined cells has a transparent state which at 63 V has 7.7% haze and 57% transmission. Furthermore, at 5 V the assembly of the cells has an anti-glare state with 100% haze and 12% transmission. Besides, in a privacy state, where the scattering cell according to Comparative Example 3 is operated at 5 V and the dye-doped cell according to Comparative Example 1 is operated at 63 V, the assembly has 99% haze and 46% transmission.

A bidirectional transmittance distribution function (BTDF) measurement is performed for the combined cells in the anti-glare state with an EZLite 120R instrument from Eldim using a white light source and normal incidence of the light.

In the anti-glare state the ratio of the averaged intensity of light transmitted into radiation angles from −3° to +3° to the averaged intensity of light transmitted into radiation angles from −60° to +60°, $<I_{-3°<\theta<3°}>/<I_{-60°<\theta<60°}>$, is 3.0.

The combination of cells effectively reduces the overall transmission of light, while furthermore distributing the transmitted light also into wider angles more evenly. The combination of the cells gives excellent anti-glare performance, in particular for sunlight.

In addition, no undesirable off-axis colour effects are observed.

Example 2

A cholesteric mixture C-2 is prepared by mixing 98.640% of mixture B-1 as described in Reference Example 1 with 0.423% of chiral dopant R-5011 available from Merck KGaA, Darmstadt, Germany, 0.450% of compound of formula RM-B

RM-B

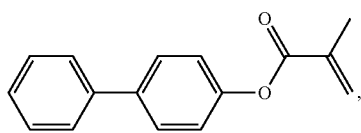

0.450% of compound of formula RM-C

RM-C

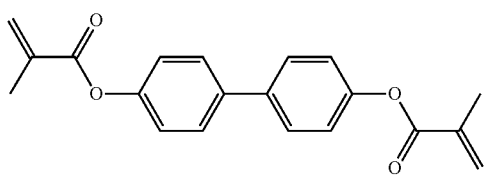

and 0.037% of the photoinitiator Irgacure® 651, abbreviated as IRG-651 in the following,

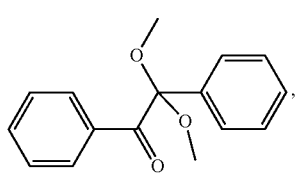 [SMILES: COC(OC)(C(=O)c1ccccc1)c1ccccc1]

available from Ciba, Switzerland.

The mixture C-2 is filled by vacuum filling into a cell having glass substrates with ITO electrodes as well as polyimide alignment layers (AL-1054 from Japan Synthetic Rubber, planar, TN), wherein the cell gap is 25 μm, and the filling ports are sealed. Electrical wiring is applied to the cell by soldering.

Subsequently polymerisation is carried out by irradiating the cell with UV light (UVA and UVB, 3.5 mW/cm² light intensity) while a square-wave voltage (50V, 60 Hz) is applied.

The obtained cell is arranged in a stack together with a cell prepared according to Comparative Example 2.

This assembly of the combined cells has a transparent state which at 48 V has 17.6% haze and 46.3% transmission. Furthermore, at 0 V the assembly of the cells has an anti-glare state with 100% haze and 18% transmission. Besides, in a privacy state, where the scattering cell as prepared herein is operated at 0 V and the dye-doped cell according to Comparative Example 2 is operated at 12 V, the assembly has 100% haze and 26% transmission, and in a solar intensity control state, where the scattering cell as prepared herein is operated at 48 V and the dye-doped cell according to Comparative Example 2 is operated at 0 V, the assembly has 24% haze and 22% transmission. Also, grey scale switching is possible by varying the voltage for the dye-doped cell.

A bidirectional transmittance distribution function (BTDF) measurement is performed for the combined cells in the anti-glare state with an EZLite 120R instrument from Eldim using a white light source and normal incidence of the light.

In the anti-glare state the ratio of the averaged intensity of light transmitted into radiation angles from −3° to +3° to the averaged intensity of light transmitted into radiation angles from −60° to +60°, $<I_{-3°<\theta<3°}>/<I_{-60°<\theta<60°}>$, is 1.6.

The combination of cells effectively reduces the overall transmission of light, while furthermore distributing the transmitted light also into wider angles more evenly. The combination of the cells gives excellent anti-glare performance, in particular for sunlight.

In addition, no undesirable off-axis colour effects are observed.

Example 3

A cholesteric mixture C-3 is prepared by mixing 98.764% of mixture B-2 as described in Reference Example 2 with 0.486% of chiral dopant R-5011 available from Merck KGaA, Darmstadt, Germany and shown in Table F above and 0.750% of compound of formula RM-A as shown in Comparative Example 3.

The mixture C-3 is filled by vacuum filling into a cell having glass substrates with ITO electrodes as well as polyimide alignment layers (AL-1054 from Japan Synthetic Rubber, planar, TN), wherein the cell gap is 25 μm, and the filling ports are sealed. Electrical wiring is applied to the cell by soldering.

Subsequently polymerisation is carried out by irradiating the cell with UV light (UVA and UVB, 3.5 mW/cm² light intensity) while a square-wave voltage (50V, 60 Hz) is applied.

A mixture M-3 is prepared by mixing 99.559% of mixture H-3 as described in Reference Example 3 with 0.050% of chiral dopant S-811 available from Merck KGaA, Darmstadt, Germany and shown in Table F above, 0.077% of compound of formula DD-1 as shown in Comparative Example 1 above, 0.146% of compound of formula DD-2 as shown in Comparative Example 1 above and 0.168% of compound of formula DD-3 as shown in Comparative Example 1 above.

The mixture M-3 is respectively filled by vacuum filling into two test cells each having glass substrates with ITO electrodes as well as polyimide alignment layers (AL-1054 from Japan Synthetic Rubber, planar, TN), wherein the cell gap for each cell is 25 µm, and the filling ports are sealed. The two dye-doped cells are arranged into a double cell, wherein the first dye-doped cell is oriented to have its main axis of absorption normal to the main axis of absorption of the second dye-doped cell. Electrical wiring is applied to the cells by soldering.

A stack of cells is arranged by combining the polymer-stabilized cholesteric scattering cell with the dye-doped double cell arrangement. This assembly of the combined cells has a transparent state, where the scattering cell is operated at 48 V and the two dye-doped cells are operated at 12 V, with 9.5% haze and 46% transmission. Furthermore, at 0 V the assembly of the cells has an anti-glare state with 99% haze and 8.5% transmission. Besides, in a privacy state, where the scattering cell is operated at 0 V and the dye-doped cells are operated at 12 V, the assembly has 99% haze and 38.5% transmission, and in a solar intensity control state, where the scattering cell is operated at 48 V and the dye-doped cells are operated at 0 V, the assembly has 11% haze and 10% transmission.

The combination of the cells gives excellent anti-glare performance, in particular for sunlight. In addition, no undesirable off-axis colour effects are observed.

Example 4

The mixture M-3 as shown in Example 3 above is filled into an electrically switchable cell having the Heilmeier configuration, using an ITOS XP-40HT polariser, antiparallel polyimide planar alignment layers and a switching layer thickness of 12 µm.

A cholesteric mixture C-4 is prepared by mixing 98.89% of mixture B-2 as described in Reference Example 2 with 0.33% of chiral dopant R-5011 available from Merck KGaA, Darmstadt, Germany and shown in Table F above, 0.75% of compound of formula RM-A as shown in Comparative Example 3 and 0.03% of compound of formula ST-1 as shown in Reference Example 3.

The mixture C-4 is filled by vacuum filling into a cell having glass substrates with ITO electrodes and no alignment layers, wherein the cell gap is 25 µm, and the filling ports are sealed. Electrical wiring is applied to the cell by soldering.

Subsequently polymerisation is carried out by irradiating the cell with UV light (UVA and UVB, 3.5 mW/cm² light intensity) while a square-wave voltage (50V, 60 Hz) is applied.

A stack is arranged by combining both cells. The combination gives excellent anti-glare performance, in particular for sunlight. In addition, no undesirable off-axis colour effects are observed.

Example 5

The procedure as described in Example 4 is repeated, wherein however instead of the mixture C-4 a mixture C-5 is prepared and used which has the following composition:
98.78% of mixture B-2 as described in Reference Example 2, 0.44% of chiral dopant R-5011 available from Merck KGaA, Darmstadt, Germany and shown in Table F above, 0.75% of compound of formula RM-A as shown in Comparative Example 3 and 0.03% of compound of formula ST-1 as shown in Reference Example 3.

Example 6

The procedure as described in Example 4 is repeated, wherein however instead of the mixture M-3 a mixture M-6 is prepared and used which has the following composition:
97.77% of mixture H-3 as described in Reference Example 3, 0.34% of compound of formula DD-1 as shown in Comparative Example 1 above, 0.72% of compound of formula DD-2 as shown in Comparative Example 1 above, 0.87% of compound of formula DD-3 as shown in Comparative Example 1 above, 0.15% of compound of formula ST-1 as shown in Reference Example 3 and 0.15% of compound of formula ST-2

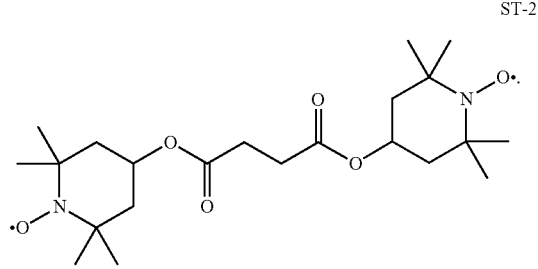

ST-2

Example 7

The procedure as described in Example 4 is repeated, wherein however instead of the mixture M-3 a mixture M-7 is prepared and used which has the following composition:
95.55% of mixture H-3 as described in Reference Example 3, 1.20% of compound of formula DD-4

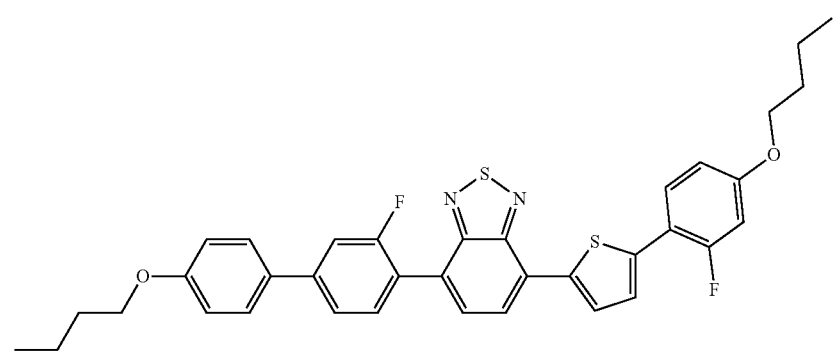

DD-4

| 187 | 188 |
|---|---|
| 0.35% of compound of formula DD-5 | 0.50% of compound of formula DD-6 |
DD-5
DD-6
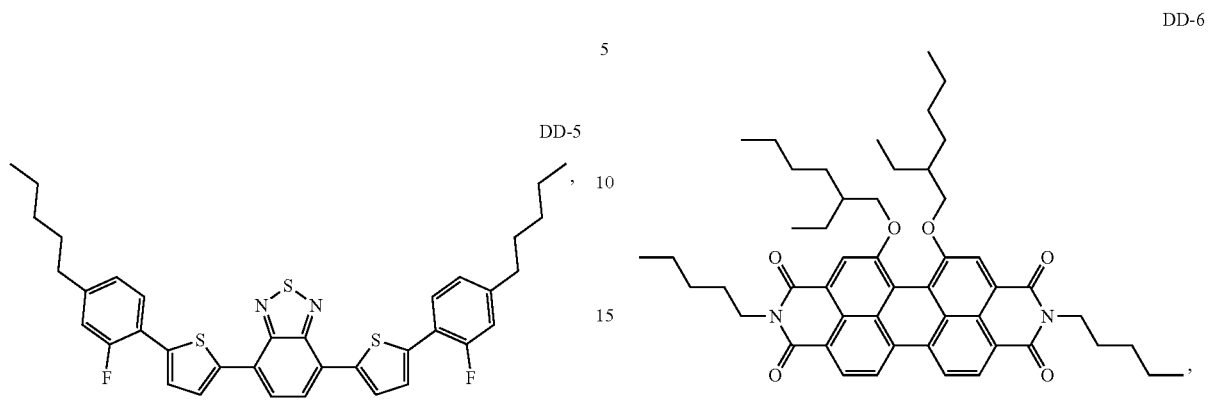
1.20% of compound of formula DD-7
DD-7
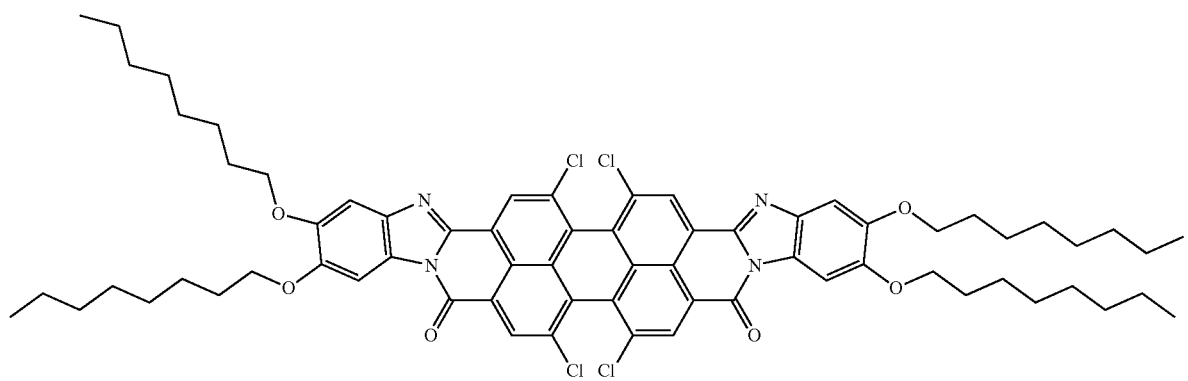
and 1.20% of compound of formula DD-8
DD-8
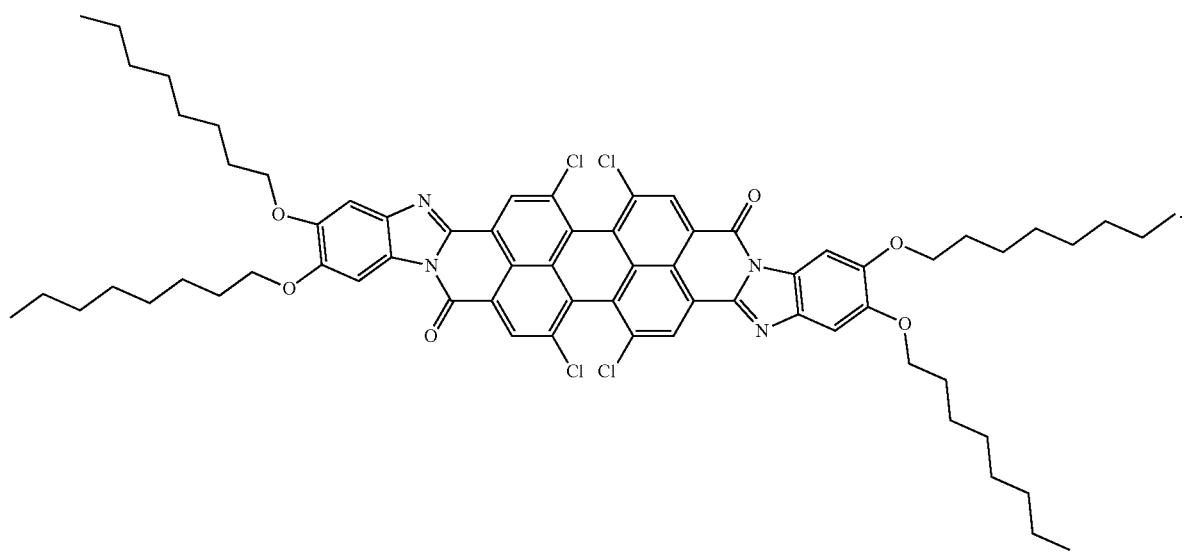

Example 8

A mixture M-8 is prepared by mixing 99.95% of mixture H-4 as described in Reference Example 4 with 0.05% of chiral dopant S-811 available from Merck KGaA, Darmstadt, Germany and shown in Table F above.

Two VA cells, VA-1 and VA-2, are prepared using glass substrates with ITO electrodes and rubbed polyimide homeotropic alignment layers with a pretilt of 3°, wherein the cell gap is 25 µm, applying a thin film polarizer on the first substrate of each cell and a thin film polarizer with retarder, for optical compensation for improving viewing angle dependence, on the other substrate of each cell, both from Polatechno. For VA-1 the two polarizers are arranged at 0° with respect to each other, and for VA-2 the two polarizers are arranged at 90° with respect to each other.

The mixture M-8 is respectively filled into the cells VA-1 and VA-2.

A scattering cell, SC, is prepared using mixture the C-3 and the conditions as described in Example 3 above.

Two stacks are arranged combining VA-1 and SC and respectively VA-2 and SC. Using the following operating voltages, different useful optical modes of the stacks are obtainable as follows Stack 1

| VA-1 | SC | mode |
|---|---|---|
| 0 V | 48 V | transparent bright |
| 0 V | 0 V | scattering bright |
| 12 V | 48 V | transparent dark |
| 12 V | 0 V | anti-glare (scattering dark) |

Stack 2

| VA-2 | SC | mode |
|---|---|---|
| 12 V | 48 V | transparent bright |
| 12 V | 0 V | scattering bright |
| 0 V | 48 V | transparent dark |
| 0 V | 0 V | anti-glare (scattering dark) |

Examples 9 to 11

The procedure as described in Example 3 is repeated, wherein however instead of using the dye-doped mixture M-3 respectively mixtures M-9, M-10 and M-11 are prepared and used, where M-9, M-10 and M-11 have the following compositions.

|  | M-9 | M-10 | M-11 |
|---|---|---|---|
| base mixture B-5 (Ref. Example 5) | 99.552% | 99.746% | 99.620% |
| DD-1 | 0.071% | 0.037% | — |
| DD-2 | 0.132% | 0.062% | — |
| DD-3 | 0.165% | 0.075% | 0.300% |
| S-811 | 0.050% | 0.050% | 0.050% |
| ST-1 | 0.030% | 0.030% | 0.030% |

Example 12

The procedure as described in Example 1 is repeated, wherein however instead of the mixture B-1 the base mixture B-6 as shown in Reference Example 6 is used to prepare a mixture M-12 and a dye-doped cell based on this mixture M-12.

Examples 13 and 14

The procedure as described in Example 1 is repeated, wherein a cell is prepared according to Comparative Example 2, however instead of using mixture H-3 respectively base mixture B-7 as described in Reference Example 7 and base mixture B-8 as described in Reference Example 8 are used to prepare the respective mixtures M-13 and M-14.

The invention claimed is:

1. A multilayer arrangement for regulating the passage of light, which comprises
    a first switching layer which is switchable between an optically clear state and a light scattering state and which contains a material which comprises a liquid-crystalline medium comprising one or more mesogenic compounds, one or more chiral compounds, and a polymeric component, wherein the polymeric component is contained in the material in an amount, based on the overall contents of the material, of 5% by weight or less, and wherein the liquid-crystalline medium of the first switching layer has a clearing point of 80° C. or more, and
    a switching element comprising a second switching layer, wherein the switching element is switchable between a bright state and a dark state and wherein the second switching layer is a liquid-crystalline layer which comprises one or more dichroic dyes and optionally one or more chiral compounds,
wherein, relative to an outer face which is facing a light source, the first switching layer is placed in front of the switching element.

2. The multilayer arrangement according to claim 1, wherein the first switching layer and the second switching layer are each interposed between two transparent substrates each respectively supporting an electrode which is arranged as a transparent conductive layer, wherein optionally alignment layers are further provided which are in direct contact with the switching layers.

3. The multilayer arrangement according to claim 1, wherein the switching element comprises another switching layer which is a liquid crystalline layer and which contains at least one dichroic dye and optionally one or more chiral compounds.

4. The multilayer arrangement according to claim 1, wherein the switching element further comprises at least one polarization layer and optionally at least one retardation layer.

5. The multilayer arrangement according to claim 1, wherein the liquid-crystalline medium comprised in the first switching layer exhibits a pitch of 0.55 µm or more in the scattering state, and wherein the polymeric component comprised in the first switching layer contains one or more polymeric structures obtained by or respectively obtainable from polymerization of one or more polymerizable mesogenic compounds.

6. The multilayer arrangement according to claim 1, wherein the liquid-crystalline medium comprised in the first switching layer contains, based on the overall contents of the medium, at least 15% by weight of one or more mesogenic compounds of formula I

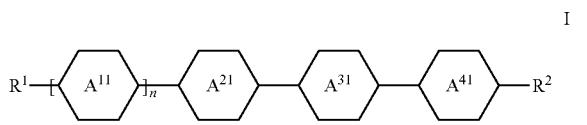
I wherein
R¹ and R² denote, independently of one another, a group selected from F, Cl, CF₃, OCF₃, and straight-chain or branched alkyl or alkoxy having 1 to 15 carbon atoms or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO—, —C≡C—,

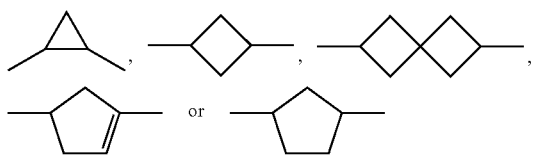

in such a manner that oxygen atoms are not linked directly to one another,

A¹¹ denotes

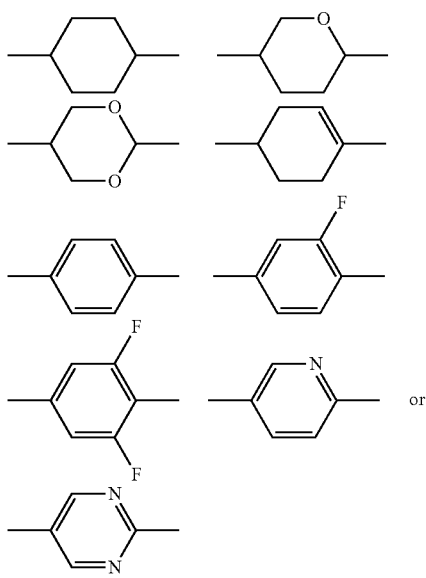

n denotes 0 or 1, and
A²¹, A³¹ and A⁴¹ denote, independently of one another,

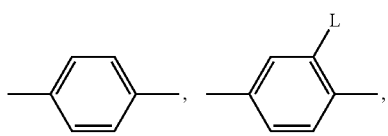

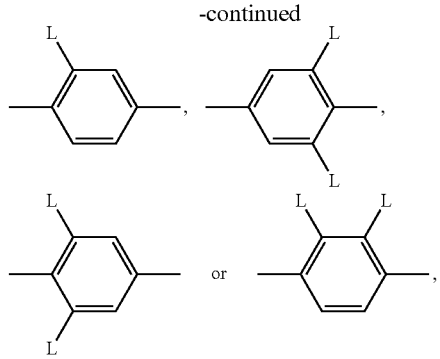

wherein L is on each occurrence, identically or differently, halogen selected from F, Cl and Br.

7. The multilayer arrangement according to claim 1, wherein the liquid-crystalline medium comprised in the first switching layer further comprises one or more mesogenic compounds selected from the group of compounds of formulae II and III

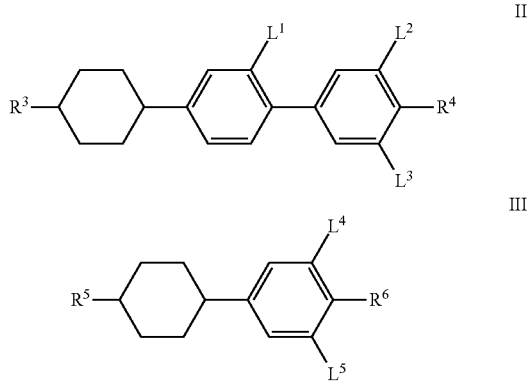

wherein
R³, R⁴, R⁵ and R⁶ denote, independently of one another, a group selected from F, CF₃, OCF₃, CN, and straight-chain or branched alkyl or alkoxy having 1 to 15 carbon atoms or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO—, —C≡C—,

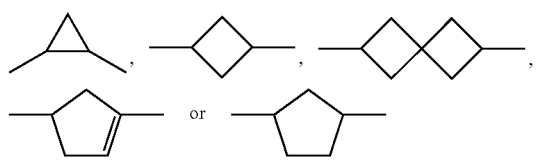

in such a manner that oxygen atoms are not linked directly to one another, and
L¹, L², L³, L⁴ and L⁵ denote, independently of one another, H or F.

8. The multilayer arrangement according to claim 1, wherein the liquid-crystalline medium comprised in the first switching layer exhibits an optical anisotropy Δn, determined at 20° C. and 589 nm, of 0.13 or more, and
wherein the one or more chiral compounds contained in the liquid-crystalline medium comprised in the first switching layer have an absolute value of the helical twisting power of 5 µm$^{-1}$ or more.

9. An insulating glazing unit comprising a multilayer arrangement according to claim 1.

10. A window element comprising a multilayer arrangement according to claim 1 and which is electrically switchable between a state which is optically clear and bright and a state which is light scattering and dark.

11. A method comprising:
regulating or modulating the passage of light from an exterior space into an interior space via a window element according to claim 10,
wherein, relative to an outer face which is facing the exterior space, the first switching layer between the outer face and the switching element.

12. A method comprising:
regulating or modulating the passage of light from a first interior space to a second interior space via a window element according to claim 10,
wherein, relative to an outer face which is facing the first interior space, the first switching layer between the outer face and the switching element.

13. The window element according to claim 10, which is switchable into the optically clear and bright state by applying an AC voltage V1 and which is switchable into the light scattering and dark state by applying an AC voltage V2, wherein V1>V2.

14. The window element according to claim 10, which is further operable in and electrically switchable to a state which is optically clear and dark and a state which is light scattering and bright.

15. The window element according to claim 10, which in the state which is light scattering and dark exhibits
a transmittance of visible light of less than 40%, and/or
for a normally incident collimated light beam from a white light source, a ratio of the averaged intensity of light transmitted into radiation angles from −3° to +3° to the averaged intensity of light transmitted into radiation angles from −60° to +60° of 5 or less.

16. A method of reducing glare from sunlight radiation comprising using a multilayer arrangement according to claim 1 to reduce glare from sunlight radiation.

17. The multilayer arrangement according to claim 1, wherein the first switching layer and the second switching layer are each interposed between two transparent substrates each respectively supporting an electrode which is arranged as a transparent conductive layer, wherein the transparent conductive layers are respectively embedded between two transparent dielectric layers, and wherein optionally alignment layers are further provided which are in direct contact with the switching layers.

18. A method of reducing glare from sunlight radiation comprising using a window element according to claim 10 to reduce glare from sunlight radiation.

19. The multilayer arrangement according to claim 1, wherein in the optically clear state the first switching layer gives a haze of less than 20%, and in the scattering state the first switching layer gives a haze of more than 75%.

20. The multilayer arrangement according to claim 1, wherein the polymeric component is contained in the material in an amount, based on the overall contents of the material, in the range from 0.5 to 1.5% by weight.

* * * * *